(12) United States Patent
Landa et al.

(10) Patent No.: US 10,913,835 B2
(45) Date of Patent: Feb. 9, 2021

(54) THERMAL TRANSFER PRINTING

(71) Applicant: LANDA LABS (2012) LTD, Rehovot (IL)

(72) Inventors: Benzion Landa, Nes Ziona (IL); Sagi Abramovich, Ra'anana (IL); Amit Haviv, Petach Tikva (IL); Ofer Aknin, Petach Tikva (IL); Yaakov Valdman, Rehovot (IL); Michael Nagler, Tel Aviv (IL)

(73) Assignee: LANDA LABS (2012) LTD., Rehovot (IL)

( * ) Notice: Subject to any disclaimer, the term of this patent is extended or adjusted under 35 U.S.C. 154(b) by 0 days.

(21) Appl. No.: 16/464,782

(22) PCT Filed: Nov. 30, 2016

(86) PCT No.: PCT/IB2016/057226
§ 371 (c)(1),
(2) Date: May 29, 2019

(87) PCT Pub. No.: WO2018/100412
PCT Pub. Date: Jun. 7, 2018

(65) Prior Publication Data
US 2019/0315118 A1 Oct. 17, 2019

(51) Int. Cl.
*B41J 2/005* (2006.01)
*C08K 3/36* (2006.01)
(Continued)

(52) U.S. Cl.
CPC .............. *C08K 3/36* (2013.01); *B41J 2/0057* (2013.01); *B41J 2/447* (2013.01); *B41M 5/025* (2013.01);
(Continued)

(58) Field of Classification Search
CPC .. C08K 3/36; C08K 2201/005; G03G 15/326; G03G 15/342; G03G 15/162; B41M 5/52;
(Continued)

(56) References Cited

U.S. PATENT DOCUMENTS

| | | |
|---|---|---|
| 4,435,064 A | 3/1984 | Tsukada et al. |
| 4,741,918 A | 5/1988 | Magi et al. |

(Continued)

FOREIGN PATENT DOCUMENTS

| | | |
|---|---|---|
| EP | 2813371 | 12/2014 |
| GB | 712437 | 12/1950 |

(Continued)

OTHER PUBLICATIONS

"Selfoc Lens Arrays", Dec. 25, 2010, downloaded on Apr. 21, 2019 from the World Wide Web at http://www.panchromos.com/selfoc-lens-arrays.

(Continued)

*Primary Examiner* — Yaovi M Ameh
(74) *Attorney, Agent, or Firm* — Shalom Wertsberger; Saltamar Innovations

(57) ABSTRACT

A method and apparatus for thermal transfer printing onto selected regions of a substrate are disclosed. The method comprises: a) providing a transfer member having an imaging surface; b) coating the imaging surface with particles formed of, or coated with, a thermoplastic polymer; c) removing substantially all particles that are not in direct contact with the imaging surface to leave a uniform monolayer particle coating on the imaging surface; d) applying energy to selected regions of the imaging surface to heat and render tacky particles of corresponding regions of the monolayer coating; and e) pressing at least portions of the imaging surface and the substrate surface against one another, either during and/or after application of energy, to cause transfer to (Continued)

the surface of the substrate of the particles of the corresponding regions that have been rendered tacky. The monolayer coating can be replenished with new particles and the cycle repeated.

24 Claims, 8 Drawing Sheets

(51) Int. Cl.
  *B41M 5/025* (2006.01)
  *B41M 5/52* (2006.01)
  *G03G 15/34* (2006.01)
  *G03G 15/32* (2006.01)
  *B41J 2/447* (2006.01)
  *C08L 83/04* (2006.01)
  *B41J 2/45* (2006.01)

(52) U.S. Cl.
  CPC ............ *B41M 5/0256* (2013.01); *B41M 5/52* (2013.01); *G03G 15/326* (2013.01); *G03G 15/342* (2013.01); *B41J 2/45* (2013.01); *B41M 2205/06* (2013.01); *B41M 2205/10* (2013.01); *C01P 2004/04* (2013.01); *C01P 2004/50* (2013.01); *C01P 2004/61* (2013.01); *C01P 2006/12* (2013.01); *C01P 2006/19* (2013.01); *C08K 2201/005* (2013.01); *C08L 83/04* (2013.01)

(58) Field of Classification Search
  CPC ................ B41M 5/025; B41M 5/0256; B41M 2205/06; B41M 2205/10; B41M 5/03; B41J 2/0057; C01P 2004/04; C01P 2004/50; C01P 2004/61; C01P 2006/12; C01P 2006/19; C08L 83/04; C09D 7/66; C08G 77/04
  See application file for complete search history.

(56) References Cited

U.S. PATENT DOCUMENTS

| | | | |
|---|---|---|---|
| 5,085,803 | A | 2/1992 | Wakita et al. |
| 5,568,320 | A | 10/1996 | Rees et al. |
| 5,751,327 | A | 5/1998 | De Cock et al. |
| 6,469,728 | B1 | 10/2002 | Charnitski et al. |
| 6,569,494 | B1 | 5/2003 | Chambers et al. |
| 6,623,816 | B1 | 9/2003 | Tanikawa et al. |
| 7,002,613 | B2 | 2/2006 | Beier et al. |
| 8,363,735 | B2 | 1/2013 | Eyvazkhani |
| 8,573,768 | B2 | 11/2013 | Onishi et al. |
| 8,947,486 | B2 | 2/2015 | Tsuchiya |
| 10,061,200 | B2 | 8/2018 | Rubin Ben Haim et al. |
| 10,336,059 | B2 | 7/2019 | Landa et al. |
| 2002/0031645 | A1 | 3/2002 | Sano et al. |
| 2002/0150333 | A1 | 10/2002 | Reed et al. |
| 2003/0067529 | A1* | 4/2003 | May .............. B41J 2/01 347/103 |
| 2006/0109440 | A1 | 5/2006 | De Jager |
| 2008/0151034 | A1 | 6/2008 | Mohri et al. |
| 2008/0166495 | A1 | 7/2008 | Maeno et al. |
| 2008/0181667 | A1 | 7/2008 | Nomura et al. |
| 2009/0009580 | A1 | 1/2009 | Nomura |
| 2009/0140631 | A1 | 6/2009 | Jo |
| 2009/0141114 | A1 | 6/2009 | Tsujino et al. |
| 2010/0075843 | A1* | 3/2010 | Ikuno .............. B41M 3/12 502/402 |
| 2010/0080594 | A1 | 4/2010 | Sowa et al. |
| 2012/0049123 | A1 | 3/2012 | Jin |
| 2012/0103212 | A1* | 5/2012 | Stowe .............. B41N 3/08 101/147 |
| 2013/0235116 | A1 | 9/2013 | Takemoto |
| 2013/0250021 | A1 | 9/2013 | Shimomura et al. |
| 2013/0342622 | A1 | 12/2013 | Takashi et al. |
| 2014/0026771 | A1 | 1/2014 | Schlumm |
| 2014/0063161 | A1 | 3/2014 | Liu |
| 2014/0168330 | A1 | 6/2014 | Liu et al. |
| 2014/0168336 | A1 | 6/2014 | Mettu et al. |
| 2014/0370193 | A1 | 12/2014 | Nogushi et al. |
| 2015/0070454 | A1 | 3/2015 | Moorlag et al. |
| 2015/0092004 | A1 | 4/2015 | Kanungo et al. |
| 2015/0118389 | A1 | 4/2015 | Jang et al. |
| 2015/0298467 | A1 | 10/2015 | Cofler |
| 2015/0352836 | A1 | 12/2015 | Kanasugi |
| 2016/0176185 | A1 | 6/2016 | Kanungo et al. |
| 2017/0072427 | A1 | 3/2017 | Landa et al. |
| 2017/0075226 | A1 | 3/2017 | Nagler et al. |
| 2018/0329306 | A1 | 11/2018 | Rubin Ben Haim et al. |

FOREIGN PATENT DOCUMENTS

| | | |
|---|---|---|
| GB | 2474474 | 4/2011 |
| GB | 2536361 | 9/2016 |

OTHER PUBLICATIONS

U.S. Appl. No. 16/046,973, filed Jul. 26, 2018, published as 2018-0329306; Co-Owned and concurrently prosecuted by Landa Labs (2012) Ltd.
U.S. Appl. No. 15/363,520, filed Nov. 29, 2016, published as 2017-0075226; Co-Owned and concurrently prosecuted by Landa Labs (2012) Ltd.
U.S. Appl. No. 15/363,615, filed Nov. 29, 2016, published as 2017-0072428; Co-Owned and concurrently prosecuted by Landa Labs (2012) Ltd.
U.S. Appl. No. 15/362,983, filed Nov. 29, 2016, published as 2017-0072427; Related and concurrently prosecuted.
U.S. Appl. No. 16/410,390, filed May 13, 2019, continuation of U.S. Pat. No. 10,336,059; Co-Owned and concurrently prosecuted by Landa Labs (2012) Ltd.
U.S. Appl. No. 16/465,041, filed May 29, 2019; Co-Owned and concurrently prosecuted by Landa Labs (2012) Ltd.
U.S. Appl. No. 16/425,559, filed May 29, 2019; Co-Owned and concurrently prosecuted by Landa Labs (2012) Ltd.
U.S. Appl. No. 16/424,712, filed May 29, 2019; Co-Owned and concurrently prosecuted by Landa Labs (2012) Ltd.
U.S. Appl. No. 16/424,721, filed May 29, 2019; Co-Owned and concurrently prosecuted by Landa Labs (2012) Ltd.

* cited by examiner

THERMAL TRANSFER PRINTING

This application is a National Phase Application filed under 35 U.S.C. 371 of, and claims priority from, PCT/IB2016/057226 filed on 30 Nov. 2016, the contents of which is incorporated by reference in its entirety.

FIELD

The present disclosure relates to a printing method and apparatus for coating selected regions of a surface of a substrate with a film of a thermoplastic material. Compositions related thereto and methods of manufacturing the same are also disclosed.

BACKGROUND

Thermal transfer typewriters are known that employ a ribbon carrying a polymeric ink film. The ribbon is equivalent to the ink ribbon used in a conventional typewriter and ink is transferred from it onto a substrate (usually paper) not by impact but by means of a thermal print head that heats only the regions of the ribbon from which the ink is to be transferred to the paper. After a character has been printed, the carriage supporting the substrate is advanced for printing of the next character and the ribbon is also advanced.

Such typewriters achieve printing of high quality but are wasteful, and therefore costly to operate, because at the time that a ribbon needs to be discarded, most of its surface is still coated with ink that has not been transferred to a printing substrate.

OBJECT

The aim of the present disclosure is inter alia to provide a printing apparatus and method that operate on the same principle of thermal transfer of an ink film, formed of one or more thermoplastic or film forming particles, to the printing substrate but that is less wasteful, capable of printing images of high quality.

SUMMARY

In accordance with one aspect of the invention, there is herein disclosed a method of thermal transfer printing onto selected regions of a surface of a substrate, which method comprises the steps of:

a) providing a transfer member having an imaging surface, b) coating the imaging surface of the transfer member with individual particles formed of, or coated with, a thermoplastic polymer, c) removing substantially all particles that are not in direct contact with the imaging surface to leave a uniform monolayer particle coating on the imaging surface, d) applying energy to selected regions of the coated imaging surface to heat and render tacky the particles within the selected regions, and e) pressing at least a portion of the coated imaging surface and at least a corresponding portion of the substrate surface against one another, either during or after application of energy, to cause transfer to the surface of the substrate of only the regions of the particle coating that have been rendered tacky.

In one embodiment, to permit continuous printing, following transfer of particles from the selected regions to a first substrate surface, steps b) and c) are repeated to apply a fresh monolayer coating of particles at least to the selected regions from which the previously applied monolayer coating was transferred to the substrate surface in step e), so as to leave the imaging surface again uniformly coated with a monolayer of particles for printing onto a subsequent substrate surface.

In different embodiments, steps b) and c) may comprise directing a gas jet carrying the particles onto the imaging surface, rubbing the particles onto the imaging surface using a cloth, brush or an application roller, forming the imaging surface and the particles of a hydrophobic material and directing a liquid jet containing the particles onto the imaging surface, the liquid of the jet being selected so as not to wet the imaging surface, directing onto an intermediate applicator a gas or liquid jet containing the particles, the applicator being capable of receiving the particles and transferring them to the imaging surface, or any suitable combination of the above mentioned techniques and structures.

In accordance with a second aspect of the invention, there is provided a printing apparatus for printing a film made of a thermoplastic material onto selected regions of a surface of a substrate, the apparatus comprising a) a cyclically movable endless transfer member having an imaging surface, b) a coating station at which particles made of, or coated with, a thermoplastic polymer are applied to the imaging surface and at which particles not in direct contact with the imaging surface are removed from, or fail to adhere to, the imaging surface, so that a substantially uniform monolayer particle coating is formed on the imaging surface, c) an imaging station at which energy is applied to selected regions of the coated imaging surface to heat and render tacky the particles within the selected regions, and d) an impression station at which at least a portion of the coated imaging surface and at least a corresponding portion of the surface of the substrate are pressed against one another, either during or after application of energy, to cause transfer to the surface of the substrate of a tacky film formed on the selected regions of the imaging surface by exposure of the monolayer particle coating to radiation.

Upon return of the imaging surface to the coating station, during operation, after having passed through the imaging and impression stations, the particle coating on the imaging surface is replenished to provide a uniform monolayer by application of fresh particles at least to regions of the imaging surface that have been depleted of particles.

In the present disclosure, the afore-described apparatus may also be interchangeably referred to as a printing apparatus or a printing system. The imaging surface may also be referred to and regarded as a donor surface, and may be disposed on a drum or an endless belt.

The terms "tacky" and "sufficiently tacky" as used herein are not intended to mean that the particle coating is necessarily tacky to the touch but only that it is softened sufficiently to enable its adhesion to the surface of a substrate when pressed against it in the impression station 18. The tacky particles or regions of particles rendered tacky are believed to form individual films or contiguous films which following their transfer to a printing substrate may optionally yield thinner films, as a result of the pressure being applied upon contacting of the imaging surface (or part thereof) to the substrate (or a corresponding part thereof) and/or of the optional further processing (e.g., drying, curing, etc.) of the transferred films.

In some embodiments, in the coating station, the particles can be directly applied to the imaging surface by jetting, for instance by using one or more spray heads. In alternative embodiments, the particles can be applied to an intermediate applicator and from it to the imaging surface. The latter type of application is said to be indirect and both direct and indirect application of particles to the imaging surface are encompassed in the present disclosure. It is to be understood that direct or indirect application of particles to the imaging surface may take place either for the initial coating of the imaging surface with a monolayer of individual particles or for the replenishment of the monolayer in selected regions (e.g., previously depleted by transfer or scraping of the entire surface), or for both.

In order to facilitate repair of the particle coating on the imaging surface after each impression, particles that adhere to the imaging surface more strongly than they do to one another are utilized. This results in an applied layer that is substantially a monolayer of individual particles. Stated differently, the layer is only one particle deep over a major proportion of the area of the imaging surface and most, if not all, of the particles have at least some direct contact with the imaging surface.

Taking, for example, a platelet shaped particle contacting the imaging surface over most of its planar face (e.g., being substantially parallel to the surface), the resulting thickness of the monolayer (in the direction perpendicular to the surface) would approximately correspond to the thickness of the particle. If the particles have a globular shape, then the thickness of the monolayer will be commensurate with the diameter of the sphere. Hence the average thickness of a monolayer at the time of coating of the imaging surface can be approximated by the average thickness or equivalent diameter of the individual particles forming it, depending on their shape.

However, as there could be partial overlaps between adjacent particles, the thickness of the monolayer can also amount to a low multiple of the dimension of the constituting particles, depending on the type of overlap, for instance on the relative angles the particles may form with one another and/or with the imaging surface and/or the extent of the overlap and/or the extent of packing etc. A monolayer may therefore have, in only some regions, a maximum thickness (T) corresponding to about one-fold, or about two-fold, or about three-fold, or any intermediate value, of a thinnest dimension characteristic to the particles involved (e.g., up to three-fold the thickness of the particles for flake shaped ones and up to two-fold the particle equivalent diameter of near spherical ones).

The creation of the monolayer occurs for the same reason that an adhesive tape, when used to pick up a powder from a surface, will only pick up one layer of powder particles. When the adhesive tape is fresh, the powder will stick to the adhesive until it covers the entire tape surface. However, once the adhesive has been covered with powder, the tape cannot be used to pick up any more powder because the powder particles will not stick strongly to one another and can simply be brushed off or blown away from the tape. Similarly, the monolayer herein is formed from the particles in sufficient contact with the imaging surface and is therefore typically a single particle thick. Contact is considered sufficient when it allows the particle to remain attached to the imaging surface at the exit of the coating station, e.g., following surplus extraction, drying, or any other like step that is described in more detail herein.

Though the monolayer is believed to be formed essentially from particles in direct contact with the imaging surface, some particles may become tightly packed by adjacent particles and might remain part of the monolayer at the exit side of the coating apparatus even if not in direct contact with the imaging surface, possibly mildly protruding from the layer. Conceivably, a portion of such minority of non-surface contacting particles may differently absorb radiation, and could eventually transfer to a printing substrate as a result of their cohesivity with adjacent particles, which would be exposed to a greater extent to the intended "energy dose" or effect of the received radiation. In some embodiments, in any portion or field-of-view, the percentage of particles having no direct contact with the imaging surface out of the number of particles being in contact with this surface is of 15% or less, or of less than 10% or even of less than 5%.

In some embodiments, the monolayer of individual particles on the imaging surface forms a sufficiently continuous layer of particles. The monolayer is sufficiently continuous if upon exposure to radiation at the imaging station, the adjacent particles can fuse to form a transferable film. In such embodiments, and depending on the size and shape of the particles forming the monolayer, an area coverage of at least about 40%, and at most about 50%, or at most about 60%, or even at most about 70%, may suffice. For smaller particles and/or for particles having a relatively lower ability to expand radially upon exposure to radiation, the monolayer of particles on the imaging surface may need to form a substantially continuous layer. By "substantially continuous" it is meant that at least 70% of the area is covered by particles, or at least 80%, or at least 90%, or even at least 95%.

Considering by way of example a particle being an ideal sphere having a diameter of 2 µm, such particle would therefore have an initial volume of about 4.19 µm$^3$ and a planar projection of about 3.14 µm$^2$. Assuming now that upon application of energy such a particle melts to form a disc of the same volume but having a thickness of about 0.5 µm, then such a disc would have a diameter of about 3.3 µm, covering an area of about 8.38 µm$^2$.

For the sake of clarity, the actual thickness of the film would be governed by the surface tension properties of the merged liquefied particles relative to air, the wetting properties of this liquid relative to the imaging surface, according to the following equation:

$$t=(2\gamma_{la}(1-\cos\theta)/g\rho)^{1/2} \qquad \text{(Eq. 1)}$$

where t is the resulting film thickness, $\gamma_{la}$ is the surface tension between the liquefied particles and air, θ is the wetting angle of the merged liquefied particle relative to the imaging surface, g is the gravitational constant and ρ is the density of this liquid. It should be understood that the surface tension and the wetting angle are both dependent on the temperature of the liquid.

Using the illustrative example and assuming now for simplicity a squared surface having an area of 100 µm$^2$, about twelve such melt particles would be needed (assuming substantially even distribution) to form a contiguous film about 0.5 µm thick on such a surface. In their original shape, prior to exposure to radiation, these twelve particles would only cover about 38% of the square. Notably, these values and calculations are provided by way of simplified illustration and persons skilled in the art of film forming polymers can readily appreciate the factors which may affect operating situations.

Clearly the initial area coverage, which needs to be such that a transferable film, possibly a contiguous one, is ultimately formed, depends, among other things, on the size distribution of the particles, on the specific material used for the particles, on their specific rheological parameters, such as temperature dependent surface tension, viscosity and temporal fluid behavior, and like factors depending on the chemical and/or physical properties of the particles per se. Properties of the imaging surface may also contribute to this matter (e.g., facilitating or hampering sufficient contact and/or spreading to contiguity). Additionally, specific process parameters, such as the operating conditions of the coating station, the distribution of the particles on the imaging surface (an essentially homogeneous one being advantageous), the energy density of the radiation received by the particles and/or imaging surface at the imaging station, the pressure at the transfer point at the impression station, can also affect the end-result (e.g., facilitating the spreading and/or merging of the irradiated particles so as to create a film of a desired thickness) thus modifying the prerequisites.

The percentage of an area covered by particles out of a specific target surface (% coverage) can be assessed by numerous methods known to skilled persons, including by determination of optical density possibly in combination with the establishment of a calibration curve of known coverage densities, by measurement of transmitted light if either the particles or the substrate are sufficiently transparent, or conversely, by measurement of reflected light, for instance if the particles are reflective (e.g., comprising a reflective material coated by a thermoplastic polymer).

As used in the present specification, a method of determining the percentage area of a surface of interest covered by particles is hereinafter described. Squared samples having 1 cm edges can be cut from the surface being studied (e.g., from the imaging surface or from the printed substrate). The samples can be analyzed by microscopy (either laser confocal microscopy (e.g., using Olympus®, LEXT OLS30ISU) or optical microscopy (e.g., using Olympus® BX61 U-LH100-3)) at a magnification of up to ×100 (yielding a field of view of at least about 128.9 µm×128.6 µm). At least three representative images can be captured in reflectance mode for each sample having an opaque substrate (e.g., paper). The captured images can be analyzed using ImageJ, a public domain Java image processing program developed by the National Institute of Health (NIH), USA. The images are displayed in 8-bit, gray scale, the program being instructed to propose a threshold value of reflectance differentiating between the reflective particles (lighter pixels) and the interstices that may exist between neighboring or adjacent particles (such voids appearing as darker pixels). A trained operator may adjust, if needed, the proposed threshold value, but typically confirms it. The image analysis program then proceeds to measure the amount of pixels representing the particles and the amount of pixels representing the uncovered areas of the intra-particle voids, from which the percent area of coverage can be readily calculated. Measurements done on the different image sections of the same sample are averaged. When the samples are on a transparent substrate (e.g., printed on a translucent plastic foil), a similar analysis can be done in transmittance mode, the particles appearing as darker pixels and the voids as lighter ones. Results obtained by such method, or by any substantially similar analytical techniques known to those of skill in the art, are referred to as optical surface coverage, which can be expressed as a percentage or as a ratio.

In some embodiments, the polymer film resulting from the conversion of the monolayer of particles by exposure to radiation has a thickness of 2 µm or less, or of less than 1 µm, or even of less than 750 nm. In other embodiments, the thickness of the polymer film is of 100 nm or more, or of more than 200 nm, or even of more than 300 nm. The thickness of the polymer film may be in the range of 300 nm-1,000 nm, or of 500 nm-1,500 nm, or of 600 nm-800 nm, or of 700 nm-1,000 nm.

The thermoplastic particles have a particle size of less than 10 µm, or less than 5 µm, or less than 1 µm, or within the range of 100 nm to 4 µm, or 300 nm to 1 µm, or 500 nm to 1.5 µm.

To permit the printing of patterns in selected regions of the substrate, the affinity of the energized/heated tacky particles needs to be greater to the substrate than to the imaging surface. Moreover this relatively higher affinity of the tacky particle to the substrate in the selected regions shall also be greater than the affinity of the bare substrate to the particles not rendered tacky. In the present context, a substrate is termed "bare" if lacking any desired image pattern to be printed by the present method or apparatus. Though the bare substrate should for most purposes have substantially no affinity to the thermoplastic particles, to enable the selective affinity of the tacky ones, some residual affinity can be tolerated (e.g., if not visually detectable) or even desired for particular printing effects. Undesired transfer of particles to areas of the bare substrate is also termed parasite or parasitic transfer.

Such gradient of affinities between the particles (before and after heating), the fluid carrying the native particles, the imaging surface, the printing substrate, any such element of the method, can be modulated by selection of suitable materials or characteristics, such as hydrophobicity, hydrophilicity, charge, polarity and any such properties known to affect interaction between any two elements.

For assisting in the transfer of the tacky film of particles from the imaging surface to the substrate, the imaging surface may be hydrophobic.

Advantageously, the imaging surface is compatible with the energy intermittently applied by the imaging station to heat desired selected areas. By compatible, it is meant for instance, that if the energy is electromagnetic (EM) radiant energy, such as a laser beam, the imaging surface is relatively resistant and/or inert to the radiation at the irradiated frequency/wavelength range, and/or able to absorb or reflect the radiation, and/or able to conduct or insulate the heat that can be generated by the radiation.

In some embodiments, the thermoplastic particles may themselves be hydrophobic. In such case, the relative affinity between the particles in their different states and the imaging surface can be based on hydrophobic-hydrophobic interactions.

In some embodiments, the thermoplastic particles and/or the imaging surface can alternatively and additionally achieve desired relative affinity one to another (and to any other fluid or surface suitable for a printing process according to present teachings) by way of charge-based interactions. For instance, positively charged particles may favor negatively charged surfaces. In such case, the relative affinity between the particles in their different states and the imaging surface can be based on charge-charge interactions.

The coating station may suitably comprise:
  at least one spray head for applying directly or indirectly to the imaging surface a fluid stream within which the thermoplastic particles are suspended,
  a housing surrounding the spray head(s) and defining an interior plenum for confining the fluid stream, the housing having a rim adjacent to the imaging surface that is configured to prevent egress of particles from a sealing gap defined between the rim of the housing and the surface to be coated, and a suction source connected to the housing to extract from the plenum the sprayed fluid and particles suspended in the sprayed fluid, the suction source being operative to extract substantially all particles that are not in direct contact with the imaging surface, so as to leave only a single particle layer adhering to the imaging surface on exiting the apparatus.

The coating station may optionally further comprise temperature controlling elements such as a heater and/or a cooler, so as to desirably adjust the temperature of the imaging surface.

In one embodiment, the temperature of the imaging surface can be raised above ambient temperature, the temperature increase being brought about by a heater. In some embodiments, the heater is positioned on the exit side or downstream of the coating station. In such embodiments, the temperature of the outer surface of the imaging surface can be greater than 30° C., or greater than 40° C. or even greater than 50° C., but typically lower than 80° C., or even no more than 70° C.

In some embodiments, the temperature of the imaging surface can be lowered, the temperature reduction being brought about by a cooler, such as a cold air blower or a cold plate, by way of example. The cooler may be positioned on the entry side or upstream of the coating station. In such embodiments, the temperature of the outer surface of the imaging surface can be less than 40° C., or less than 30C, or even less than 20° C., but typically above 0° C., or even above 10° C.

In some embodiments, the imaging surface is cooled prior to arriving at the coating station and heated after leaving the coating station.

In the present disclosure, the term "suspended" and its variations do not refer to any particular type of mixture of materials of same or different phase, but are to be more generally understood as "carried" and like terms.

In certain embodiments, the imaging system may comprise a device for projecting individually controllable laser beams onto the imaging surface as the imaging surface moves in a reference X-direction relative to the device, the device including a plurality of semiconductor chips mounted on a support in such a manner that, when activated continuously, the emitted laser beams trace across the imaging surface a set of parallel lines that extend in the X-direction and are substantially uniformly spaced in the Y-direction.

In some embodiments, each semiconductor chip of the imaging device comprises a plurality of laser beam emitting elements arranged in a two dimensional main array of M rows and N columns (M·N), the elements in each row having a uniform spacing $A_r$ and the elements in each column having a uniform spacing $a_c$, the imaging device further comprising a lens system for focusing the emitted laser beams onto the particle coated imaging surface. The lens system can have a plurality of lens elements, each associated with a respective one of the chips, and may comprise, in some embodiments, a gradient-index (GRIN) rod.

In some embodiments, the chips are mounted on a support in such a manner that when nominally placed, each pair of chips that are adjacent one another in a reference Y-direction, transverse to the X-direction, are offset from one another in the X-direction, and such that the center of laser beam emitting elements from the main arrays of both chips in the pair are nominally uniformly spaced in the Y-direction, without overlap in the Y-direction between the beam emitting elements of the adjacent chips. Stated differently, were all the laser emitting elements of the pair of nominally placed adjacent chips to be activated continuously, and were the chips and imaging surface to be in relative motion in the X-direction, the emitted laser beams of the respective main arrays of the two chips of the pair would trace on the imaging surface a set of parallel lines that extend in the X-direction and that are nominally uniformly spaced in the Y-direction. The lines traceable by emitting elements of the first chip would not interlace with the lines traceable by emitting elements of the second chip.

As absolute alignment accuracy is expensive and often impractical, it is important to realize that placement terms relate to the desired positioning within certain tolerances that enables satisfactory results from the imaging device and from the printing device. Therefore, the term "nominally", should be construed to denote the desired spatial relationship when the chips or other relevant elements are disposed at their intended placing. However, different aspects of the invention allow for displacements that diverge from that nominal position within such tolerance, and for compensating for such displacement. Similarly, when used to indicate spatial relationship the term "beam" should be considered as relating primarily to the center of the beam, unless otherwise indicated or clear from the context. Thus by way of example the uniform spacing $A_r$ and $a_c$ relate to the distance between the centers of the laser beam emitting elements.

In some embodiments, in order to compensate for minor misalignment, in addition to the M rows and N columns of elements of the main array, each chip comprises at least one additional column on at least one side of the main array, each such additional column containing at least one selectively operable laser emitting element disposed for tracing at least one additional line that lies between the two sets of M·N lines. This element, also termed the additional element or the alignment element, is thus capable of compensating for some misalignment in the Y-direction in the relative positioning of the adjacent chips on the support. If adjacent chips are correctly aligned, the elements of the additional columns will be redundant and will not be energized. However, if a gap should remain between the lines traced by adjacent chips, the additional elements can introduce additional lines to fill that gap at a position approximating the uniform spacing of the lines traced by the main M·N arrays.

Assuming that the M rows and N columns of laser emitting elements of the main array do not include any elements that are normally redundant, the spacing between adjacent lines in the set will be equal to $A_r/M$, namely the spacing of the adjacent elements in each row divided by the number of rows. Furthermore, because in some embodiments of the present disclosure no intentional overlap is provided between the two sets of M·N lines traced by any two adjacent chips, the total number of lines traced by the two chips will equal 2·M·N, namely twice the product of the number of rows and the number of columns in each chip, if the chips have equal numbers of rows and columns respectively.

Were the imaging surface moved relative to laser beams emitted by adjacent laser elements, the laser radiation centered on each line traced in the X-direction, would have a non-uniform energy profile which typically, but not necessarily, approaches a Gaussian intensity distribution. The spot size traced can be made large enough so that the energy traced by one laser element overlaps the area traced by an adjacent element and the intensity combination of the two beams, as well as the control over the amplitude of one or both beams, offers a combined intensity profile whose maximum may be moved between the two adjacent traced lines by controlling the relative intensity, and/or timing, thus placing an intermediate line traced at a selectable position between the two original line centers. It should be noted that this effect is thermally dynamic and additive provided that the adjacent spots are irradiated within a finite time of each other. In other words, the imaging surface should not have time to dissipate the energy of the first laser pulse in the interval between the two laser pulses.

In the event of an unintentional overlap between the two sets of M·N lines traced by the elements of adjacent chips, some of the elements of the main arrays can be switched off and if necessary replaced by an element of the additional columns to maintain the appearance of a raster with uniformly spaced lines. The interaction of energies from nearby laser elements within the main array can also be used in a same manner to compensate for missing or inoperative elements in a gap between them.

It has been found particularly advantageous for all the laser beams emitted by one chip to be focused on the imaging surface by a common single lens, or a common set of lenses arranged in series, having a magnification $M_o$ whose absolute value is greater than or equal to one (1), however magnification lower than one (1) is also explicitly considered. It was found to be even more advantageous if the magnification $M_o$ was substantially equal to +1, as that would ensure that the laser elements can be spaced adequately on the chip even for high resolution systems. Stated differently, the image of the array of laser elements on the imaging surface (i.e. an array of dots) would have the same size as the array on the chip, though it may be inverted with a magnification of −1. Notably, even if a slight misalignment of the lenses exists, such as GRIN rod (Gradient-Index) lenses, in the XY plane perpendicular to the optical axis of the lens, the position of the illuminated laser spot on the imaging surface will remain unchanged, as it only depends on the position of the laser emitting element on the laser array chip. The former elements can be positioned with very high accuracy on every laser array chip using standard semiconductor manufacturing techniques.

The lens elements of the imaging device, exemplified herein by GRIN rods, can be used in integral form, by which it is meant that the laser light passes through a single element in the light path from the laser source to the imaging surface. Alternatively, each light path may comprise two or more lens elements arranged in series, the separate elements being coupled to one another by reflecting elements, such as by mirrors or prisms, so as to produce the same effect as a lens element. The use of multiple lens elements is to allow the light path to be folded so as to simplify packaging, where the fold is in the space where a beam emitted by the laser elements is substantially individually collimated. For this reason, the separate elements will not typically be aligned with one another in a straight line. In other words, a laser beam emitted from the same element on a chip can target a similar location on the imaging surface, whether conveyed by an integral lens element (e.g., a single "straight" GRIN rod) or by a series of lens elements (e.g., two or more GRIN rods, with the light being "folded" and directed from each to the next by an associated or common reflecting element).

In folded light path embodiments, a reflecting member such as a prism or mirror which is optionally common to all the chips may serve to direct the laser beams from one GRIN rod element to the next in each series. In such a folded light path configuration, it is desirable for the reflecting member to be on a facet of a folding prism made of a material, typically a glass, having a higher refractive index than the highest refractive index in the GRIN rods. The higher index of refraction of the prism will limit the angular divergence of the collimated beams and allow larger separation between the sequential GRIN rod segments. A suitable light path folding prism can be for example a right angle prism, the folding face of the prism being a reflecting surface. Other types of reflecting members and folding angles can be used depending on the geometry of the system and the direction to be given to beams in the series.

Any relative movement of the imaging surface and the coating station is considered equivalent to a movement of the imaging surface.

An imaging surface and transfer member suitable for the above-mentioned printing method and apparatus are also disclosed.

In accordance with a further aspect of the invention, there is herein disclosed a transfer member for receiving ink particles, and for transferring the ink particles as an ink image to a printing substrate, the transfer member comprising:

a) a support layer; and
b) an imaging layer, disposed on and adherent to the support layer, the imaging layer comprising:
  I) a release surface distal to the support layer;
  II) a silicone matrix including the release surface; and
  III) carbon black particles having an average primary particle size (D50) of at most 100 nm;
the carbon black particles being dispersed within the silicone matrix such that an average measured particle size (D50) is at most 400 nm; wherein a concentration of the carbon black particles within the silicone matrix is at least 0.01%, by weight.

In some embodiments, the silicone matrix is an addition-cure silicone matrix.

In some embodiments, the silicone matrix is a condensation-cure silicone matrix.

In some embodiments, the carbon black particles have at least one, preferably both, of the following structural properties:

A) a volatile content of at least 5%, by weight of the carbon black particles;
B) an oxygen content of at least 4%.

The oxygen content as provided in the specification is expressed in weight per weight of the carbon black particles, and can be converted to atomic percent by multiplying by a factor of 0.75.

In some embodiments, at least 80% of the carbon black particles, by number, are disposed at a normal distance of at least 0.05 µm, at least 0.1 µm, at least 0.2 µm, at least 0.3 µm, at least 0.5 µm, or at least 1.0 µm, from the release surface.

In some embodiments, the transfer member is opaque.

In some embodiments, the imaging layer further comprises a conformable layer.

In some embodiments, the conformable layer is directly adherent to the support layer.

In some embodiments, the imaging layer includes the conformable layer, which is adherent to or directly adherent to the support layer.

In some embodiments, the conformable layer has a hardness of up to 50 Shore A.

In some embodiments, the conformable layer has a hardness within a range of 5 to 50, 10 to 30, 10 to 40, 10 to 50, 15 to 50, 20 to 40, or 20 to 50 Shore A.

In some embodiments, the support layer includes a compressible layer.

In some embodiments, the compressible layer is disposed between the imaging layer and a base layer of the support layer.

In some embodiments, the compressible layer includes a compressible elastomer.

In some embodiments, the compressible layer includes a sponge or foam structure.

In some embodiments, the transfer member is adapted and dimensioned such that the transfer member has a compressibility of 100-500 µm, 100-400 µm, 100-300 µm, 150-300 µm, or 150-250 µm in a direction normal to the imaging layer.

In some embodiments, the compressible layer has a compressibility of 10-80% in a direction normal to the large plane of the compressible layer.

In some embodiments, the transfer member is substantially transparent.

In some embodiments, the silicone matrix contains tin.

In some embodiments, the silicone matrix contains platinum.

In accordance with a further aspect of the invention, there is herein disclosed a curable composition comprising:
  a) a reactive curable silicone elastomer; and
  b) carbon black particles;
the carbon black particles having an average primary particle size (D50) of at most 100 nm; the carbon black particles being dispersed within the elastomer such that an average measured particle size (D50) is at most 400 nm;
wherein a concentration of the carbon black particles within the composition is at least 0.01%, by weight;
the carbon black particles having at least one of the following structural properties:
  I) a volatile content of at least 5%, by weight of the carbon black particles;
  II) a pH of the carbon black particles within a range of 2.5 to 4.5;
  III) an oxygen content of at least 4%.

In accordance with a further aspect of the invention, there is herein disclosed a curable composition comprising:
  a) a curable silicone elastomer;
  b) carbon black particles;
  c) a silicone surfactant, miscible with the curable silicone elastomer, for facilitating dispersion of the carbon black particles within the curable silicone elastomer;
the carbon black particles having an average primary particle size (D50) of at most 100 nm;
the carbon black particles being dispersed within the elastomer such that an average measured particle size (D50) is at most 400 nm;
wherein a concentration of the carbon black particles within the composition is at least 0.01%, by weight;
the carbon black particles having at least one of the following structural properties:
  I) a volatile content of at least 5%, by weight of the carbon black particles;
  II) a pH of the carbon black particles within a range of 2.5 to 4.5;
  III) an oxygen content of at least 4%.

In accordance with a further aspect of the invention, there is herein disclosed a curable composition comprising:
  a) a curable silicone elastomer;
  b) carbon black particles;
  c) a silicone surfactant, miscible with the curable silicone elastomer, for facilitating dispersion of the carbon black particles within the curable silicone elastomer;
the carbon black particles having an average primary particle size (D50) of at most 100 nm;
the carbon black particles being dispersed within the elastomer such that an average measured particle size (D50) is at most 400 nm;
wherein a concentration of the carbon black particles within the composition is at least 0.01%, by weight;
the silicone surfactant including a material preferably selected from the group consisting of an amino-silicone and a silicone acrylate.

In some embodiments, the silicone surfactant contains amino-silicone.

In some embodiments, the amino-silicone of the silicone surfactant has an amine number within a range of 8 to 40.

In some embodiments, the amine number is at least 10, at least 12, at least 15, at least 20, or at least 25.

In some embodiments, the amine number is at most 37, at most 35, at most 32, or at most 30.

In some embodiments, the amino-silicone includes a mono-amine terminated amino silicone.

In some embodiments, the silicone surfactant contains silicone acrylate.

In some embodiments, a concentration of acrylate within the silicone surfactant is at least 0.5%, by weight.

In some embodiments, the concentration of acrylate is within a range of 0.5% to 75%, 0.5% to 60%, 0.5% to 50%, 0.5% to 20%, 2.5% to 75%, 2.5% to 60%, 2.5% to 40%, 5% to 75%, 5% to 60% or 5% to 40%.

In some embodiments, the curable silicone elastomer is an addition-curable silicone elastomer.

In some embodiments, the curable silicone elastomer is a condensation-curable silicone elastomer.

In some embodiments, the concentration of the carbon black particles within the composition is at least 0.03%, at least 0.1%, at least 0.25%, at least 0.5%, at least 1%, at least 1.5%, at least 2%, or at least 3%, by weight.

In some embodiments, the concentration of the carbon black particles within the composition is at most 30%, at most 20%, at most 15%, at most 12%, at most 10%, at most 8%, at most 6%, at most 5%, or at most 4%, by weight.

In some embodiments, the concentration of the carbon black particles within the composition is within a range of 0.1% to 25%, 0.1% to 20%, 0.1% to 15%, 0.1% to 10%, 0.3% to 25%, 0.3% to 10%, 0.5% to 15%, tw-0.5% to 12%, or 1% to 15%.

In some embodiments, the average measured particle size (D50) is at most 350 nm, at most 300 nm, at most 250 nm, at most 200 nm, at most 150 nm, at most 120 nm, or at most 10 nm.

In some embodiments, the volatile content is at least 7%, at least 10%, at least 12%, at least 15%, or at least 20%, by weight, of the carbon black particles, In some embodiments, the volatile content is at most 40%, at most 35%, at most 30%, at most 27%, or at most 25%, by weight, of the carbon black particles.

In some embodiments, the volatile content of the carbon black particles is within a range of 5% to 40% 5% to 30%, 5% to 25%, 7% to 30%, 10% to 30%, or 10% to 25%, by weight.

In some embodiments, the oxygen content of the carbon black particles is at least 5%, at least 6%, at least 7%, at least 8%, or at least 10%.

In some embodiments, the oxygen content of the carbon black particles is at most 25%, at most 20%, at most 18%, at most 15%, or at most 13%.

In accordance with a further aspect of the invention, there is herein disclosed a cured composition comprising:
  a) a silicone matrix; and
  b) carbon black particles, disposed within the matrix;
the carbon black particles having an average primary particle size (D50) of at most 100 nm;

the carbon black particles being dispersed within the matrix such that an average measured particle size (D50) is at most 400 nm;
wherein a concentration of the carbon black particles within the matrix is at least 0.01%, by weight;
the carbon black particles having at least one of the following structural properties:
  I) a volatile content of the carbon black particles of at least 5%, by weight;
  II) an oxygen content of at least 4%.

In accordance with a further aspect of the invention, there is herein disclosed a method of preparing a cured composition, the method comprising:
  a) size-reducing initial carbon black particles in a presence of a first part of a silicone surfactant, to obtain an initial dispersed mixture containing size-reduced carbon black particles;
  b) optionally mixing the size-reduced carbon black particles with a second part of the silicone surfactant to produce an intermediate dispersed mixture;
  c) mixing the initial dispersed mixture or the intermediate dispersed mixture with a curable silicone elastomer to produce a final dispersed mixture, the size-reduced carbon black particles within the second dispersed mixture maintaining the average measured particle size (D50) of at most 400 nm;
  d) curing the final dispersed mixture;
  e) optionally, prior to d), applying the final dispersed mixture on a surface so as to form a layer of desired (pre-determined) thickness, or within a mold so as to form an object substantially having a shape conforming to the mold.

In some embodiments, the curing is addition-curing.
In some embodiments, the curing is condensation-curing.
In some embodiments, the initial carbon black particles have at least one, preferably at least two, or all three of the following structural properties:
  A) a volatile content of at least 5%, by weight of the carbon black particles;
  B) a pH of the carbon black particles within a range of 2.5 to 4.5;
  C) an oxygen content of at least 4%.

In some embodiments, the curable composition further comprises a platinum catalyst adapted to catalyze an addition-cure reaction whereby the reactive curable silicone elastomer forms a polymeric matrix containing the carbon black particles.

In some embodiments, the curable composition further comprises a tin catalyst adapted to catalyze a condensation-cure reaction whereby the reactive curable silicone elastomer forms a polymeric matrix containing the carbon black particles.

In some embodiments, the carbon black particles are adapted and the silicone surfactant is selected such that the average measured particle size concentration (D50) is maintained within 10% over the course of at least 2 months, at least 3 months, at least 4 months, at least 6 months, or at least 12 months.

In some embodiments, the average measured particle size concentration (D50) of the carbon black particles is maintained within 8%, within 6%, within 4%, or within 2% over the course of at least 2 months, at least 3 months, at least 4 months, at least 6 months, or at least 12 months.

In some embodiments, the method further comprises aging the dispersion for at least 6 months, at least 9 months, at least 12 months, at least 18 months, or at least 24 months, while maintaining the average measured particle size concentration (D50) within 10%, within 8%, within 6%, within 4%, or within 2%.

The afore-mentioned carbon black containing composition or method of preparing the same can have a wide range of applications in a variety of industrial fields (e.g., in fields where CB can serve for its mechanical properties, for its heat conductive properties, for its electrical conductive properties, and any such known properties of this material). In some embodiments, the carbon black containing composition or method of preparing the same can be used for the preparation of transfer members for the printing industry, whether digital or traditional. In particular embodiments, the carbon black containing composition or method of preparing the same can be used for the preparation of radiation absorbing layers or imaging surfaces of transfer members for the printing method and apparatus according to the present teachings.

BRIEF DESCRIPTION OF THE DRAWINGS

Some embodiments of the imaging device are described herein with reference to the accompanying drawings. The description, together with the figures, makes apparent to a person having ordinary skill in the pertinent art how the teachings of the disclosure may be practiced, by way of non-limiting examples. The figures are for the purpose of illustrative discussion and no attempt is made to show structural details of an embodiment in more detail than is necessary for a fundamental and enabling understanding of the disclosure. For the sake of clarity and simplicity, some objects depicted in the figures may not be drawn to scale.

In the Figures.

DETAILED DESCRIPTION

Figure 1:
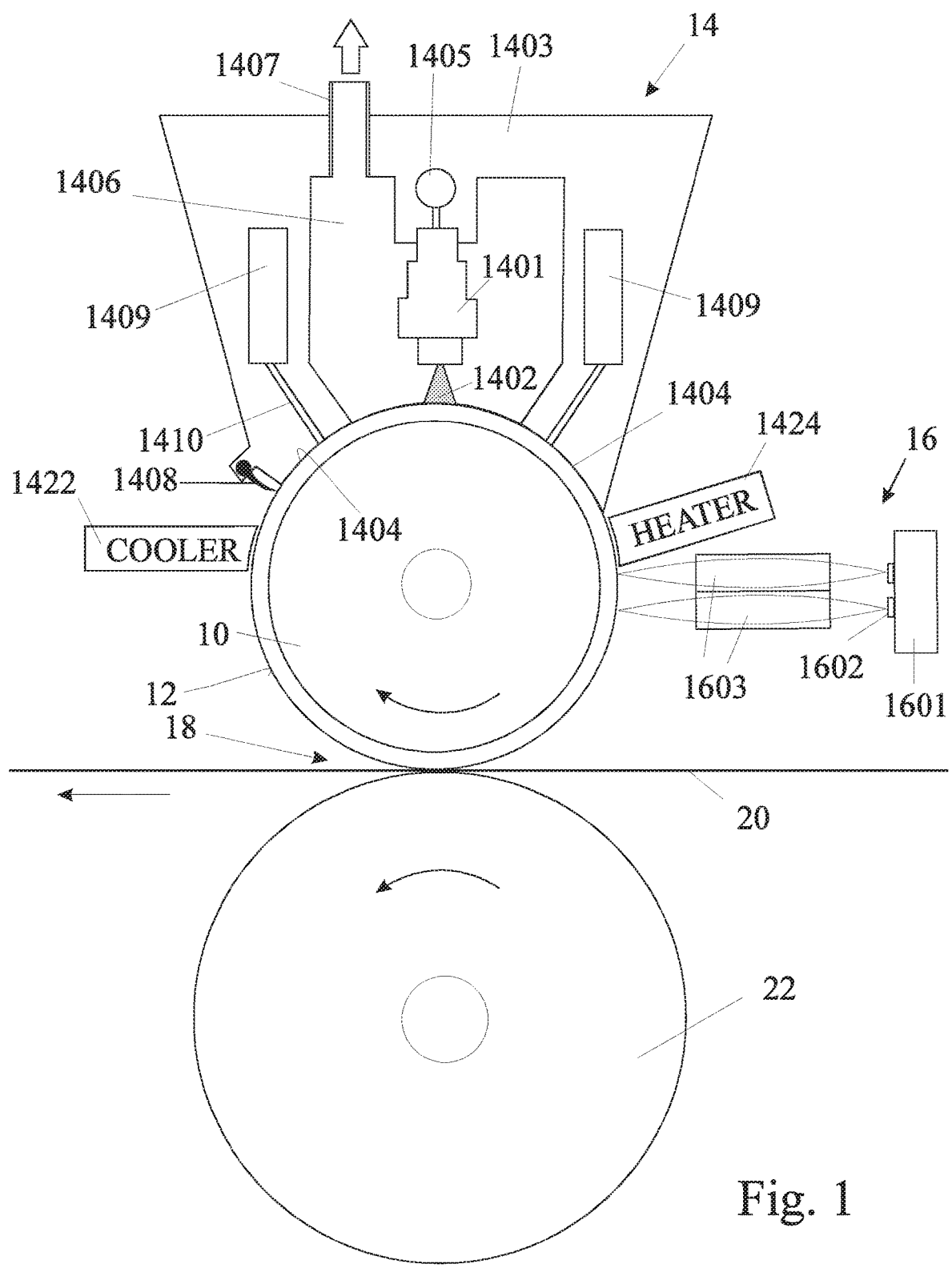
FIG. 1 depicts schematically a first embodiment of a printing system.

Overall description of an exemplary printing system
FIG. 1 shows a drum 10 having an outer surface 12 that serves as an imaging surface. As the drum rotates clockwise, as represented by an arrow, it passes beneath a coating station 14 where it acquires a monolayer coating of fine particles. After exiting the coating station 14, the imaging surface 12 passes beneath an imaging station 16 where energy is applied to selected regions of the imaging surface 12 to heat and render tacky the particle coating on the selected regions of the imaging surface 12. In the embodiment of FIG. 1, the energy is applied by exposing the selected regions of the imaging surface 12 to laser radiation. In an alternative embodiment, heat may be applied to the imaging surface using a thermal print head, for example of the type used in thermal transfer printers, in thermal contact with the rear side of the drum 10, that is to say the side opposite to the particle coated imaging surface. Such a thermal print head applies energy by conduction of heat through the transfer member. As further explained below, in further embodiments, radiant energy may be applied to the rear side of the transfer member, provided that the transfer member is made of materials transparent to the radiation.

Next, the imaging surface 12 passes through an impression station 18, having a nip indicated by an arrow, where a substrate 20 is compressed between the drum 10 and an impression cylinder 22. The pressure applied at the impression station 18 causes the selected regions of the coating on the imaging surface 12 that have been rendered tacky by exposure to laser radiation in the imaging station 16, to transfer from the imaging surface 12 to the substrate 20. The regions on the imaging surface 12 corresponding to the selected tacky areas transferred to the substrate 20 consequently become exposed, being depleted by the transfer of particles. The imaging surface 12 can then complete its cycle by returning to the coating station 14 where a fresh monolayer particle coating is applied only to the exposed regions from which the previously applied particles were transferred to the substrate 20 in the impression station 18. As detailed below, the substrate, also termed printing substrate, may be made of various materials (e.g., paper, cardboard, plastics, fabrics etc.), some optionally existing in coated and uncoated form depending on desired characteristics, and can be supplied to the impression station in different forms (e.g., as sheets or continuous webs).

The thermoplastic polymeric particles selectively heated for transfer to the substrate are said to form a film, or as further detailed hereinafter a polymer film. As used herein, the term "film" indicates that each spot of particle(s) exposed on the imaging surface may form a thin layer or coating of material, which may be flexible at least until transfer to the substrate at the impression station. The term "film" should not be taken to mean that spots of adjacent particles that are heated at the imaging station are to transfer collectively as a continuous coating. It is believed that a thin film formed on the imaging surface (i.e. by one or more adjacent particles sufficiently exposed to a laser beam) may at most retain its thickness or become even thinner upon impression. Hence the printing apparatus and method according to the present teachings advantageously enable the printing on a substrate of a thin layer of particles that have been rendered tacky. In some embodiments, the printed film can have a thickness of 1 micrometer or less, or of no more than 800 nm, or of no more than 600 nm, or of no more than 400 nm, or of no more than 200 nm, or even of no more than 100 nm.

The Coating Station

The coating station 14 may comprise a plurality of spray heads 1401 that are aligned with each other along the axis of the drum 10 and only one is therefore seen in the section of FIG. 1. The sprays 1402 of the spray heads are confined within a bell housing 1403, of which the lower rim 1404 is shaped to conform closely to the imaging surface leaving only a narrow gap between the bell housing 1403 and the drum 10. The spray heads 1401 are connected to a common supply rail 1405 which supplies to the spray heads 1401 a pressurized fluid carrier (gaseous or liquid) having suspended within it the fine particles to be used in coating the imaging surface 12. If needed the suspended particles may be regularly or constantly mixed, in particular before their supply to the spray head(s). The particles may be circulated in the coating apparatus at any suitable flow rate, generally not exceeding 50 liter/min, and by way of example within a flow rate range of 0.1 to 10 liter/minute, or in the range of 0.3 to 3 liter/min. The fluid and the surplus particles from the sprays heads 1401, which are confined within a plenum 1406 formed by the inner space of the housing 1403, are extracted through an outlet pipe 1407, which is connected to a suitable suction source represented by an arrow, and can be recycled back to the spray heads 1401. Though herein referred to as spray heads, any other type of nozzle or orifice along the common supply pipe or conduit allowing applying the fluid suspended particles are encompassed.

Figure 2:
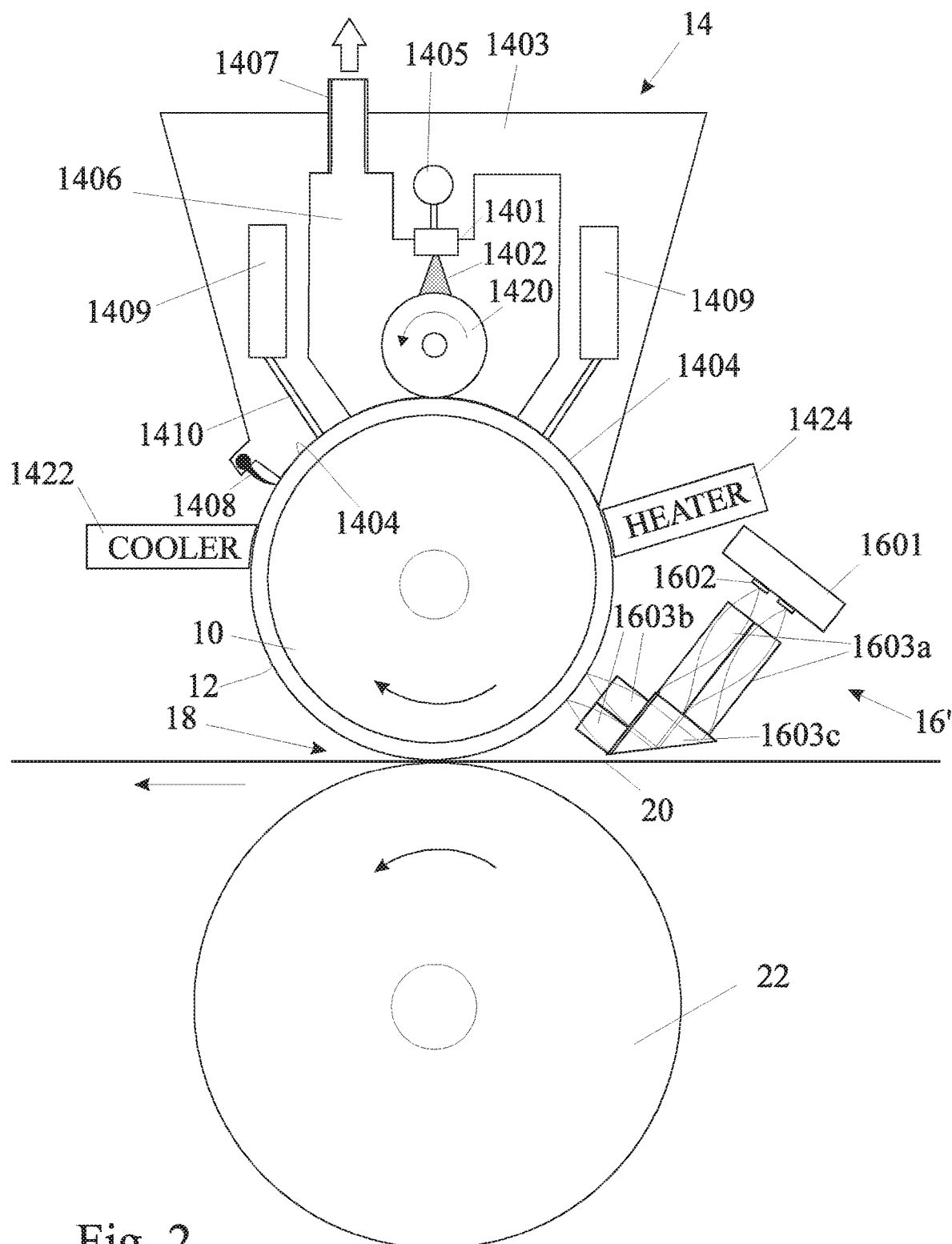
FIG. 2 depicts schematically a second embodiment of a printing system.

As an alternative to the above-described direct spraying of the fluid and suspended particles onto the imaging surface, the coating station, as shown in FIG. 2 may comprise a rotatable applicator 1420 operative to wipe the fluid and suspended particles onto the surface. The applicator 1420 may for example be a cylindrical sponge or it may comprise a plurality of flexible strips extending radially from a rotatable axle. The material of the spongy roller or the strips is to be "relatively soft", selected so as to wipe the particles on the imaging surface 12, without affecting the integrity of the coat thereupon formed, in other words without scratching the layer of particles. The surface of the applicator, or of its bristles or stripes, may suitably comprise a closed cell foam (such as closed cell polyethylene, closed cell PVA or closed cell silicone); or a relatively soft open cell foam (such as a polyurethane foam); or a fabric, such as cotton, silk or ultra high molecular weight polyethylene (UHMWPE) fabric.

The fluid comprising the suspended particles may be supplied externally to the applicator 1420, in the manner shown in FIG. 2, as a spray or a jet 1420 from nozzles 1401, which may be embodied as simply as holes in the wall of a pipe, but more precise and/or evenly distributing embodiments are also considered. Alternatively, the fluid and suspended particles may be supplied internally. In such an embodiment, the fluid may be provided by a supply duct, or spray, positioned within the applicator, for instance, within or in parallel with the axis 1421, and diffuse through the material of the applicator 1420 towards its external surface.

The particle supply system is a conduit for supplying the required particles, and may be implemented internally to the printing device or to a coating housing therewithin, or as an external supply system which transports appropriate particles to the coating device.

The applicator may serve to remove, at least partially, any particles that are not in direct contact with the imaging surface and optionally at least partially flatten the particles coated on the surface as a monolayer.

Advantageously, a monolayer of particles facilitates the targeted delivery of radiation, in embodiments where the particles are heated by laser light as emitted by the laser elements of the imaging station. This may ease the control of the imaging device, as the selectively irradiated particles reside on a single defined layer, which may facilitate focusing the laser radiation to form upon transfer to a substrate a dot of approximately even thickness and/or relatively defined contour.

Another advantage of having a monolayer is that it can provide for good thermal coupling between the particles and the imaging surface on which the particles are coated. The imaging surface may be a heat absorbing substrate or made of a suitably heat absorbing material, thus easing the transfer of energy from the imaging surface to the polymer particle(s) to render them tacky. It should be mentioned that because of the very small thickness of the particles, most of the laser energy can pass through them without being absorbed. Instead of heating the particles directly, the laser radiation tends instead to heat the imaging surface and the particles are heated indirectly.

As the intermediate applicator 1420 (e.g., roller or brush) rotates about its axis, it applies the particles upon contact with imaging surface 12 of drum 10. The outer surface of the applicator need not have the same linear velocity as the imaging surface and it can, for instance, be up to about ten-times higher. It may rotate in the same direction as drum 10 or in counter-direction. The applicator may be independently driven by a motor, or driven by drum 10 by gears, belts, friction, and the like.

In some embodiments, the surplus extraction system, that serves to remove any particles that are not in direct contact with the surface, is configured similarly to the applicator. In such case, the fluid that is externally or internally supplied to the applicator-like surplus extraction element, to serve as a remover of excess particles, does not itself have any particles suspended within it. The fluid of the surplus extraction system, which may be regarded as a cleaning device, may be the same or different from the fluid in which the particles are suspended for the application device. For instance, particles may be applied while suspended in water or any other aqueous medium, and excess thereof may be removed by the same aqueous medium or by a different fluid, such as by an air stream.

It is important to be able to achieve an effective seal between the housing 1403 and the imaging surface 12, in order to prevent the particle carrying fluid and the fine particles from escaping through the narrow gap that remains between the housing 1403 and the imaging surface 12 of the drum 10. Different ways of achieving such a seal are shown schematically in the drawings.

The simplest form of seal is a wiper blade 1408. Such a seal makes physical contact with the imaging surface and could score the applied coating if used on the exit side of the housing 1403, that is to say the side downstream of the spray heads 1401. For this reason, if such a seal is used, it is preferred for it to be located only upstream of the spray heads 1401 and/or at the axial ends of the housing 1403. The terms "upstream" and "downstream" as used herein are referenced to points on the imaging surface 12 as it cycles through the different stations.

FIGS. 1 and 2 also show how egress of the fluid within which the particles are suspended from the sealing gap between the housing 1403 and the drum 10 can be prevented without a member contacting the imaging surface 12. A gallery 1409 extending in the present illustration around the entire circumference of the housing 1403 is connected by a set of fine passages 1410 extending around the entire rim of the housing 1403 to establish fluid communication between the gallery 1409 and the sealing gap.

In a first embodiment, the gallery 1409 is connected to a suction source of a surplus extraction system, which may be the same suction source as is connected to the outlet 1407 or a different one. In this case, the gallery 1409 serves to extract fluid passing through the gap before it exits the housing 1403. The low pressure also sucks off the drum 10 any particles that are not in direct contact with the imaging surface 12 and, if the sprayed fluid is a liquid, it also sucks off surplus liquid to at least partially dry the coating before it leaves the coating station 14. Surplus liquid can alternatively and additionally be removed by a liquid extracting roller (e.g., having a liquid absorbing surface) positioned on the exit side of the coating apparatus. Any such elements directed at drying the particle coating (e.g., a blower, a heater, a liquid extractor etc.), if present, can be internal to the coating device 14 (i.e., within plenum 1406 of housing 1403), or can alternatively be positioned downstream of the coating station, as long as it remains upstream of a station where the coating needs to be substantially dry. The drying element, if present, is advantageously compatible with the particle layer, and for instance does not negatively affect the particles and/or the integrity of the layer formed therefrom.

In an alternative embodiment, the gallery 1409 is connected to a source of gas at a pressure higher than the pressure in the plenum 1406. Depending on the rate of fluid supply to the plenum through the spray heads 1401 or other particle supply method and the rate of extraction through the outlet 1407, the plenum 1406 may be at a pressure either above or below the ambient atmospheric pressure.

If the plenum is maintained at sub-atmospheric pressure, then it suffices for the gallery 1409 to be at ambient atmospheric pressure, or indeed no gallery need be present. In this case, because the pressure within the sealing gap will exceed the pressure in the plenum 1406, gas flow through the gap will be towards the interior of the housing with no risk of fluid egress.

If the plenum is at above ambient atmospheric pressure, then the gallery 1409 may be connected to a gas supply, preferably air, that is pressurized at higher pressure than the plenum pressure. In this case, air will be forced into the sealing gap under pressure through the passages 1410 and will split into two streams. One stream will flow towards the plenum 1406 and will prevent egress of the fluid within which the particles are suspended. That stream will also dislodge and/or entrain particles not in direct contact with the imaging surface and assist in at least partially drying the coating if the carrier fluid is a liquid. The second stream will escape from the coating station without presenting a problem as it is only clean air without any suspended particles. The second gas stream may also assist in further drying of the particle coating on the imaging surface 12 before it leaves the coating station 14. If desired, the gas stream can be heated to facilitate such drying.

In an alternative embodiment, the afore-mentioned gallery 1409 does not extend around the entire circumference of the housing, so as to seal the plenum chamber on all sides. It can be a "partial" gallery or a combination of one or more air knives (with negative or positive flow) positioned either downstream or upstream of the spray head(s) and/or intermediate applicator(s) in parallel to the axis of the drum and/or on the lateral edges of the spray heads and/or applicators in a direction perpendicular to the axis of the drum. A "partial" gallery on the exit side may, in some embodiments, serve as gas blower (e.g., cold or hot air) additionally or alternatively facilitating the drying of the particles, in which case the passages 1410 may be dimensioned to provide sufficient flow rate.

In one embodiment, and independently of the type of fluid carrying the suspended particles being applied to the imaging surface 12, there is included on the exit side of the coating apparatus 14, and typically at an external downstream location as shown in FIGS. 1 and 2, a heater 1424 allowing the temperature of the particle layer and the imaging surface to be raised before it reaches the imaging station 16. The temperature of the particles and the imaging surface may be raised by the heater from ambient temperature to above 30° C., or 40° C. or even 50° C., so as to reduce the amount of further energy, such as laser energy, that is needed to render the particles tacky. However, the heating provided by the heater 1424 should not itself render the particles tacky and should not raise their temperature to above 80° C. or possibly to above 70° C. Such heating of the particles and imaging surface may be further facilitated by using a fluid carrier at an elevated temperature.

In some embodiments, there can be included on the entry side of the coating apparatus 14, and typically at an external upstream location as shown in FIGS. 1 and 2, a cooler 1422 allowing lowering the temperature of the imaging surface 12 before the previously exposed regions of the particle layer are replenished in. It is believed that an imaging surface at a temperature of less than 40° C., or less than 30° C., or even less than 20° C., but typically above 0° C., or even above 10° C., can reduce the temperature of the particles neighboring the exposed regions so that by the time the imaging surface is being replenished, the so-cooled particles may have no or reduced "residual tackiness", that is to say a partial softening insufficient for a subsequent step (e.g., transfer to a printing substrate). The cooled coating behaves in the same manner as the particles freshly deposited on the exposed regions of the imaging surface. In this manner, only particles selectively directly and/or indirectly targeted by any laser element of a chip of an imaging device as herein disclosed would become sufficiently tacky for transfer to a printing substrate. In the present context, indirect targeting of a particle indicates that a laser beam emitting element, or any other source of thermal energy, may target a radiation absorbing layer or the imaging surface underneath the targeted particle. Such cooling of the particles and imaging surface may be further facilitated by using a fluid carrier at decreased temperature.

It is possible to provide both a cooler 1422 on the entry side of the coating apparatus 14 and a heater 1424 on the exit side, each cooler and heater operating as above described. Additionally, the drum 10 may be temperature controlled by suitable coolers/heaters internal to the drum, such temperature controlling arrangements being operated, if present, in a manner allowing the outer surface of the imaging surface, or portions thereof, to be maintained at any desired temperature.

The Coating Particles

The shape and composition of the coating particles will depend in practice on the nature of the effect to be applied to the surface of the substrate 20. In a printing system, the particles may conveniently be formed of a pigmented thermoplastic polymer, hence are also referred to as polymer particles. Polymers and/or pigments associated therewith able to heat up and soften as a response to the irradiation wavelength of the laser beam emitting elements can be suitable. This need not be construed as limiting, as alternatively (and additionally) the particles may be rendered tacky by the laser elements as a result of the heating up of the imaging surface upon which they are applied.

For printing of high quality, it is desirable for the particles to be as fine as possible to minimize the interstices between particles of the applied monolayer coating. The particle size is dependent upon the desired image resolution and for some applications a particle size of 10 micrometer (μm) or possibly even larger may prove adequate. However, for improved image quality, it is preferred for the particle size to be a few micrometers and more preferably less than about 1 μm. In some embodiments, suitable particles can have an average diameter between 100 nm and 4 μm, 300 nm and 1 μm, in particular between 500 nm and 1.5 μm. On account of the manner in which such particles are produced, they are likely to be substantially spherical but that is not essential and they may be shaped as platelets.

Thus particle selection and ideal size determination, will depend upon the intended use of the particles, the effect sought (e.g., visual effect in the case of printing), and the operating conditions of the relevant coating and imaging stations. Optimization of the parameters may be done empirically, by routine experimentation, by one of ordinary skill in the art.

Depending on their morphology, particles (e.g., thermoplastic particles serving to form an image as herein discussed, reinforcement particles or any other fillers serving in the manufacturing of the transfer member, radiation absorbing particles, such as CB, and any like particles, as detailed in other sections of the disclosure) may be characterized by their length, width, thickness, diameter, or any such representative measurement of their X-, Y- and Z-dimensions. Typically such sizes are provided as average of the population of particles and can be determined by any technique known in the art, such as microscopy and Dynamic Light Scattering (DLS). In DLS techniques, the particles are approximated to spheres of equivalent behavior and the size can be provided in terms of hydrodynamic diameter. DLS also allows assessing the size distribution of a population. As used herein, particles having a size of, for instance, 10 μm or less, have at least one dimension smaller than 10 μm, and possibly two or even three, depending on shape.

Though not essential, the particles may preferably be uniformly shaped and/or within a symmetrical distribution relative to a median value of the population and/or within a relatively narrow size distribution.

A particle size distribution (PSD) is said to be relatively narrow if at least one of the two following conditions applies:
A) the difference between the hydrodynamic diameter of 90% of the particles and the hydrodynamic diameter of 10% of the particles is equal to or less than 150 nm, or equal to or less than 100 nm, or equal to or less than 50 nm, which can be mathematically expressed by: (D90−D10)≤150 nm and so on; and/or
B) the ratio between a) the difference between the hydrodynamic diameter of 90% of the particles and the hydrodynamic diameter of 10% of the particles; and b) the hydrodynamic diameter of 50% of the particles, is no more than 2.0, or no more than 1.5, or no more than 1.0, which can be mathematically expressed by: (D90−D10)/D50≤2.0 and so on.

D10, D50 and D90 can be assessed by number of particles in the population, in which case they may be provided as $D_N10$, $D_N50$ and $D_N90$, or by volume of particles, in which case they may be provided as $D_V10$, $D_V50$ and $D_V90$. The foregoing measurements can be obtained by DLS techniques when the samples to be studied are suitably fluid. However, when the particles under study are in viscous media or in cured matrices, then typically such measurements are performed by microscopy. As used herein, D50, which can also be termed the "average measured particle size" may refer, depending on the measuring method most suited to the particles being considered and their media, either to $D_V50$ (by DLS and the like) or to the volume average size of particles found in a field of view of a microscope adapted to analyze in the scale of the particles. D50 measurements can relate, when applicable, to primary particle size or to secondary particle size.

As mentioned, such relatively uniform distribution may not be necessary for certain applications. For instance, having a relatively heterogeneously sized population of coating particles may allow relatively smaller particles to reside in interstices formed by relatively larger particles.

The particles may be characterized by an aspect ratio, i.e., a dimensionless ratio between the smallest dimension of the particle and the longest dimension or equivalent diameter in the largest plane orthogonal to the smallest dimension, as relevant to their shape. The equivalent diameter (Deq) is defined by the arithmetical average between the longest and shortest dimensions of that largest orthogonal plane. Particles having an almost spherical shape are characterized by an aspect ratio of approximately 1:1, whereas rod-like particles can have higher aspect ratios and flake-like particles can even have an aspect ratio of at least 1:100.

Such characteristic dimensions are generally provided by the suppliers of such particles and can be assessed on a number of representative particles by methods known in the art, such as microscopy, including, in particular, by light microscope for particles of several microns or down to estimated dimensions of about 200 nm, by scanning electron microscope SEM for smaller particles having dimensions of less than 200 nm (SEM being in particular suitable for the planar dimensions) and/or by focused ion beam FIB (preferably for the thickness and length (long) dimensions of nanoparticles). While selecting a representative particle, or a group of representative particles, that may accurately characterize the population (e.g., by diameter, longest dimension, thickness, aspect ratio and like characterizing measures of the particles), it will be appreciated that a more statistical approach may be desired. When using microscopy for particle size characterization, a field of view of the image-capturing instrument (e.g., light microscope, SEM, FIB-SEM etc.) is analyzed in its entirety. Typically, the magnification is adjusted such that at least 5 particles, at least 10 particles, at least 20 particles, or at least 50 particles are disposed within a single field of view. Naturally, the field of view should be a representative field of view as assessed by one skilled in the art of microscopic analysis. The average value characterizing such a group of particles in such a field of view is obtained by volume averaging. In such case, $D_V 50 = \Sigma[(Deq(m))^3/m]^{1/3}$, wherein m represents the number of particles in the field of view and the summation is performed over all m particles. As mentioned, when such methods are the technique of choice for the scale of the particles to be studied or in view of their media, such measurements can be referred to as D50.

Depending on their composition and/or on the processes they undergo (e.g., milling, recycling, burnishing etc.), the coating particles can be hydrophobic with different degrees, if any, of hydrophilicity. As the balance between the hydrophobic and hydrophilic nature of the particles may shift with time, the process is expected to remain efficient if the hydrophobic nature of the particles predominates. In the present disclosure such particles are said to be hydrophobic or substantially hydrophobic. It is envisaged that the particles will be carried by either a gaseous or a liquid fluid when they are sprayed onto the imaging surface or upon the intermediate applicator(s). When the particles are suspended in a liquid, in order both to reduce cost and minimize environmental pollution, it is desirable for the liquid to be aqueous. In such a case, it is desirable for the polymer used to form the particles to be hydrophobic, so that blowing a gas stream over the coating will both serve to dislodge and/or entrain particles not in direct contact with the imaging surface and to dry the coating on the imaging surface, at least partially.

It is possible to apply to the substrate 20 an effect similar to foil blocking, where the printed image transferred to the substrate has metal-like reflectivity. This may be achieved using particles that are metallic or metal-like (e.g., made of a polymeric or ceramic material having a metallic appearance) and are coated with a clear thermoplastic polymer. Because of the manner in which metallic particles are produced (commonly by milling), they tend to be flat platelets and though not essential this enables highly reflective coatings of near mirror quality to be achieved. Such particles lend themselves to being burnished or polished which may be carried out while they are on the imaging surface 12 either by the use of high pressure during the spraying or by a burnishing roller. Though not shown in the drawing, a burnishing roller may be positioned downstream of the spray heads or other particle applicator. Burnishing is of particular advantage when operating the spray head(s) of the coating apparatus at relative low pressure and/or when including an intermediate applicator. A burnisher may be positioned in the same housing as previously described or in a separate housing. Burnishing of the monolayer of particles is advantageously carried out, when desired, before the coating reaches the imaging station, i.e. while the particles are still on the imaging surface, but this need not be necessarily be the case as some printing system may benefit from burnishing of the particles following their transfer to the substrate. Burnishing may be carried out with a dry roller or with a wet roller (e.g., impregnated and/or washed with the particles' vehicle, for instance water). In the event an intermediate applicator is used, it may, in addition to applying the particles to the imaging surface, also at least partly burnish them.

The outer surface of the optional burnishing roller may rotate at a linear speed different than that of the imaging surface of the drum and/or of the outer surface of an intermediate applicator, if present. It can rotate in the same or counter-direction relative to the drum.

The Particle Carrier

The particle carrier, that is to say the fluid within which the coating particles are suspended, may be either a liquid or a gas. If liquid, the carrier is preferably water based and if gaseous the carrier is preferably air. In the interest of economy, surplus particles extracted (e.g., sucked) from the interior of the plenum of a housing may be recycled to the supply and/or applicator device.

The Imaging Surface

The imaging surface 12 in some embodiments is a hydrophobic surface, made typically of an elastomer that can be tailored to have properties as herein disclosed, generally prepared from a silicone-based material. The silicone-based matrix and layer therefrom may have any thickness and/or hardness suitable to bond the intended particles. The suitable hardness is to provide a strong bond to the particles when they are applied to the imaging surface 12 in the coating station 14, the bond being stronger than the tendency of the particles to adhere to one another. It is believed that for relatively thin imaging surfaces (e.g., 100 μm or less), the silicone-based material may have a medium to low hardness; whereas for relatively thick imaging surfaces (e.g., up to about 1 mm), the silicone-based material may have a relatively high hardness. In some embodiments, a relatively high hardness between about 60 Shore A and about 80 Shore A is suitable for the imaging surface. In other embodiments, a medium-low hardness of less than 60, 50, 40, 30, 20 or even 10 Shore A is satisfactory. In a particular embodiment, the imaging surface has a hardness of about 30-40 Shore A, a lower hardness believed to be preferable for spherical particles. The hardness is of at least 5 Shore A.

The hydrophobicity enables the tacky film created by exposing the particles to radiation to transfer cleanly to the substrate without splitting. A surface is said to be hydrophobic when the angle formed by the meniscus at the liquid/air/solid interface, also termed wetting angle or contact angle, exceeds 90°, the reference liquid being typically distilled water. Under such conditions, which are conventionally measured using a goniometer or a drop shape analyzer and can be assessed at a given temperature and pressure of relevance to the operational conditions of the coating process, the water tends to bead and does not wet, hence does not adhere, to the surface.

Advantageously, an imaging surface suitable for use with a printing system herein disclosed can be flexible enough to be mounted on a drum, appropriately extendible or inextensible if to be mounted as a belt, have sufficient abrasion resistance and/or resilience, be inert to the particles and/or fluids being employed, and/or be resistant to any operating condition of relevance (e.g., irradiation, pressure, heat, tension, and the like).

In particular, the composition forming the outer coat of the imaging surface, hereinafter the release layer, can be able to absorb radiant energy at the wavelength of the laser emitting elements. For instance, if the radiation is emitted in any portion of the near infrared (NIR) range within about 800-2,000 nm, then the release layer preferably absorbs over at least such portion of the NIR spectrum. In such case, the heating up of the imaging surface outermost layer can assist in the softening of the particles disposed thereupon, sufficient heating rendering the particles suitably tacky so as to transfer to a printing substrate upon impression. As previously mentioned, in some embodiments, the desired tackiness can be achieved by using particles comprising a polymer and/or a pigment being tuned to the wavelengths of the laser elements of the imaging device, so as to directly heat up and soften upon exposure to the laser, and by selecting a suitable imaging surface.

Advantageously, when desired tackiness is to be promoted, enhanced or achieved by proper selection of the imaging surface, the material forming the outer coat of the surface is such that it may absorb over a relatively wide range of laser wavelengths, compatible with different types of particles, each eventually having a different sub-range, even minute ones, of laser absorbance. Carbon black (CB), which has a broad absorption and is a strong absorber in the NIR region, can be used to provide desired corresponding properties to the absorbing layer of the imaging surface. Incorporation of carbon black into silicone-based layers may also contribute to the thermal conductivity of the imaging surface and allows to modulate it, if and as desired. Silicone-based elastomers comprising CB particles and methods of preparing the same are detailed in the following sections.

The imaging surface 12 in the drawing is the outer surface of a drum 10, which can be either directly cast thereupon or mounted as a sleeve separately manufactured. This, however, is not essential as it may alternatively be the surface of an endless transfer member having the form of a belt guided over guide rollers and maintained under an appropriate tension at least while it passes through the coating station. Additional architectures may allow the imaging surface 12 and the coating station 14 to be in relative movement one with the other. For instance, the imaging surface may form a movable plan which can repeatedly pass beneath a static coating station, or form a static plan, the coating station repeatedly moving from one edge of the plan to the other so as to entirely cover the imaging surface with particles. Conceivably, both the imaging surface and the coating station may be moving with respect to one another and with respect to a static point in space so as to reduce the time it may take to achieve entire coating of the imaging surface with the particles dispensed by the coating station. All such forms of imaging surfaces can be said to be movable (e.g., rotatably, cyclically, endlessly, repeatedly movable or the like) with respect to the coating station where any such imaging surface can be coated with particles (or replenished with particles in exposed regions).

The transfer member, whether formed as a sleeve over a drum or a belt over guide rollers, may comprise in addition to the imaging surface, on the side opposite the release layer, a body. The transfer member body may comprise different layers each providing to the overall transfer member one or more desired property selected, for instance, from mechanical resistivity, thermal conductivity, compressibility (e.g., to improve "macroscopic" contact between the imaging surface and the impression cylinder), conformability (e.g., to improve "microscopic" contact between the imaging surface and the printing substrate on the impression cylinder) and any such characteristic readily understood by persons skilled in the art of printing transfer members.

The imaging surface may harbor more than the release ability it can provide to the irradiated tacky thermoplastic particles to transfer and the radiation related functionality (e.g., radiation absorbing properties) which can facilitate the process of rendering tacky the particles selectively subjected to irradiation. The imaging surface can, for instance, be made of a material providing sufficient conformability, integrating the "conformable layer", or "conformational layer", to its "release layer" and "radiation absorbing layer" functionalities. Conversely, the latter two functions may be provided by two distinct layers, the release layer (which will be in contact with the particles) and an underneath radiation absorbing layer. Thus, an imaging surface can be a single/unique layer encompassing at least both release and radiation derived functions, optionally supplemented by conformational ability during impression. Alternatively, the imaging layer may be formed from at least two distinct layers selected from the group comprising release layers, radiation absorbing layers and conformable layers. In the event, the imaging surface consists of the three aforementioned types of layers (named by their predominant function), then it may be preferred to have them ordered such that the release layer may contact the particles, the radiation absorbing layer would be next (reducing the distance with the particles on the imaging surface outer side) and the conformational layer would be last, this layer being typically attachable or attached to a support. The support, as mentioned, can be rigid (e.g., the surface of a drum or any like mechanical part) or flexible (e.g., the body of a belt).

Furthermore, the transfer member can be substantially transparent or opaque, with respect to the wavelengths of the source of energy imparted thereto. As laser beams having a relatively wide range of emissions may be preferred, a transfer member is advantageously "transparent" or "opaque" over a similar range. Assuming for instance, a laser emitting in the range of 800 nm to 2,000 nm or a portion thereof, this radiation source being positioned on the "rear side" of the transfer member opposite to the imaging surface, a "transparent" member would allow sufficient progression of such beam from the rear side across member thickness, or at least until such beam reaches the radiation absorbing layer of the transfer member, over at least the same portion of the range. Conversely, an "opaque" member would block or reduce such beam progression to an extent the radiation absorbing layer can no longer enable softening of the particles to a point they are tacky enough for transfer. It is to be noted that a transfer member that is opaque when irradiated from its rear side, can be transparent when subjected to irradiation from the imaging surface side, which may also be referred to as the front side. Differing index of refraction between layers of the transfer member may also determine the transfer characteristic of such member. The characteristics of transparent and opaque transfer members, their respective transparency or lack thereof being considered in the context of irradiation from the rear side, are discussed in more details below.

Opaque Transfer Member

Figure 6:
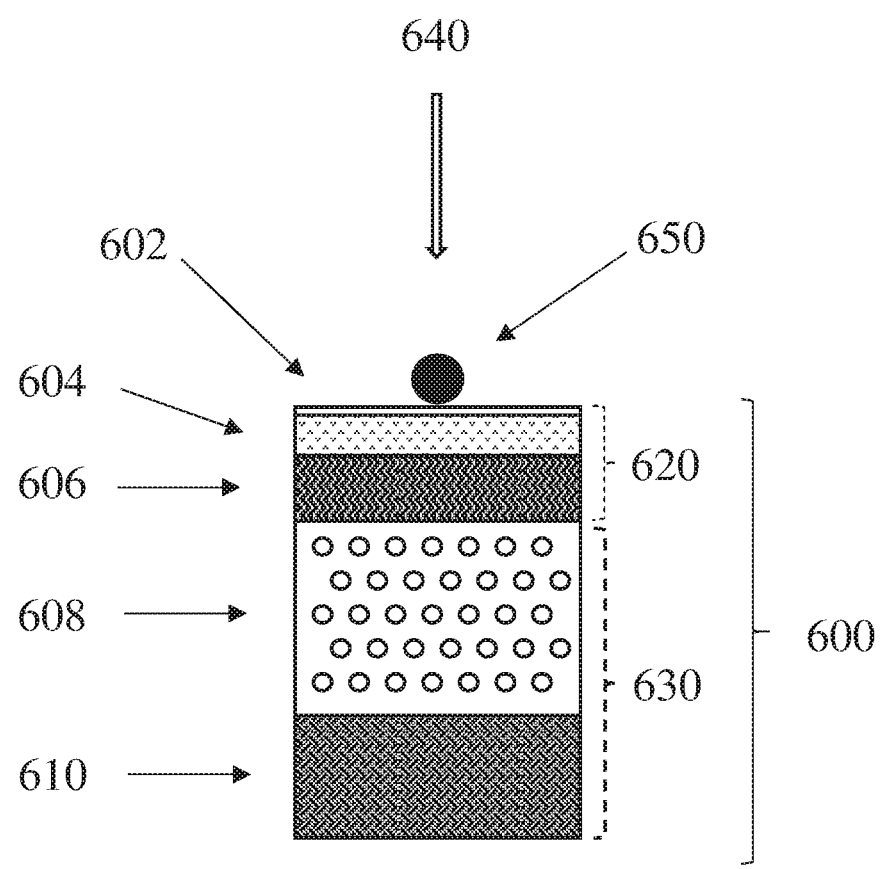
FIG. 6 is a schematic representation of a transfer member "opaque" to radiation of laser emitting elements, which can be used in printing systems according to some embodiments of the invention, as illustrated in FIG. 1 and FIG. 2.

An opaque transfer member 600 is schematically illustrated in FIG. 6 by way of an exemplary cross-section through its layers. For convenience, a source of irradiation 640 and a single particle 650, which for clarity are not drawn to scale, are shown to illustrate how transfer member 600 can be used in a printing system according to some embodiments of the invention. In the figure, the uppermost layer 602 represents a release layer capable of transiently retaining the particles until they are selectively softened for release, 604 represents a layer capable of harvesting the radiation to enable the particles softening (e.g., a radiation absorbing layer), 606 represents a conformational layer capable of facilitating contact between the release layer and particles thereupon and the topography of the surface of the printing substrate during transfer at an impression station, 608 represents a compressible layer capable of facilitating contact between the transfer member and the printing substrate and 610 represents a support layer for all the afore-said layers which can jointly form a desired opaque transfer member 600.

As explained, though illustrated in FIG. 6 as distinct layers, the imaging surface 12 can be formed of a single imaging layer 620 integrating the functions of layer 602 and 604 or the functions of layers 602, 604 and 606, the remaining layers forming the body 630 of the opaque transfer member 600. Generally the hardness of the imaging layer 620 and or of its constituting layers, if separate, is relatively low. In some embodiments, each of 602, 604, 606, and 620 may have a hardness of 50 Shore A or less, 40 Shore A or less, 30 Shore A or less and 20 Shore A or less; and of at least 5 shore A.

A release layer 602 can have, in some embodiments, a thickness of 3 μm or less, of 2 μm or less, or between 0.5 μm and 1.5 μm.

A release layer 602 can be made of any material capable of providing sufficient adhesion to native (non-tacky) particles and enough release to particles softened by irradiation to selectively transfer. High release elastomers provide a variety of suitable candidates, including but not limited to liquid silicone resins (LSR), room temperature vulcanization (RTV) silicones, polydialkyl siloxanes (PDAS), including for instance polydimethyl siloxanes (PDMS) silicones, which can be, if needed, further functionalized by desired reactive groups (e.g., amine groups, vinyl groups, silane or silanol groups, alkoxy groups, amide groups, acrylate groups etc., and combinations thereof, as known in the art of silicones) to produce functionalized silicones. As used herein the term "silicone" is used broadly to include such functionalized silicones, unless explicit or evident to the contrary. While generally encompassed by the term "silicone", such functionalized silicones may also be referred to as "silicone-based" polymers. Some functions can be cross-linkable moieties, while others may provide different desired properties to the elastomer. Additionally, the function of the elastomer is non-reactive and can be based on atoms such as fluor. These elastomers can be classified into addition-curable silicones and condensation-curable silicones, some chemical families enabling both curing methods. Advantageously, in some embodiments, a release layer can additionally reduce or prevent parasitic transfer. The release layer 602, of an opaque transfer member 600, is preferably devoid or substantially devoid of fillers that may interfere with the activity of the CB particles of the radiation absorbing layer 604, over the range of radiation to which a transfer member formed therefrom would be subjected. A similarly "passive" behavior is likewise desirable for a release layer 702 of a transparent transfer member 700. A release layer may, in some embodiments, additionally benefit rom non-scattering properties.

Non-limiting examples of addition-curable silicone (ACS) include LSR and addition-curable RTV, PDAS and PDMS silicones, whether or not further functionalized. ACS elastomers are cross-linked to form a matrix in the presence of cross-linkers and any such agent (e.g., a platinum catalyst) promoting the bridging of the polymers, any and all such agents being termed herein "addition curing" agent(s). In one embodiment, the ACS is a vinyl-functionalized silicone, which may be cured in the presence of at least one addition-curing agent, under any curing conditions suitable for said materials.

Non-limiting examples of condensation-curable silicones (CCS) include condensation-curable RTV, PDAS and PDMS silicones, whether or not further functionalized. CCS elastomers can be cross-linked to form a matrix in the absence of additional cross-linkers, such effect being provided by suitable moieties or functional groups on the silicone backbone. In some embodiments, condensation curing may further require a catalyst (e.g., a tin catalyst) and any such agent promoting the condensation of suitable moieties of the polymers, any and all such agents being termed herein "condensation curing" agent(s). In one embodiment, the CCS is a silanol-functionalized silicone, in a particular embodiment a silanol-terminated silicone. The silanol functionalized CCS may be cured in the presence of at least one condensation-curing agent, under any curing conditions suitable for said materials. In one embodiment, the CCS is a reactive amino-silicone. Addition curing agents and condensation curing agents respectively suitable for the curing of ACS and CCS elastomers are known and need not be further detailed herein. Likewise curing conditions for such materials are known to the skilled person and may, if needed, readily be optimized for any particular use by routine experimentation.

Presence of catalysts can be detected by trace analysis of tin (for CCS) or platinum (for ACS) by known analytical methods, e.g., by Inductively Coupled Plasma Spectroscopy (ICP).

A radiation absorbing layer 604 can have, in some embodiments, a thickness of 25 μm or less, or between 2 μm and 20 μm, or between 2 μm and 10 μm.

A radiation absorbing layer 604 can be made of any powder or elastomeric material capable of absorbing the radiation emitted by the laser elements of the imaging device, generating enough heat and/or for a sufficient duration so as to satisfactorily transfer heat to the imaging surface and the particles thereupon. Preferably, the materials forming such layer, and more generally the transfer member, allow the heat generated by the application of energy by the imaging device to dissipate rapidly enough for the heating of the thermoplastic particles to be time and/or spot specific (e.g., enabling the formation of a desired pixel). Elastomers having a high absorbing ability (e.g., >0.1 Abs/μm) in the range of relevance, such as black silicone rubbers, are considered advantageous from a manufacturing standpoint. The same silicone resins as described for the release layer (e.g., ACS or CCS silicones, whether or not functionalized) may be used, these silicones being now supplemented with an IR absorbing material such as carbon black and like compounds. In one embodiment, a radiation absorbing layer can be made of PDMS loaded with either carbon black, carbon nanotubes, silicon carbides, iron oxides, laser dyes and the like.

A conformational layer 606 can have, in some embodiments, a thickness between 100 μm and 150 μm, or between 120 μm and 150 μm, or between 130 μm and 140 μm.

A conformational layer 606 can be made of any suitable elastomer, including for instance the afore-mentioned LSR, RTV, PDAS and PDMS silicones, whether or not further functionalized.

In embodiments where the imaging surface 12 is formed by separate release layer 602, radiation absorbing layer 604 and conformational layer 606, each of the layers is preferably made of an elastomer and composition compatible with the elastomeric composition of the adjacent layer. Layers' compositions are deemed compatible when the materials composing a first layer do not prevent or otherwise affect the formation or function of an adjacent second layer. By way of example, layers prepared either by addition-curing or by condensation-curing are more likely to be compatible with layers prepared by the same curing method. If transfer members are to include a layer prepared by addition-curing and a neighboring layer prepared by condensation-curing, then such layers would be separated by a blocking layer preventing the mutual negative effects of one on the other.

Layer compositions can be further compatible if materials composing a first layer can positively interact with materials composing a second layer, by way of example, if the compositions of the two adjacent layers can promote some cross-linking at their interface facilitating their attachment one to another. This latter aspect of compatibility is however not essential, since distinct layers can be attached one to another by way of suitable adhesives or priming compositions. For transparent transfer members, the adhesive compositions capable of bonding adjacent layers are preferably transparent. In some embodiments, the distinct layers forming the imaging surface are made of silicones of the same chemical family, even if different compounds of the same family are used. For instance, a number of layers can comprise cross-linkable PDAS or PDMS silicones which may however vary in cross-linkable functionalization, number of cross-linkable functional groups or molecular units, molecular weight, hardness and any such parameter generally characterizing such polymers.

In embodiments where the imaging surface 12 is in the form of a single/unique imaging layer 620 combining 602 and 604, such imaging layer 620 can have, in some embodiments, a thickness between 5 μm and 25 μm, or between 5 μm and 20 μm, or between 5 μm and 10 μm. In embodiments where the imaging surface 12 is in the form of a single/unique imaging layer 620 combining 602, 604 and 606, such imaging layer 620 can have, in some embodiments, a thickness between 100 μm and 150 μm, or between 120 μm and 150 μm, or between 130 μm and 150 μm. Such a layer would incorporate the materials suitable for its "constituent" layers in similar amounts or proportions, as described above for some embodiments of the invention.

Reverting to the body of an opaque transfer member, a compressible layer 608 can have, in some embodiments, a thickness between 300 μm and 400 μm, or between 300 μm and 350 μm, or between 300 μm and 320 μm. The compressibility such layer can provide to the opaque transfer member 600 is typically of at least 50 μm, at least 100 μm, at least 150 μm, or at least 200 μm. The compressibility, in some embodiments, need not exceed 250 μm, of the transfer member total thickness.

A compressible layer 608 can be made of any suitable compressible elastomer, such as providing a sponge- or foam-like structure.

A compressible layer provides for at least part of the desired compressibility of a transfer member which improves transfer of tacky particles to the substrate. As mentioned, a compressible layer may improve the contact between the imaging layer and the substrate by adapting the imaging surface to inherent topographical variations of the substrate. In some embodiment, the compressibility of a compressible layer is at least 10% under a load of P=2 bars.

A compressible layer is made of any suitable compressible material or compressible combination of materials, having mechanical and optionally thermal properties suitable for the operability of the transfer member. In some embodiments, a compressible layer comprises (or even consists of) a material selected from the group consisting of room temperature vulcanization RTV and RTV2, liquid silicone LSR, Vinyl Methyl Silicone (VMQ), Phenyl Silicone Rubber (PMQ, PVMQ), fluorosilicone rubber (FMQ, FMVQ), alkyl acrylate copolymer (ACM), ethylene propylene diene monomer (EPDM) rubber, nitrile rubber, void-comprising hydrogenated nitrile butadiene rubber, S-cured and/or peroxide cured rubbers, open-cell rubbers, saturated open-cell rubbers, closed-cell rubbers and combinations thereof. In some embodiments, the rubber is a nitrile rubber having 40-60% (by volume) small voids. In some embodiment, the nitrile rubber is a void-comprising hydrogenated nitrile butadiene rubber (HNBR).

While in some embodiments, the afore-mentioned layers 602, 604, 606, 620 and 608 can be mounted or casted on a rigid support (e.g., a drum), in an alternative embodiment such support can be a flexible one. In such case, illustrated in FIG. 6, a support layer 610 can have, in some embodiments, a thickness between 250 μm and 350 μm, or between 250 μm and 300 μm, or between 250 μm and 270 μm.

In an alternative embodiment, the opaque transfer member can be devoid of a compressible layer. In such case, the compressibility desired at an impression nip can be provided by an element external to the transfer member. By way of example, a transfer member lacking a compressible layer can be used in association with an impression cylinder or any other pressure roller having such a layer as an outer compressible surface.

Examples of Imaging Surfaces

The imaging surfaces prepared according to the above principles were hydrophobic surfaces made of an elastomer comprising silicone polymers cross-linked by addition curing. When combining, in addition to release and conformational properties, radiation absorbing capabilities, the elastomeric composition forming this outer surface included an absorbing 3 material or absorbing filler able to absorb radiation (e.g., radiation from laser beams) and to transfer heat generated thereby to the imaging surface with sufficient efficiency so as to soften the thermoplastic particles positioned thereupon to an extent they are rendered tacky enough to selectively transfer to a printing substrate. Exemplary fluid compositions for an imaging surface including such a radiation absorbing layer were formulated by dispersing carbon black (CB) in compatible silicone-based polymers as detailed herein-below.

As appreciated by a person skilled in the art of elastomer formulation, a "compatible" set of materials for any particular composition or formulation means that the presence of any such compatible compound does not negatively affect the efficacy of any other compound for any step of preparation or in the final composition. Compatibility can be chemical, physical or both. For instance, a surfactant suitable to disperse carbon black into a curable silicone fluid would be compatible both with the carbon black material and with the silicone polymers to be cured (as well as with any other agent required to perfect such curing; all collectively generally termed the "silicone media"). While in the description provided below, several dispersing methods are disclosed, these are not meant to be limiting. Suitable equipment may include an ultrasonic disperser, a sand mill, an attritor media grinding mill, a pearl mill, a super mill, a ball mill, an impeller, a dispenser, an horizontal agitator KD mill, a colloid mill, a dynatron, a three-roll mill and a press kneader, to name a few.

Carbon Black

It is believed that a variety of CB materials may be suitable, among other functions, as an absorbing material for an imaging surface according to the present teachings. By selecting or adjusting the content of oxygen atoms on the surface of the carbon atoms to amount within a range of 5 to 20 atomic percent, and/or by selecting or adjusting the content of volatile components in the carbon black to constitute from about 10% to 25% by weight of the powder, the dispersibility of the CB and/or the stability of the dispersion may be appreciably improved. A stably dispersed CB may facilitate the preparation of an imaging surface or an absorbing layer so as to obtain a substantially uniform absorbing capacity over the entire surface thereof, even if absorbance may occur in fact underneath the outermost surface and nominal absorbance varies along the depth/thickness of the transfer member. An even behavior of the transfer member (e.g., to absorb radiation, to absorb thermal energy, to transfer heat, etc.) is desirable to achieve quality printing.

The term "atomic %" for the surface oxygen relates to the ratio of the number of oxygen atoms (O) to the number of carbon atoms (C): (O/C)×100% existing on a surface of the carbon black particles (including at any detectable depth in an interior portion of the particle). Generally such values are provided by the CB manufacturers, but can be independently determined by known methods such as X-ray photoelectron spectroscopy (XPS), Fourier transform infrared spectroscopy (FTIR), organic elemental analysis, or electron spectroscopy for chemical analysis (ESCA).

A CB material can be oxidatively-treated to increase the atomic % of oxygen on its surface. Examples of suitable oxidizing agents, whether gaseous or liquid, include ozone, hydrogen peroxide, nitric acids, and hypochlorous acids. The carbon black can be oxidized, for instance, with ozone or an ozone-containing gas at ambient temperature. There are also methods of wet oxidation in which the carbon black is exposed to a hypohalous acid salt, including, for instance, sodium hypochlorite and potassium hypochlorite.

By way of example, a typical preparation involves mixing the carbon black powder with hypohalous acids or salts thereof, preferably in an aqueous medium, and stirring the mixture for 1-24 hours at a temperature of room temperature to about 90° C., elevated temperatures of 50° C. or more being advantageous. The powder is then separated from the slurry, washed to remove unreacted oxidizing agent and allowed to dry. The degree of oxidation may be controlled by adjusting the concentration of the oxidizing agent, the ratio of the carbon black particles to the oxidizing agent, the oxidation temperature, the oxidation time, the stirring speed, and the like. The amount of oxygen on the CB surface (whether oxidatively-treated or not) is preferably 5 atomic % or more, 7.5 atomic % or more, or 10 atomic % or more, from the viewpoint of dispersion suitability.

Examples of a carbon black having an amount of oxygen of less than 5 atomic %, which may therefore benefit from being oxidatively-treated to be rendered suitable, include carbon black manufactured by a known method such as the contact method, furnace method, or thermal method.

Specific examples of such low surface oxygen CB include Raven® 5750, Raven® 5250, Raven® 2000, Raven® 1500, Raven® 1250, Raven® 1200, Raven® 1190 ULTRAII, Raven® 1170, Raven 1255, Raven 1080, Raven® 1060, and Raven® 700 (all manufactured by Columbian Chemicals Company), Regal® 400R, Regal® 330R, Regal® 660R, Mogul® L, Black Pearls® L, Monarch® 700, Monarch® 800, Monarch® 880, Monarch® 900, Monarch® 1000, Monarch® 1100, Monarch® 1300, and Monarch® 1400 (all manufactured by Cabot Corporation), Color Black FW1 (pH 3.5, BET surface area 320 $m^2/g$), Color Black 18, Color Black S150, Color Black S160, Color Black S170, Printex® 35, Printex® U, Printex® V, Printex® 140U, Printex® 140V, NIPex® 180-IQ, NIPex® 170-IQ (all manufactured by Evonik Degussa Corporation), No. 25, No. 33, No. 40, No. 45, No. 47, No. 52, No. 900, No. 2200B, No. 2300, No. 990, No. 980, No. 970, No. 960, No. 950, No. 850, MCF-88, MA600, MA 7, MA 8, and MA 100 (all manufactured by Mitsubishi Chemical Corporation).

The carbon black having an amount of surface oxygen of 5 atomic % or more may be, in addition to being prepared by oxidative treatment as mentioned, a commercially available product. Specific examples thereof include Color Black FW2 (amount of volatile material 16.5 wt. %, OAN 155 cc/100 g, pH 2.5, BET 350 $m^2/g$, PPS 13 nm), Colour Black FW 182 (amount of surface oxygen: 12 atomic %, amount of volatile material 20 wt. %, OAN 142 cc/100 g, pH 2.5, BET 550 $m^2/g$, PPS 15 nm), Colour Black FW 200 (amount of surface oxygen: 12 atomic %, amount of volatile material 20 wt. %, OAN 160 cc/100 g, pH 2.5, BET 550 $m^2/g$, PPS 13 nm), NIPex® 150 (amount of volatile material 10 wt. %, OAN 120 cc/100 g, pH 4.0, BET 175 $m^2/g$, PPS 25 nm), Special Black 4 or 4A (amount of volatile material 14 wt. %, OAN 100-115 cc/100 g, pH 3.0, BET 180 $m^2/g$, PPS 25 nm), Special Black 5 (amount of volatile material 15 wt. %, OAN 130 cc/100 g, pH 2.5, BET 240 $m^2/g$, PPS 20 nm), Special Black 6 (amount of surface oxygen: 11 atomic %, amount of volatile material 18 wt. %, OAN 170 cc/100 g, pH 2.5, BET 300 $m^2/g$, PPS 17 nm), all foregoing available from Orion Engineered Carbons Co., Ltd; Raven® 5000 Ultra II or Ultra III (amount of volatile material 10.5 wt. %, OAN 95 cc/100 g, pH 3.0-3.5, BET 583 $m^2/g$, PPS 8 nm; manufactured by Columbian Chemicals Company), and Fuji Jet Black (amount of surface oxygen: 12 atomic %; manufactured by Fuji Pigment Co., Ltd.). Information regarding different properties of these exemplary Carbon Blacks were provided by their respective manufacturers.

The level of oxidation of the CB material can be estimated by Raman spectroscopy (e.g., using LabRAM HR Evolution, Horiba Scientific). This technique allows determining the D-band and G-band peaks of the compound under study for predetermined excitation laser wavelengths (e.g., in the range of 488 nm to 647 nm), laser powers (e.g., 40 mW) and integration times (e.g., of 10 s to 120 s). Temperature can be controlled to reduce black noise (e.g., by cooling the detector). The Raman peak intensities can be obtained, an integrated software further allowing baseline correction. It is then possible to compute the Raman peak intensity ratio of the D-band and G-band, respectively $I_D$ and $I_G$. The spectral behavior and resulting band ratio ($I_D/I_G$) can be empirically correlated with the level of oxidation of the elemental carbon materials. A relatively low D-band to G-band ratio indicates that the CB is less oxidized than a CB having a relatively higher D-Band to G-Band ratio, all other structural properties of the CB being similar. By way of example, an $I_D/I_G$ ratio of 0.8 or more, 1.0 or more, 1.2 or more, indicates that the CB material is relatively oxidized as desired in some embodiments of the invention. Such Raman spectra can be unaffected in the bands of interest by some elastomer matrices (notably PDMS), so that the method advantageously provides a non-destructive technique to assess CB characteristics within a cured composition.

The content of the CB particles in the imaging surface may advantageously be sufficient to achieve the desired radiation absorption, heat transfer, selective tackiness of the particles, which effects may in turn depend on a variety of operating conditions of a printing system in which such transfer member would be used. Typically, the carbon black is present in the layer forming the imaging surface or in the radiation absorbing layer at a concentration between 0.5% and 20% by weight of the cured layer, or from 1 wt. % to 15 wt. %, or from 2 wt. % to 10 wt. %, or from 1 wt. % to 7.5 wt. %, or from 5 wt. % to 20 wt. %, or from 10 wt. % to 20 wt. %, or from 15 wt. % to 20 wt. %. For uses other than the preparation of transfer members for printing systems, the desired amount of CB in the elastomer matrix may vary according to the desired effect. By way of example concentrations as low as 0.01 wt. % to 3 wt. % or even in the range of 0.05 wt. % to 1.5 wt. % may suffice to confer electrical conduction to the matrix, assuming the bulk CB material is suitable to provide such an electrical conduction.

The pH of an aqueous dispersion of the CB, as determined at 25° C., can preferably be in an acidic to around neutral range, for instance from pH 2.0 to pH 8.5, from pH 2.5 to pH 7.5, and advantageously, in a relatively acidic range from pH 2.0 to pH 5.5, or from pH 2.0 to pH 4.5, or from pH 2.5 to pH 4.0, or from pH 2.0 to pH 3.5. The pH of a CB dispersion of pre-determined concentration can be measured with any suitably calibrated pH-meter equipment, for instance, according to ISO 787-9. Briefly, a 4 wt. % CB dispersion (in 1:1 distilled water:methanol) can be stirred for 5 minutes with a magnetic stirrer at about 600-1,000 rpm, whilst the pre-calibrated pH electrode is immersed in the tested dispersion. The reading of the pH value is taken one minute after switching off the stirrer.

A dibutyl phthalate (DBP) absorption value of the CB material is not particularly limited, but is typically from about 50 mL/100 g to about 200 mL/100 g, or from 100 mL/100 g to 200 mL/100 g, or from 150 mL/100 g to 200 mL/100 g. Generally such DBP values, or similar Oil Absorption Numbers (OAN), are provided by the CB manufacturers, but can be independently determined by known methods such as according to JIS K6621 A method or ASTM D 2414-65T.

Carbon black particles can be further characterized by specific surface area measurements, the most prevalent methods including cetyltrimethylammonium bromide adsorption (CTAB), iodine adsorption and nitrogen adsorption. The CTAB method is described in ASTM D 3765. The iodine method is described in ASTM D 1510, and results in the assignment of an iodine number.

A specific surface area of the CB material is not particularly limited, but when determined by BET nitrogen absorption techniques, is preferably from 50 $m^2/g$ to 650 $m^2/g$, or from 100 $m^2/g$ to 550 $m^2/g$. Generally such BET values are provided by the CB manufacturers, but can be independently determined by known methods such as according to ASTM D3037.

The substantially even dispersion/uniform absorbing capability described herein-above, can be facilitated by using CB in the formed layer having an average particle size of less than one micrometer. Such dimensions are preferred not only with respect to primary particle size (PPS), but also for secondary particle size (SPS), which may result from agglomeration of such primary particles. Particles, both primary and secondary, having an average particle size of less than half the wavelength of the emitted beam are further preferred, as scattering is accordingly reduced. Hence, CB particles having an average particle size of less than 500 nanometers, less than 400 nm, less than 300 nm or less than 200 nm are favored. CB particles having an average size, typically a primary particle size (PPS), of 100 nm or less are deemed in the nano-range, primary particles having an average size of 80 nm or less, 60 nm or less, 40 nm or less, or 30 nm or less, being particularly preferred for close particle packing. Generally, the CB particles have an average PPS of 5 nm or more, or 10 nm or more, or 15 nm or more. The size of the particles, predominantly of the primary particles, may affect their ability to closely pack within the elastomer, relatively small particles being capable of higher packing density than their relatively larger counterparts. Advantageously, a lower amount of relatively small particles may achieve a similar CB density as a higher amount of relatively large particles. Depending on their size, and additionally among other things on the viscosity of the elastomer, the conditions and duration of curing, the thickness of the layer being cured and such manufacturing factors known to the skilled person, the particles may segregate and form a gradient-like distribution across the layer thickness. Larger CB secondary particles may tend to more rapidly migrate and accumulate towards the bottom of the layer, while relatively smaller particles may follow such a trend, if at all, at a slower pace, hence remaining in relatively higher concentration in the upper section of the layer. In this context, "bottom" and "top" sections of the layer relate to their orientation during curing, and not necessarily when installed and in operation in a printing system. Such a segregation of the particles forming inner strata of particle distribution along the depth of the imaging surface may be advantageous if a sufficient thickness of the upper section becomes substantially devoid of CB particles. This "top stratum" can serve as a release layer, the absence of particles increasing its smoothness. In some cases, a relatively high smoothness of the releasing surface of the imaging layer can be desirable. Smooth surfaces generally display an arithmetical mean deviation $R_a$ of less than 1 micrometer. In some embodiments, the surface roughness $R_a$ of the imaging surface is less than 0.5 μm, or less than 0.2 μm, or less than 0.1 μm.

Manufacturers generally provide the average primary particle size of the CB material, as assessed for instance according to ASTM D 3849. Particle size distribution, whether assessed by DLS or microscopic techniques, may provide information on the primary particle size (PPS) of the material and on its secondary particle size (SPS), i.e. the size of assembly of primary particles forming for instance agglomerates.

The CB particles may have any suitable aspect ratio, i.e., a dimensionless ratio between the smallest dimension of the particle and the longest dimension in the largest plane orthogonal to the smallest dimension. In some embodiments, the carbon black primary particles are approximately spherical and can have an aspect ratio in the range of 0.2:1 to 1:5, or 0.5:1 to 1:2. Secondary particles of CB which may agglomerate therefrom are not necessarily spherical, still their aspect ratio can be in the range of 0.1:1 to 1:10, 0.2:1 to 1:5, or 0.5:1 to 1:2.

Though not essential, the carbon black primary particles may preferably be uniformly shaped and/or within a symmetrical distribution relative to a median value of the population. In some embodiments, the carbon black secondary particles are within a relatively narrow particle size distribution, such narrow PSD being advantageously maintained in the cured silicone elastomer.

First Exemplary Procedure

Grinding Step

A silicone surfactant having good heat stability and compatibility with dimethyl silicone fluids was poured into a spinning tree-roll mill grinding machine (Model JRS230, manufactured by Changzhou Longxin Machinery Co. Ltd.), and operated for up to about one hour, at room temperature (circa 23° C.). The speed was adapted to the viscosity of the paste as the milling process proceeds, such that the speed was in the range 100-800 rpm. One such surfactant was a functional pendant amine/dimethyl silicone copolymer having an amine number of 8 and a viscosity at 25° C. of about 3700 cSt (GP-342, Genesee Polymers Corporation) which was added in an amount of 375 grams (g) so as to constitute 37.5% by weight of the total composition (wt. %). Carbon Black nano-powder (Colour Black FW 182, Orion Engineered Carbons, CAS No. 1333-86-4, 20 wt. % volatile matter, pH 2.5, 550 $m^2$/g BET Surface, PPS 15 nm) was dried for at least two hours at 120° C. 250 g of the dried CB powder were slowly added to the silicone fluid, such amount of CB constituting 25 wt. % of the final composition. It is to be noted that while the CB material is defined as being in the nano-range due to its primary particle size of about 15 nm, the powder initially mixed with the surfactant mainly consisted of larger agglomerates, aggregates or chunks of CB having size of above 5 µm or even greater than 10 as estimated by microscope techniques. The CB-surfactant mixture was milled until the CB powder was sufficiently size-reduced to be homogeneously dispersed in the silicone fluid and a black, high viscosity mass was obtained. Such size reduction (as well as any other step of the process) was performed under a controlled temperature environment at a temperature suitable to the most heat-sensitive of the materials employed. In the present case, amino silicones set such threshold of heat-sensitivity, loosing their activity at temperatures of about 70° C. or more. Hence the size-reduction step involving the amino silicone surfactant was performed under controlled temperature of about 50° C. The CB primary particles formed approximately spherical agglomerates and the average size (e.g., diameter) of such CB secondary particles following this step was of about 200-400 nanometers, as estimated by image analysis of the cured layer later obtained under light microscope. A top view picture was captured by scanning electron microscope (SEM; FEI Magellan™ 400 operated in tunneling mode) and at least 10 particles deemed by a trained operator to represent the majority of the CB population, such particles forming a representative set, were measured. Without wishing to be bound by any particular theory, it is believed that amine groups of the amino-silicone surfactant bind to carboxy moieties of the carbon black, sufficiently enveloping the CB particles so as to reduce or prevent their agglomeration. Carbon black need not necessarily be functionalized with organic carboxylic acid, as oxygen absorbed on its surface behaves in a similar manner.

A mixture of vinyl functional polydimethyl siloxane (Polymer XP RV 5000, Evonik® Hanse, CAS No. 68083-18-1) containing a small amount of the same GP-342 surfactant (9:1 ratio by weight, respectively) was separately prepared with a high-shear homogenizer (T 50 digital Ultra-Turrax® equipped with R50 stirring shaft, IKA®-Werke GmbH) operated for about twenty minutes at a controlled temperature of 20° C. and at 10,000 rpm. It is believed that the presence of additional surfactant in the curable fluid prevents or reduces migration of this amine silicone polymer from the carbon particles to the vinyl functional PDMS, which diffusion, if overly extensive, could cause undesired agglomeration/aggregation/flocculation of the carbon black particles. The mixture comprising the vinyl functional PDMS was added to the black mass in an amount of about 375 g, so as to provide the remaining 37.5 wt. % of the composition. The addition was performed in step-wise fashion under continuous milling at the same conditions, until the black mass turned into a high-viscosity, shiny black paste (typically within 1 hour) having a high concentration of carbon black.

Dilution Step

In order to increase the fluidity of the black paste (25 wt. % CB) and facilitate spontaneous self-leveling after coating, the black silicone paste prepared as above-detailed was diluted to a concentration of 5 wt. % CB or less. Dilution was performed with a "Silicone premix" which was prepared as follows: a vinyl-terminated polydimethylsiloxane 5000 cSt (DMS V35, Gelest®, CAS No. 68083-19-2) in an amount of about 50 wt. %, a vinyl functional polydimethyl siloxane containing both terminal and pendant vinyl groups (Polymer XP RV 5000, Evonik® Hanse, CAS No. 68083-18-1) in an amount of about 21.4 wt. %, and a branched structure vinyl functional polydimethyl siloxane (VQM Resin-146, Gelest®, CAS No. 68584-83-8) in an amount of about 28.6 wt. %, were mixed by the high-shear T 50 digital Ultra-Turrax® homogenizer operated at a controlled temperature of 20° C. and at 10,000 rpm for about twenty minutes.

The concentrated black paste was mixed with the silicone premix to reduce the CB concentration to 5 wt. % CB, as follows: GP-342 was added to the silicone premix so that their respective concentrations were 8 wt. % and 72 wt. % of the final diluted composition. The concentrated black paste was added so as to constitute 20 wt. % of the diluted composition, all these additions being performed under continuous stirring with a high-shear homogenizer (T 50 digital Ultra-Turrax®-IKA) at a controlled temperature of 20° C. and at 10,000 rpm. The stirring was maintained for approximately two hours until the diluted black PDMS silicone mixture was homogeneous (e.g., no black chunks or aggregates were observed). Different final concentrations of carbon black were similarly prepared by accordingly adjusting the quantities of the afore-mentioned stock fluids or pastes.

Curing Step

A diluted black PDMS silicone mixture as above-prepared can be rendered curable by the addition of: at least one catalyst, typically in an amount of about 0.0005 wt. % to 0.2 wt. %, or about 0.05 wt. % to about 0.2 wt. % of the total curable composition, at least one retardant or curing inhibitor to better control the curing conditions and progression, typically in an amount of about 0.1 wt. % to 10 wt. %, or from about 1 wt. % to 10 wt. % and finally, at least one reactive cross-linker, typically in an amount of about 0.5 wt. % to 15 wt. %, or from about 5 wt. % to 15 wt. %, the addition of the reactive cross-linker initiating the addition curing of the black PDMS mixture.

The above-described 5 wt. % CB diluted black PDMS silicone mixture was rendered curable by the addition of: a platinum catalyst, such as a platinum divinyltetramethyl-disiloxane complex (SIP 6831.2, Gelest®, CAS No. 68478-92-2) in an amount of about 0.1 wt. %, a retardant, such as Inhibitor 600 of Evonik® Hanse, in an amount of about 3.7 wt. %, and finally, a reactive cross-linker, such as a methylhydrosiloxane-dimethylsiloxane copolymer (HMS 301, Gelest®, CAS No. 68037-59-2) in an amount of about 8.7 wt. % of the total curable composition.

This addition-curable composition was shortly thereafter applied upon the desired mechanical support (e.g., upon a transparent or non-transparent body) with an automatic film applicator (Model: BGD281, Shanghai Jiuran Instrument Equipment Co., Ltd.) operated at 5-100 mm/s draw-down speed, the layers so applied forming predetermined thicknesses in the range of 5-200 micrometers.

As an example of a transparent body, a sheet of polyethylene terephthalate (PET, 100 & 150 micrometer thickness from Jolybar Ltd.) was used, such support being optionally pre-treated (e.g., by corona or with a priming substance) to further the adherence, to its support, of the material including the radiation absorbing layer. Corona treatment, when applied to the body, included an exposure of about 20 minutes to UV-irradiation (UltraViolet Ozone Cleaning System T10X10/OES/E, supplied by UVOCS® Inc.). A priming substance, when used to pre-treat the body, can comprise 2.5 wt. % tetra n-propyl silicate (CAS No. 682-01-9, Colcoat Co.), 2.5 wt. % vinyltrimethoxysilane (such as Dynasylan® VTMO, Evonik®), 5 wt. % titanium diisoproposy (bis-2,4-pentanedionate) (such as Tyzor AKT855, Gelest®), 2.5 wt. % platinum-divinyl tetramethyl (CAS No. 68478-92-2, such as SIP 6831.2, Gelest®) all in pure methanol AR (CAS No. 67-56-1, Bio-Lab Ltd.). The priming substance can be applied by wiping the surface of the recipient layer/body with a clean laboratory fabric soaked with the priming fluid.

Transparent supports can be made of any optically clear suitable material (e.g., silicones such as polysiloxanes, polyethylenes, such as polyethylene terephthalate (PET) and polyethylene naphthalate (PEN), polyacrylates, such as poly (methylacrylate) (PMA) and poly(methyl methacrylate) (PMMA), polyurethanes (PU), polycarbonates (PC), polyvinyls, such as polyvinyl chloride (PVC), polyvinyl alcohol and polyvinyl acetate, polyesters, polystyrenes including acrylonitrile-butadiene-styrene copolymer, polyolefins (PO), fluoro-polymers, polyamides, polyimides, polysulfones or the like, copolymers thereof or blends thereof. A material is said to be optically clear if it allows light to pass through the material without being scattered (ideally 100% transmission). While transparency is generally assessed with respect to visible light, in the present context a material would be suitably transparent if having a transparency/transmission of at least 85%, at least 90% or at least 95% to the wavelengths of relevance to the emitting beams used in any particular system. Transparency can be assessed by measuring the optical transmittance of a predetermined thin sample of the material (e.g., a flat square having edges of 1 cm and a thickness of 0.2-2 mm, or more if desired for elements external to the transfer member) using a spectrophotometer, over the wavelength range of relevance. A refractive index (RI) of about 1.35 to 1.45 indicates an optically clear/transparent material. Each layer of a transparent transfer member through which radiation should progress should have similar or same RI values and/or transparency properties, so as to constitute a multi-layered transfer member having preferably even such characteristics across its thickness. Such properties are considered similar if within ±5%, or within ±2%, or even within ±0.5%.

The refractive index (RI) of materials is generally provided by the manufacturers, but can be independently assessed by methods known to the skilled person. For fluid materials (e.g., uncured/pre-cured silicones) methods such as described in ASTM D1218 may be suitable, while solid materials can be tested according to ASTM D542.

As explained, when using a transparent transfer member and rear-side irradiation, a compressible element external to the transfer member can be used instead of an internal compressible layer. In such case, the compressible element needs to be transparent at least to the same extent. Transparent supports, layers thereof, or external elements, preferably have a yellowness index of 1 or less.

The black polydimethyl siloxanes mixture, whether applied on a pre-treated body or on a non-pre-treated body, was cured for two hours at 70° C. in a ventilated oven (UT 12 P, Thermo Scientific Heraeus® Heating and Drying Ovens), followed by one hour post-curing at 120-140° C. to achieve a full cure and stable bonding of the layer to the support.

It is to be noted that the suitability of an amino-silicone polymer to disperse CB in size-reduced form in a silicone matrix is unexpected, in particular when the CB material is relatively polar. As a rule, dispersions of carbon black nanoparticles in silicones are difficult to achieve even when the particles and the silicone media have similar polarities. Such particles tend to agglomerate with one another, rather than remaining homogeneously dispersed in their primary particle size or any relatively small secondary particle size that would have been achieved by the dispersing step. To resolve this issue, conventional manufacturing methods aim to increase the relative polarity of the silicone media, using therefore condensation-curable silicone polymers and associated reagents, condensation curing being the mode of preparation of such CB-containing silicones.

In contrast, in the present example according to teachings of the invention, such dispersion of CB particles was achieved while using addition curing of the PDMS silicones and counter-intuitively using amino-silicones as a dispersant. The obtained environment, which is relatively non-polar, was expected to be "adverse" to relatively "size-stable" dispersions of CB. It should be additionally noted that the use of amino silicones is deemed counterintuitive because their amine moieties, when unbound and thus free to interact, are known to prevent or otherwise deleteriously affect addition-curing of the silicone matrix. Hence, the inventors have found a delicate balance concerning the amount of amino silicone present during the preparation of a CB-loaded silicone matrix. On the one hand, the amount should be enough to envelop the CB particles and prevent, reduce or delay their agglomeration/aggregation; on the other hand, an excess amount should be avoided to prevent, reduce or delay any deleterious effect on addition curing that such unbound amino silicones may have. A suitable concentration of amino silicones may depend on the type of CB particles and silicone media, as well as on the relative concentrations of the carbon black and curable silicone. This concentration may be determined by routine experimentation. In some embodiments, the weight-per-weight ratio between the carbon black and its dispersant (e.g., amino silicone, silicone acrylate etc.) is from 0.4:1 to 2:1, from 0.7:1 to 1.8:1, or 0.9:1 to 1.6:1, or approximately 1:1 or 1:1.5.

Amino silicones having a relatively low number of amine moieties (correlating with a low amine number) may be advantageous in achieving this balance. Mono-amines may be preferred, in particular when the amine moiety is terminally positioned. Without wishing to be bound by any particular theory, it is believed that once attached to carbon black, a terminal mono-amine is hindered and thus unavailable to negatively affect curing.

The surprising efficacy of the amino silicone was further corroborated with the preparation of a first comparative formulation similar to the above, in which the amino silicone was replaced by a dispersant of a different chemical family known for its expected suitability with CB: a polyglycerin-modified silicone KF-6106, supplied by Shin-Etsu Chemical Co. This conventional surfactant failed to satisfactorily disperse the CB particles of the present formulation.

In a second comparative example, a commercially available concentrated CB paste (Akrosperse 20-MI-005, 50% wt CB, Akrochem Corporation) was mixed with the same ACS PDMS (DMS V35) in respective amounts yielding a 5 wt. % final CB concentration. The CB paste was used as supplied, without addition of any surfactant of any type. The mixture was dispersed using the spinning tree-roll mill similarly operated. Following this control process, the CB displayed relatively large aggregates (~0.5-1.5 as microscopically assessed), which were at least two-fold larger than the secondary particles formed using the present formulation and method.

Following the same rationale concerning the prevention of carbon black self-agglomeration/self-aggregation (through formation of a surfactant's envelop), it was found that in addition to amine functions of amino silicones, acrylate functions of silicone acrylates can achieve similar CB dispersion. Exemplary silicone acrylates were formulated in a PDMS matrix as above-detailed, with minor modifications, such as the amount of the carbon black being of only 3 wt. % instead of previously described 5 wt. %. KP-578 supplied by Shin-Etsu Chemical Co., Tego® RC 711 (~1% acrylate) and Tego® RC 902 (~4% acrylate), supplied by Evonik® Industries, achieved satisfactory CB dispersion at the tested CB concentration.

In the case of silicone acrylates, an acrylate content of at least 0.5 wt. % in the silicone surfactant is believed to be satisfactory, higher contents of more than 5 wt. % being deemed preferable. It is believed that higher amount of an active moiety of a surfactant on any given backbone may allow reducing the amount of surfactant necessary for the dispersion of same amount of CB particles. The content of acrylate in the silicone surfactants is typically provided by their suppliers, but can be determined by standard measuring procedures.

Second Exemplary Procedure

While the afore-mentioned method of preparing a radiation absorbing layer or an imaging layer including the same, such layers able to later form an imaging surface, was substantially devoid of added volatile organic solvents, the following alternative procedure makes use of such liquids. Such solvents, when compatible with the intended silicone fluid, may facilitate some stages of the layer preparation or application to recipient layers or supports, a relatively high volatility being advantageous in reducing or eliminating the presence of these solvents in a final transfer member.

In the present example, 50 g of CB (Colour Black FW 182, Orion Engineered Carbons) were mixed with 50 g of amino silicone surfactant (BYK LP X 21879, having an amine number of about 35, BYK Additives & Instruments) in 200 g of xylene AR (having a boiling point of about 138.4° C., CAS No. 1330-20-7, Bio-Lab Ltd.). As in previous example, the CB powder was dried for at least two hours at 120° C. before being mixed with the silicone surfactant. The dispersion was carried out in an attritor bead mill (Attritor HD-01, Union Process®) with stainless steel beads of about 4.76 mm (SS 302³⁄₁₆ inch beads, Glen Mills Inc.) at 700 rpm until the CB particles reached an average SPS (e.g., as assessed by D50) of less than 100 nm, generally of about 70 nm, which typically required about 1.5-2.5 hours, depending on the batch size. The size reduction was performed under controlled temperature of 50° C. The size distribution was then assessed by DLS (Malvern Zetasizer Nano S) on a sample comprising about 0.1 wt. % of CB and the surfactant-dispersed CB particles were found to be in the nano-range (having a $D_v10$ of about 48 nm, a $D_v50$ of about 74 nm, and a $D_v90$ of about 139 nm).

The CB dispersion was added to a two-part LSR silicone fluid, the relative amount of the added dispersion depending on the desired final amount of CB in the matrix. In the present set of experiments, the CB concentrations per weight of the final matrix (i.e. excluding the volatile solvent) were about 2.4 wt. %, 4.5 wt. %, 6.5 wt. %, 8.3 wt. %, 11.5 wt. % and 14.3 wt. %. The according weight of CB dispersions (i.e. about 6 g, 12 g and so on) was added to 20 g of Silopren® LSR 2540 (Part A), gently hand mixed, then poured into 20 g of Silopren® LSR 2540 (Part B), by Momentive Performance Materials Inc. It is noted that adding the CB materials to a pre-mix of Part A and Part B of the LSR was also found to be satisfactory. The resulting CB silicone fluid was further mixed for about three minutes in a planetary centrifugal mixer (Thinky ARE-250, Thinky Corporation) operated at 2,000 rpm at ambient temperature and allowed to defoam under sole same centrifugal conditions for another three minutes. A sample was cured at 140° C. for about 2 hours. The pattern of dispersion of the CB particles in the silicone matrix was assessed by light microscopy as previously detailed and found stable over the curing period of the LSR components.

To facilitate the application of the afore-mentioned CB dispersed LSR silicone fluid, the stock was diluted in excess volatile solvent, xylene in the present case, typically at a weight per weight ratio of at least 1:4, for instance at 1:9 wt./wt. The CB particles in the diluted silicone matrix appeared to remain stably dispersed, as assessed by light microscopy.

The diluted CB-LSR-xylene suspension was applied to a smooth releasable support (e.g., non-treated PET sheet) by spray coating using an air pressure brush. Alternative application methods are possible (e.g., rod coating and the like). While partial curing of the silicone matrix may proceed at 120° C. (taking about 0.5-1 hour, depending on layer thickness), such step can be accelerated by raising the temperature (e.g., reducing curing duration to about 20 minutes if cured at 140° C.). A clear silicone layer (due to serve as a conformational layer) was then cast on top of such a partially cured radiation absorbing layer/imaging layer. One such silicone overcoat was a two-component clear liquid silicone, QSil 213, commercially available from Quantum Silicones. The resulting PET-supported layers were further partially cured at about 100° C. for approximately 1-2 hours. The PET support was then peeled away and the two layers inverted so as to have the CB-loaded radiation absorbing layer facing up and the clear conformational layer facing down, the latter layer being then attached to the desired support (e.g., a transparent support) by any suitable method. In some embodiments, the attachment of such layers to the support contributed to the completion of the curing of the imaging surface.

This alternative procedure allows the preparation of a silicone matrix having a relatively high load of carbon black particles, such particles having the advantage, as in the previously described method, of being in the sub-micron range and even predominantly in the nano-range.

Third Exemplary Procedure

While the afore-mentioned methods of preparing a radiation absorbing layer, or an imaging layer including the same, were based on addition-curing of cross-linkable addition curable silicones, the present procedure alternatively involves condensation-curing of cross-linkable condensation-curable silicones.

In a first step, the CD material was dried (at least two hours at 120° C. then size reduced in the presence of a silicone surfactant. In the present example, 50 g of CB (Colour Black FW 182) were mixed with 50 g of amino silicone surfactant (BYK LP X 21879) in 100 g of hexamethyldisiloxane (HMDSO; having a boiling point of about 101° C., CAS No. 107-46-0, Sigma-Aldrich Co. Ltd.). The dispersion was carried out for 4 hours in an attritor bead mill with stainless steel beads of about 4.76 mm (as previously described) at 700 rpm until the CB particles reached an average SPS (e.g., as assessed by D50) of about 90 nm, as assessed by DLS. The size reduction was performed under controlled temperature of 20° C.

The size distribution was then assessed by DLS (Malvern Zetasizer Nano S) on a sample comprising about 0.1 wt. % of CB and the surfactant-dispersed CB particles were found to be in the nano-range (having a $D_V10$ of about 52 nm, a $D_V50$ of about 91 nm, and a $D_N90$ of about 211 nm).

In a second step, the CB dispersion was added to a silanol-terminated polydimethyl-siloxane, the relative amounts of the added dispersion depending on the desired final amount of CB in the matrix. In the present set of experiments, the CB concentrations per weight of the final matrix were about 5.5 wt. %, 12.5 wt. % and 21.4 wt. %. The according weight of CB dispersions (i.e. 40 g, 80 g and 120 g) was added to silanol-terminated PDMS (DMS S-27, 700-800 cSt, Gelest®) in respective amounts of 160 g, 120 g and 80 gr. The resulting CB silicone fluid was mixed for about ninety minutes in the attritor under the same conditions (700 rpm and 20° C.) resulting in a black mass of condensation-curable PDMS.

To 9 g of CB-dispersed in the curable silicone, were added 1 g of cross-linker (ethylpolysilicate PSI023, Gelest® or ethylsilicate 48, Colcoat) and 0.05 g of tin catalyst (dioctyl tin bis(acetylacetonate) Tin Kat® 223, CAS No. 54068-28-9, TIB). The curable mixture was degased and applied to a desired support. Prior to the application of the degased mixture, a transparent PET was pretreated with ozone and coated with a priming layer (SS4120, Momentive). The silicone layer was applied by a rod wire at predetermined thicknesses of up to about 40 μm (including layers of 5 μm and 20 μm) and allowed to cure at ambient conditions (circa 23° C. and 30-60% RH) for about 12-24 hrs. The partly cured structure was transferred to an oven for 2 hrs at 120-140° C., for post-curing. The pattern of dispersion of the CB particles in the condensation-cured silicone matrix was assessed by light microscopy as previously detailed and found stable.

While silicones comprising CB are commercially available, attempts to size reduce their CB contents to such desired particle size ranges have so far proven difficult. In a comparative example, a commercially available concentrated CB paste (Akrosperse 20-MI-005, 50% wt CB, Akrochem Corporation) was mixed with the same CCS PDMS (DMS S-27) in respective amounts yielding a 5 wt. % final CB concentration. The CB paste was used as supplied, without addition of any surfactant of any type. The mixture was dispersed using the spinning tree-roll mill operated as described in the first experimental procedure. Following this control process, the CB displayed relatively large aggregates (~0.5-1.5 μm, as microscopically assessed), which were, as previously observed with the ACS control, at least two-fold larger than the secondary particles formed using the present formulation and method.

Without wishing to be bound by any particular theory, it is believed that the conventional formulations lack CB particles having suitable properties, and/or appropriate amounts and/or suitable agents able to prevent the reagglomeration of primary particles that may be transiently obtained during any such milling.

Optical Measurements

Some optical properties of the radiation absorbing layers or imaging surfaces prepared by the above-described methods were assessed. Unless otherwise stated, the sample of interest was cast on a smooth support, such as a glass slide, and leveled by rod coating to a known thickness and cured, the cured layer having generally a thickness of at least 2 μm, as established by confocal microscopy.

The cured layer was gently separated from its casting support and placed in a film holder suitable for subsequent measurements. The optical absorbance of such samples was measured with a spectrophotometer over a range of at least 300 nm to 1200 nm (Cary 5000, UV-Vis-NIR spectrophotometer from Agilent Technologies). The drop in absorbance between the two sides of the film was normalized to the thickness of the tested samples and the absorbance of such layers per micrometer of thickness (Abs/μm) was calculated. Representative results at selected wavelengths, for layers including CB particles dispersed with amino silicone surfactants, are presented in the table provided below in which the values reported for the matrices loaded with carbon black relate to the effect of the sole CB particles (the baseline values of the respective matrices being excluded).

TABLE 1

| No. | Sample | Abs/μm @ 300 nm | Abs/μm @ 500 nm | Abs/μm @ 700 nm | Abs/μm @ 900 nm | Abs/μm @1100 nm |
|---|---|---|---|---|---|---|
| 1 | 2.5 wt. % CB in PDMS | 0.293 | 0.093 | 0.069 | 0.056 | 0.048 |
| 2 | 5.0 wt. % CB in PDMS | 0.479 | 0.188 | 0.138 | 0.109 | 0.091 |
| 3 | 7.5 wt. % CB in PDMS | 0.692 | 0.291 | 0.204 | 0.158 | 0.129 |
| 4 | Control: 10 wt. % CCB in PDMS | 0.290 | 0.102 | 0.090 | 0.087 | 0.085 |

TABLE 1-continued

| No. | Sample | Abs/μm @ 300 nm | Abs/μm @ 500 nm | Abs/μm @ 700 nm | Abs/μm @ 900 nm | Abs/μm @1100 nm |
|---|---|---|---|---|---|---|
| 5 | Ref: 0 wt. % CB in LSR | 0.00103 | 0.00149 | 0.00137 | 0.00150 | 0.000135 |
| 6 | 2.4 wt. % CB in LSR | 0.067 | 0.041 | 0.029 | 0.021 | 0.018 |
| 7 | 4.5 wt. % CB in LSR | 0.196 | 0.106 | 0.074 | 0.056 | 0.047 |
| 8 | 6.5 wt. % CB in LSR | 0.439 | 0.224 | 0.156 | 0.117 | 0.096 |
| 9 | 8.3 wt. % CB in LSR | 0.651 | 0.326 | 0.222 | 0.165 | 0.133 |
| 10 | 11.5 wt. % CB in LSR | 0.681 | 0.379 | 0.261 | 0.195 | 0.159 |
| 11 | 14.3 wt. % CB in LSR | 0.733 | 0.413 | 0.285 | 0.214 | 0.172 |
| 12 | 5.5 wt. % CB in S27 | 0.549 | 0.226 | 0.167 | 0.135 | 0.114 |
| 13 | 12.5 wt. % CB in S27 | 0.577 | 0.271 | 0.214 | 0.172 | 0.147 |

As can be seen in the above table, CB particles dispersed according to the various methods herein disclosed provided comparable absorbing properties per micrometer depth of layer, such absorbance generally decreasing as the wavelengths increased. In the above, the methods of preparation and resulting layers were exemplified with three types of silicone polymers, two types of curing method and two types of amino silicones, see items 1-3 for addition curing of ACS PDMS, items 6-11 for addition curing of ACS LSR and items 12-13 for condensation curing of CCS PDMS. These examples also represent different types of interactions between the silicone surfactants and the CB particles. Amino silicone surfactants are expected to form acid-base relationship or amine-epoxy interactions. Silicone acrylate surfactants are believed to form dipole:dipole interactions.

All items representing exemplary embodiments of silicone matrix embedded dispersions of CB particles prepared according to the present teachings, formed clear samples (i.e., lacking haziness/turbidity), as assessed by visual inspection. Such results support the compatibility of the silicone surfactants with the curable silicone elastomers, including their miscibility therein. Such compatibility can also be preliminarily assessed in a screening method of such materials, performed in the absence of carbon black particles.

For comparison, similar silicone matrices prepared in the absence of CB particles according to the present teachings displayed an insignificant to null baseline absorbance, of about 0.001 Abs/μm or less, over the same range of wavelengths, see item 5 for LSR matrix, the PDMS matrices behaving similarly whether cured by addition-curing or by condensation-curing. The impact of the CB nanoparticles dispersed according to present teachings can be seen from the positive correlation between the wt. concentration of CB in the silicone matrix and the absorbing capacity of the layer over the tested range. Based on the present set of results peak or plateau of absorbance for each particular formulation are expected at carbon loading of at least 10 wt. %, at least 15 wt. % or possibly at carbon loading of more than 20 wt. %. Such CB concentration dependent patterns can readily be established by the skilled person, whom can elect desired CB loading as per peak of optimal activity and/or intended use. For all practical purposes, it is believed that carbon black presence in curable or cured silicone compositions needs not exceed 30 wt. %, being often of no more than 25 wt %.

Reverting to the table, in a control experiment, see item 4, a comparative layer was prepared in which the same carbon black material was milled and incorporated in a PDMS matrix similarly to items 1-3, the method however lacking any amino silicone dispersant. In the resulting layer, the CB particles were therefore of a more conventional size, in the range of 0.5-1.5 μm. This conventional CB (CCB) material was embedded in the PDMS matrix at a relatively high concentration of 10 wt. %. Despite such high load, the CCB control provided a poorer absorption relatively to lower concentrations of CB particles prepared according to some embodiments of the invention. In this experiment, the 10 wt. % CCB in PDMS was found comparable to the 2.5 wt. % CB in PDMS, see items 4 and 1, respectively. Therefore, the present methods and formulations are approximately 4-fold superior, with respect to the amount of CB particles providing similar absorbance.

A support layer 610 for an opaque body typically includes an elastomer reinforced by any suitable solid reinforcement material, such as particles or fibers which can act as mechanical 3 tillers, or a fabric impregnated with such an elastomer. Solid reinforcement materials generally are in an amount not exceeding 10% by weight of such support layer. Fibers are generally in the range of about 50 to about 200 μm, while particles typically do not exceed 10 μm in average size. Though the reinforcement material may consist of, or consist essentially of, one type of solid mechanical filler, in some embodiments the body may comprise both reinforcement particles and fibers in any desired proportion.

In some embodiments, the fibers comprise a material selected from the group consisting of organic fibers, meta-aramid, para-aramid, polyamide, nylon fibers, polyester fibers, high density polyethylene fibers, natural fibers, cotton fibers, inorganic fibers, glass fibers, carbon-based fibers, ceramic fibers, metal fibers and combinations thereof.

In some embodiments, the fibers are surface-treated fibers, which surface treatment increases adhesion of the fibers. When the elastomer embedding the fibers is of silicone, vinyl silanes may, for instance, be suitable to surface-treat the fibers. When the elastomer embedding the fibers is other than a silicone polymer, for instance of polyurethane, then isothiocyanate silane or polyol silane can be suitable to surface-treat the fibers. Such examples are not limiting, materials suitable to treat fibers being known and in no need of being further detailed herein.

In some embodiments, the fibers constitute a fabric. In some embodiments, the fabric has a thickness of not less than 50 micrometers and not more than 200 micrometers. In some embodiments, the fabric is 1-ply or at least 1-ply, in some at least 2-ply, in some at least 3-ply, and in some embodiments at least 4-ply.

In some embodiments, fabrics made of thin fibers (e.g., of up to 1 mm thickness, or of up to 0.8 mm thickness, or of up to 0.6 mm thickness, or of up to 0.4 mm thickness, or even of up to 0.2 mm thickness) and having a relative high yarn density are desirable for obtaining a particularly smooth finished surface. The yarn density can be expressed by the number of threads in the warp and weft direction of the fabric per unit length. The number of threads in any given direction can be as low as about 10 per cm and as high as about 20 or even 30 per cm. The number of threads in each directions may be equal (e.g., 10*10) or may not be equal (e.g., 9*8, 12*10, 16*15, 17*12, 19*13, 19*12, or 19*10).

In some embodiments, the fabric is a non-woven fabric. In some embodiments, the fabric is a woven fabric.

In some embodiments, the fibers are oriented fibers. In some embodiments, the fibers are uni-directionally oriented, typically in parallel to the direction of movement of the transfer member to reduce stretching. This direction may also be termed the printing direction. In some embodiments, the fibers are bi-directionally oriented, typically some oriented in parallel (0°) and some perpendicularly (90°) to the printing direction. In some embodiments, the fibers are three-directionally oriented, typically some oriented in parallel (0°), some perpendicularly (90°) and some either at 45° or −45° to the printing direction. In some embodiments, the fibers are four-directionally oriented, typically some oriented in parallel (0°), some perpendicularly (90°), some at 45° and some at −45° to the printing direction.

In some embodiments, the fibers may be attached one to another to form an unwoven or woven fabric ply. Fibers may be woven by any suitable weaving method of interlacing warp (0°) and weft (90°) fibers. Standard patterns include plain weave (wherein each warp fiber passes alternately under and over each weft fiber); basket weave (wherein two or more warp fibers alternately interlace with two or more weft fibers); and twill weave (wherein one or more warp fibers alternately weave over and under two or more weft fibers in a regular repeated manner), including satin weave, for which the number of fibers crossed and passed under is typically above four. Plain weave advantageously permits high yarn density and smooth finished surfaces.

Depending on any of the above-mentioned parameters, a fabric may be further characterized by its weight per surface, typically expressed in grams per square meter. Fabrics having a weight per unit area between about 180 g/m² and about 1000 g/m² can be suitable for the formation of an opaque body.

Elastomers suitable to embed such solid reinforcement materials or optionally impregnate them if in the form of a fabric can be selected from the group consisting of room temperature vulcanization RTV and RTV2 silicones, liquid silicone rubber LSR, Vinyl Methyl Silicone (VMQ), Phenyl Silicone Rubber (PMQ, PVMQ), fluorosilicone rubber (FMQ, FMVQ), alkyl acrylate copolymer rubbers (ACM), ethylene propylene diene monomer rubber (EPDM), fluoroelastomer polymers (FKM), nitrile butadiene rubber (NBR), ethylene acrylic elastomer (EAM), and hydrogenated nitrile butadiene rubber (HNBR).

The elastomer elected for the support layer may additionally provide desired friction property, depending on the use to be made of the transfer member in any particular printing system. By way of example, high friction properties can be desired if the transfer member is to be mounted on a drum, while low friction properties can be preferred were the transfer member to slide on static elements. High friction properties can be provided, for example, by silicone rubbers, while FKM rubbers generally yield low friction surfaces.

As mentioned, an adhesive layer (not shown in FIG. 6), can be used to attach the layers of the transfer member. Such layers have a thickness which may depend on the roughness of the recipient layer, for relatively smooth recipient body, the adhesive layer can have a thickness typically not exceeding 10 μm. Any suitable adhesive can be used, its composition being compatible with the layers to be attached thereby. Furthermore, the adhesive layer, as any other layers of the transfer member, is preferably adapted to the s working conditions to which the transfer member is subjected in operation of the printing system.

An adhesive layer can be made of silicones, polyurethanes, and such known flexible elastomeric adhesive materials. Such examples are not limiting, materials suitable to adhere elastomers one to another being known and in no need of being further detailed herein.

Alternatively, a priming layer can be used, the composition of which depends on the layers to be bound. Such layers typically have a thickness of 1 μm or less. Suitable materials include silanes, titanates and other such sizing agents.

In some embodiments, adhesive layers or priming layers are not necessary, the attachment of one layer to another being achieved by co-curing of the two layers, at least one of which would have been previously partially cured.

An opaque transfer member 600 formed by combinations of afore-described layers, including a flexible support layer, can have, in some embodiments, a thickness between 650 μm and 900 μm, or between 620 μm and 800 μm, or between 630 μm and 640 μm. If mounted on a rigid support, such ranges may be reduced by about 250 μm.

For any of the previously described layers 604 to 630 of a, opaque transfer member 600, the penetration of the laser beam energy through the layers is less of a concern as long as the relevant range of wavelengths can sufficiently pass the release layer 602 to front-side "activate" the radiation absorbing layer 604, allowing enough heat to travel back toward the imaging surface so as to soften the particles rendering them sufficiently tacky for transfer, when desired. Therefore, while all said layers can be transparent as far as radiation progression is concerned, they are typically opaque, as customary for conventional printing blankets known in the art.

An exemplary opaque transfer member 600 was prepared as follows. An imaging surface comprising 5 wt. % CB dispersed in PDMS with an amino silicone surfactant was prepared as previously described according to the first exemplary procedure. A series of layers of about 5 μm to about 20 μm were applied with a wire rod to an opaque body consisting of a 200 μm conformational layer, a 350 μm compressible layer and a 300 μm fabric-reinforced support layer. These exemplary transfer members were used in a printing system according to one embodiment of the present invention. In an alternative experiment, the imaging surface was separately prepared on PET, inversed and adhered through the surface previously facing air to a body consisting of the same afore-mentioned layers.

Transparent Transfer Member

Figure 7:
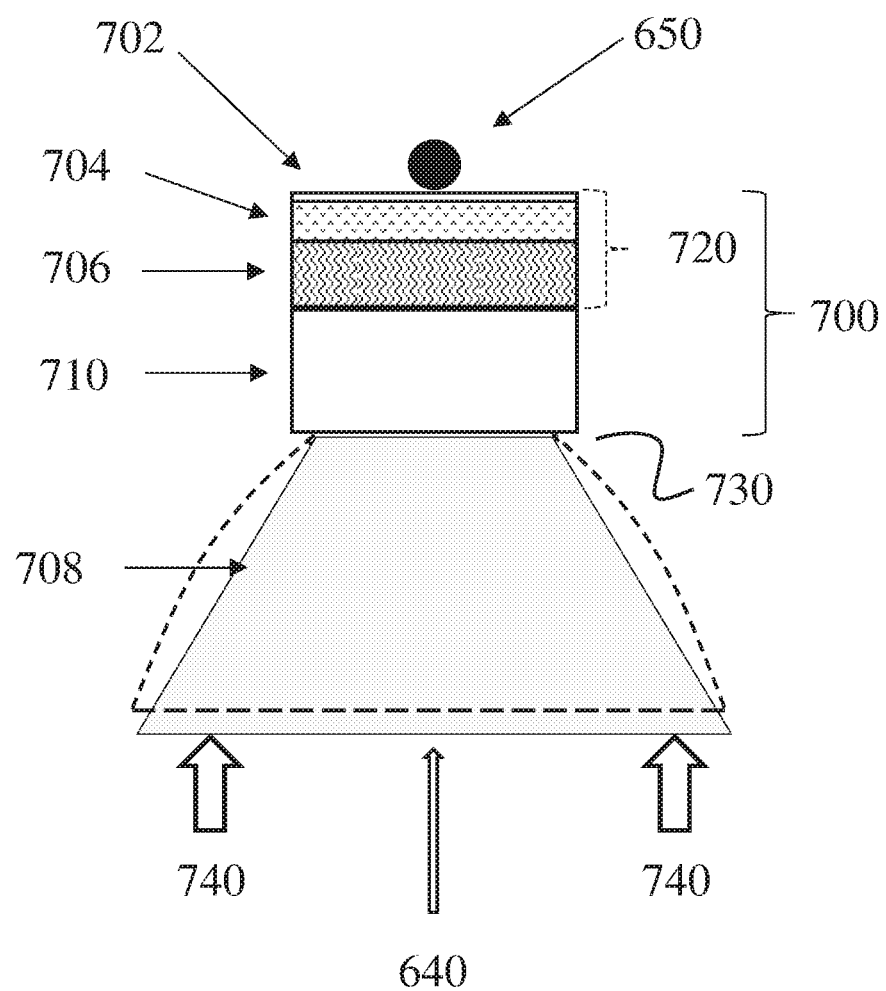
FIG. 7 is a schematic representation of a transfer member "transparent" to radiation of laser emitting elements according to some embodiments of the invention.

A transparent transfer member is schematically illustrated in FIG. 7 by way of an exemplary cross-section through its layers. For convenience, a source of irradiation 640 and a single particle 650, which for clarity are not drawn to scale, are shown to illustrate how transfer member 700 can be used in a printing system according to some embodiments of the invention. In the figure, 702 represents a release layer capable of transiently retaining the particles until they are selectively softened for release, which needs not be transparent as the layers to be below described and can in principle be similar to previously discussed 602. 704 represents a layer capable of harvesting the radiation to enable the particles softening (e.g., a radiation absorbing layer) and 706 represents a transparent conformational layer capable of facilitating contact between the release layer and particles thereupon and the topography of the surface of the printing substrate during transfer at an impression station. As explained, though illustrated in FIG. 7 as distinct layers, the imaging surface 12 can be formed of a single/unique imaging layer 720 integrating the functions of 702 and 704 or the functions of 702, 704 and 706, the remaining layer 710 representing a support layer for all the afore-said layers which can jointly form a desired transparent transfer member 700.

As for an opaque transfer member, the hardness of the imaging layer 720 of a transparent transfer member 700, or of the layers forming the imaging surface 12, if separate, can be relatively low. In some embodiments, each of 702, 704, 706, and 720 may have a hardness of 50 Shore A or less, 40 Shore A or less, 30 Shore A or less and 20 Shore A or less and of at least 5 shore A.

In contrast with the previously described layers 604 to 630 of an opaque transfer member, for which laser beam progression through the layers is less of a concern, layers 704, 706 and 710 of a transparent transfer member 700 need to allow sufficient penetration of the relevant range of wavelengths to "activate" the radiation absorbing layer 704 from the rear side of the transfer member, allowing enough heat to travel forward toward the imaging surface so as to soften the particles rendering them sufficiently tacky for transfer, when desired.

While a transparent transfer member can hypothetically include a transparent compressibility layer, materials known for their high compressibility (e.g., having a relatively porous structure) are generally opaque and would hamper sufficient progression of radiation across member thickness (hence operability of the imaging surface). Replacing such materials by transparent ones generally affects the relative compressibility of the layer, thus imposing thicker compressibility layers to obtain overall similar compressibility of the transfer member. In other words, by way of example, while an opaque compressible layer of porous structure may have a thickness of 300 µm able to compress down to 100 µm under the pressure conditions applicable at the impression station, a transparent compressible layer may require a thickness of 4 mm to enable similar compressibility of about 200 µm, assuming the transparent elastomer has approximately 5% compressibility under same conditions. Such prospective thicknesses of a transparent compressible layer may be significantly higher than all other layers combined, so that the inclusion of such a transparent compressible layer can be tolerated only if the transparent transfer member is mounted or casted on a transparent rigid support (e.g., a transparent drum or a transparent bar). However, it is believed that such thick compressible layers may negatively affect the flexibility of a transparent member based on a transparent flexible support.

Thus when considering flexible transfer members, a second difference between an opaque and a transparent transfer member, besides transparency, is the absence of a compressibility layer in the latter. In this embodiment, the compressibility function is now "external" to the transfer member, such property being provided in printing systems relying on a transparent transfer member 700 by a compressible element 708, as illustrated in FIGS. 7 and 8. In use in a printing system according to present teachings, a transparent lubricant 730 is typically used in the gap formed between the rear side of the support layer 710 and the compressible element 708. Arrows 740 illustrate how pressure forces (e.g., as applied at an impression station in a direction opposite to the arrows) may affect the shape of the compressible element 708, as schematically shown by the dotted contour. While not shown, the compressible element has a rigid backing to ensure a substantially constant distance if kept between the radiation source and the outer surface of the impression cylinder when engaged with the transfer member during impression. A release layer 702 can have, in some embodiments, a thickness of no more than 3 µm, generally between 1 µm and 2 µm.

A release layer 702 can be made of the same ACS or CCS elastomers previously detailed for the opaque transfer member. In one embodiment, a release layer 702 is made of cross-linkable PDAS and PDMS silicones, the silicone backbone bearing any moiety suitable for the desired curing method. In some embodiments, such silicones are fluorinated to any suitable extent. As for the opaque release layer 602, the release layer 702 of the transparent transfer member is preferably devoid of fillers that may negatively affect the activity of the CB particles of the radiation absorbing layer 704.

A radiation absorbing layer 704 can have, in some embodiments, a thickness of no more than 25 µm, generally between 15 µm and 20 µm.

A radiation absorbing layer 704 can be made of the same ACS or CCS elastomers previously detailed for the opaque transfer member. In one embodiment, a release layer 702 is 10 made of cross-linkable PDAS and PDMS silicones, the silicone backbone bearing any moiety suitable for the desired curing method.

A transparent conformational layer 706 can have, in some embodiments, a thickness of no more than 150 µm, generally between 100 m and 120 µm.

A transparent conformational layer 706 can be made of transparent ACS or CCS curable 15 silicones or of polyurethanes. As already discussed for release layers 602 and 702, the materials suitable for the preparation of transparent layers are preferably devoid of tillers that may reduce or prevent the absorption of the energy by the radiation absorbing layer at the operating wavelengths of the imaging device/printing system. Stated differently, the transparent conformational layer should have a refractive index identical or similar (e.g., within ±5% or even ±0.5%) to the RI of the matrix of the radiation absorbing layer (without its CB contents).

In embodiments where the imaging surface 12 is in the form of a single/unique imaging layer 720 combining 702 and 704, such imaging layer 720 can have, in some embodiments, a thickness of no more than 15 µm, generally between 1 µm and 10 µm, or between 2 µm and 5 µm. Such a layer would incorporate the materials suitable for its "constituent" layers in similar amounts or proportions, as described herein for some embodiments of the invention, materials blended for the sake of release functionality will preferably be transparent. In embodiments where the imaging surface 12 further comprises layer 706 in the single/unique imaging layer 720, such imaging layer 720 can have, in some embodiments, a thickness of no more than 100 µm.

A transparent support layer 710 can have, in some embodiments, a thickness between 400 µm and 600 µm, or 450 µm and 550 µm, or between 480 µm and 520 µm.

A transparent support layer 710 can be made of PET, thermoplastic polyurethanes (TPU), silicones or any other suitable material, such materials being preferably devoid of any filler able to interfere with the desired operability of the radiation absorbing layer.

A transparent transfer member 700 formed by combinations of afore-described layers can have, in some embodiments, a thickness between 500 µm and 1000 µm, or between 500 µm and 900 µm, or between 600 µm and 800 µm.

Though a compressible element 708 can, in some embodiments, be external to the transparent transfer member, the compressibility it should provide when combined in operation with the transfer member 700 is typically of at least 50 µm, at least 100 µm, at least 150 µm, or at least 200 µm. The compressibility, in some embodiments, need not exceed 500 µm, and is generally no greater than 400 µm or 300 µm.

A compressible element 708 can be made of silicones or polyurethanes. In some embodiments, such materials are selected to provide a similar RI as the transfer member, even if physically separated therefrom, so as to maintain a substantially uniform RI along the optical path traveled by the laser beams.

The Imaging Station

Figure 3:
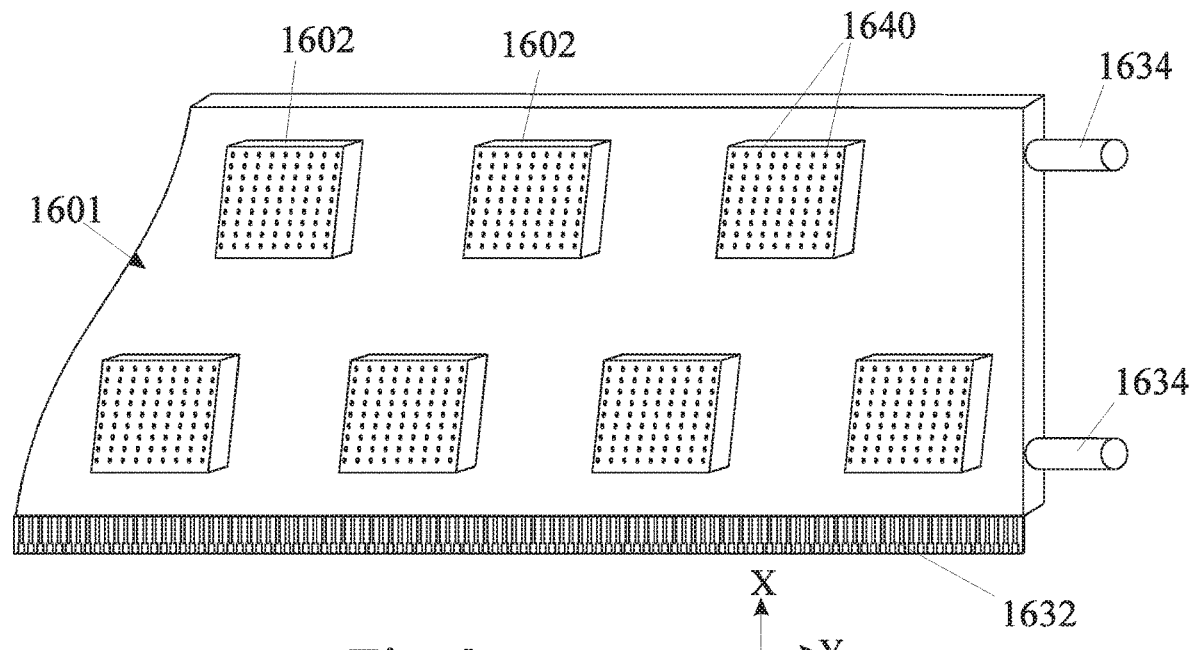
FIG. 3 shows part of an imaging device comprising a set of VCSEL chips mounted on a support, according to one embodiment.
Figure 4:
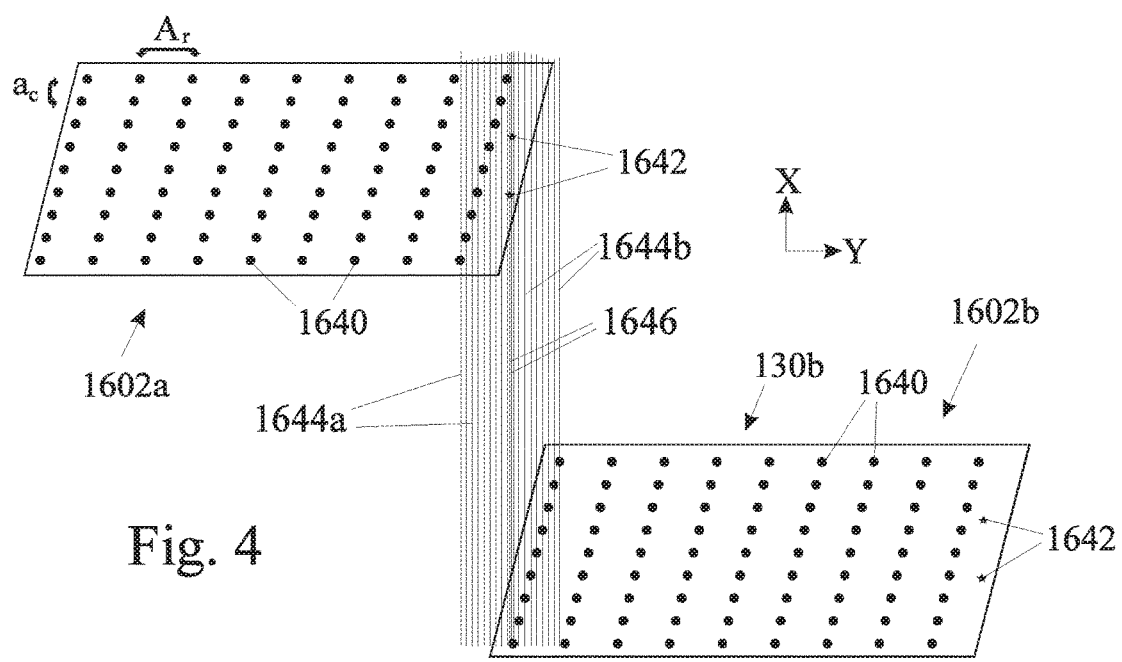
FIG. 4 is a schematic representation of the laser emitting elements of two VCSEL chips and the lines that they can trace on a relatively moving imaging surface.
Figure 5:
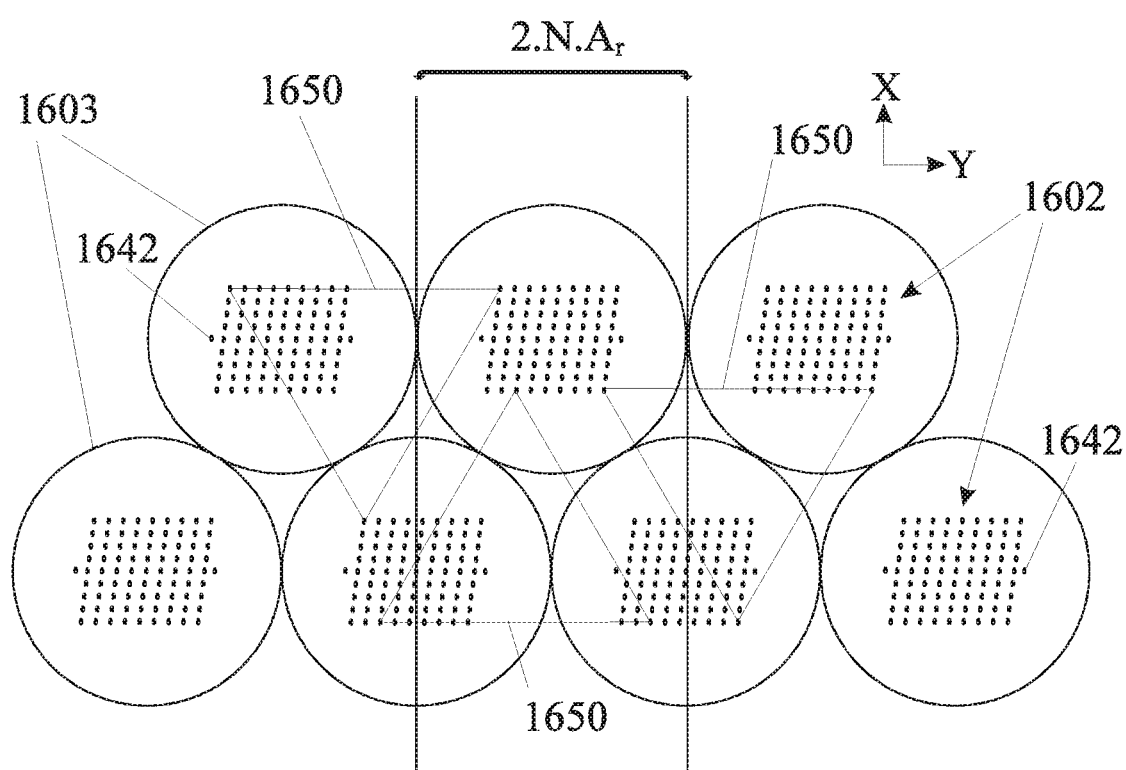
FIG. 5 is a schematic representation that demonstrates in one pair of rows the alignment between the VCSEL chips and the GRIN rods used as lenses to focus the emitted laser beams onto the imaging surface.

The imaging device 16 in FIG. 1 is composed of a support 1601 carrying an array of chips 1602 each having an arrangement of individually controllable laser sources capable of emitting laser beams. While in some embodiments, the laser beam emitting elements can be of the vertical cavity surface emitting laser (VCSEL) type, forming VCSEL chips, other types of laser sources may be equivalently utilized. By way of example certain types of lasers such as $CO_2$ type and others may be better suited for certain embodiments. However, for brevity the term VCSEL should be construed as encompassing any such laser sources. Preferably, the chips 1602 can be individually or collectively associated with an array of corresponding lenses 1603 that focus the laser beams on the imaging surface 12. FIGS. 3 to 5 provide more details on the chips according to certain embodiments of the invention and on the manner in which they can be mounted on the support and aligned with the lenses 1603.

In some embodiments, the laser beam emitting elements can be of high power, where the total power required can be of tens or hundreds of milliwatt (mW). By way of example, depending on the desired printing speed, the energy beams can provide powers of up to 10 mW, 100 mW and even 250 mW or higher. Thus thermal interaction between the elements requires careful consideration.

In some embodiments, the laser beam emitting elements can coherently emit light in a range of wavelengths from about 400 nm to about 12 µm, or up to about 10 µm, or up to about 8 µm, or up to about 3 µm, or up to about 1.4 µm. Such range includes regions generally known as Near Infra Red (NIR. ~0.75-1.4 µm, 214-400 Tz, 886-1653 meV), Short-Wavelength Infra Red (SWIR. ~1.4-3 µm 100-214 THz, 413-886 meV), Mid-Wavelength Infra Red (MWIR), also called Intermediate Infra Red (IIR, 3-8 µm, 37-100 THz 155-413 meV), and Long-Wavelength Infra Red (LWIR, 8-15 µm, 20-37 THz, 83-155 meV) also known as thermal infrared. In a particular embodiment, the laser beam emitting elements are NIR lasers.

A variety of laser beam emitting elements exist, some being more suitable for a particular range of wavelengths. By way of example, semiconductor lasers are commercially available as laser diodes capable of emitting at wavelengths from 375 nm to 3,500 nm, covering most of NIR and SWIR regions of the spectrum. Gas lasers can emit over various area of the spectrum, depending on the elected gas and some optical design. Commercial carbon dioxide ($CO_2$) lasers, for instance, can emit tens of thousands of watts in the thermal infrared region at 10.6 µm.

In FIG. 1, the imaging station 16 provides a way of selecting the regions of the particle coating applied to the imaging surface 12 that will transfer to the substrate 20 at the impression station 18. The imaging station 16 comprises a support 1601 carrying an array of 2 laser sources such as VCSEL chips 1602 that are optionally arranged in pair(s) of rows in positions that are accurately predetermined relative to one another (e.g., in a staggered manner providing laser sources suitable to target points along the entire width of the substrate, within nominal distance and tolerances of one another, and the like). Laser beams emitted by the chips 1602 are focused by lens system 1603, which may conveniently have a magnification of +1 or −1, though magnifications having an absolute value greater or lower than one (1) are also explicitly considered. The lens system may be constructed as two or more corresponding rows of GRIN (Gradient Index) rod lenses (each chip 1602, and all laser elements thereupon, being associated with a corresponding focusing lens 1603). Signals supplied to the chips for the activation of one or more laser element are synchronized with the rotation of the drum so as to allow a high resolution image to be traced on the imaging surface 12 by the emitted laser beams. The effect of the irradiation of each pixel by a laser beam is to make the particle at that pixel tacky so that it may later transfer to the substrate 20 when it is pressed against it at the impression station 18. The presence of a plurality of laser emitting elements facilitates the formation of an image comprising various pixels (picture elements) or lines thereof. The duration of activation of each laser affects the resulting size of the film transferred to the substrate surface to form a desired image, an intermittent or continuing activation of one laser element being for instance capable of respectively tracing an individual pixel or a line of pixels in the image area of an imaging surface in relative motion. Clearly in operation the laser emitting elements are switched on and off as needed to provide the required image on the imaging surface, as continuous operation of all laser beams would result in a substantially uniformly irradiated surface.

FIG. 3 shows the support 1601 on which are mounted a plurality of VCSEL chips 1602 arranged in two rows in accurately predetermined positions relative to one another, as will be described in more detail by reference to FIG. 4.

The support 1601 is a rigid and in some embodiments at least partially hollow elongate body fitted with connectors 1634 to allow a cooling fluid to flow through its internal cavity to cope with the significant amount of heat that may be generated by the chips 1602. In certain embodiments, the body of the support may be made of an electrically insulating material, such as a suitable ceramic, or it may be made of a metal and at least its surface on which the chips 1602 are mounted may be coated with an electrical insulator. This enables a circuit board made of thin film conductors (not shown in the drawing) to be formed on the surface. The chips 1602 are soldered to contact pads on this circuit board and a connector 1632 projecting from the lower edge of the support 1601 allows control and power signals to be applied to the chips 1602. The laser emitting elements 1640 of each chip 1602 are individually addressable and are spaced apart sufficiently widely to minimize thermal interference with one another.

FIG. 4 shows schematically, and to a much enlarged scale, the relative positioning of two laser emitting element arrays of chips 1602a and 1602b that are adjacent one another in the Y-direction but are located in different rows. Each of the chips has a main array of M by N laser emitting elements 1640, as previously described, which are represented by circular dots. In the example illustrated, M and N are equal, there being nine rows and nine columns. Having equal numbers of rows and columns in each chip permits the design of the optics to be optimised. The spacing between the elements in a row, designated $A_r$, and the spacing between the elements in a column, designate $a_c$, are shown as being different from one another but they may be the same. The array is shown as being slightly skewed so that the columns and rows are not perpendicular to one another. Instead, the rows lie parallel to the Y-direction while the columns are at a slight angle to the X-direction (i.e., to the rows). This enables lines, such as the lines 1644, traced by the elements 1640 on the imaging surface, if energized continuously, to be sufficiently close together to allow high resolution images to be printed. FIG. 4 shows that the element at the end of each row traces a line that is a distance $A_r/M$ away from the line traced by the corresponding element of each adjacent row, the separation between these lines being the image resolution $I_r$. Thus, assuming a magnification of |1|, $A_r$ and M are selected in dependence upon the desired image resolution, based on the equation $A_r=M\cdot I_r$. By "corresponding elements" it is meant that the individual laser emitting elements of the M·N main array should occupy the same row and/or column positions with respect to elements of adjacent columns and/or rows within their respective chips. In the context of adjacent chips, corresponding elements occupy the same row and column position within their respective main arrays.

It should be mentioned that it is possible for the elements to lie in a square array where the columns are perpendicular to the rows. In this case, the chips would need to be mounted askew on their support and compensation would need to be applied to the timing of the control signals used to energize the individual elements.

As is clear from FIG. 4, the nominal positioning of the array 1602b is such that the line traced by its bottom left element 1640 should ideally also be spaced from the line traced by the top right element of the array 1602a by a distance equal to $A_r/M$. Therefore when all the elements 1640 of both arrays of chips 1602a and 1602b are energized, they will trace 2·M·N lines that will all be evenly spaced apart by a distance $A_r/M$ between adjacent lines, without any gaps.

If one wishes to provide compensation for defective elements, the array could include additional rows of laser emitting elements 1640, but it is alternatively possible to compensate for a defective element by increasing the intensity of the laser beams generated by the laser emitting elements that trace the two adjacent parallel lines.

In addition to the M by N array of elements 1640, each chip has at least one additional column that is arranged along the Y-direction on the side of the main array, the additional column containing at least one laser beam emitting element 1642. These further elements 1642 are represented in FIG. 4 by stars, to distinguish them from the main array elements 1640. As seen in FIG. 5, in some embodiments at least two such additional columns each of one element 1642 are provided, at least one column disposed in Y direction on each side of the main M by N array. The additional laser elements 1642 of the additional columns on one or both sides of each main array, can be positioned at a distance of ½ or ⅓ the spacing between traced lines that can be imaged by the lenses onto the imaging surface. Furthermore additional elements could be placed in the gap between two arrays that nominally spans a distance of $A_r/M$ so that higher sensitivity is achieved in correcting the spacing errors between adjacent arrays.

Any additional element 1642 of an additional column can be positioned in the column at any desired distance from the edge element of the main array, the distance in the Y-direction depending on the total numbers of additional elements/ additional columns each two sets of main arrays of a pair of chips to be aligned would bound. Assuming n additional elements 1642 between a first and second main array, n being a positive integer number, each additional element can be spaced from the edge element of the main arrays or from one another in the Y-direction by a distance equal to $A_r/(n+1)$, namely the spacing of the adjacent elements in each row divided by one more than the number of additional elements in the gap. Considering the X-direction, the additional elements can either be aligned with a row of elements of their respective main arrays or positioned at any desired intermediate position above or below such rows. Preferably the positioning of an additional element 1642 with respect to adjacent elements of the main array shall minimize thermal interference. Notably, the additional element or elements may be disposed at any position along the X-direction of the chip.

In practice n elements 1642 positioned in any of the additional columns on one or both sides of the main array, can correct for alignment errors of up to about a 1/(n+1) of the nominal spacing between the edge elements of two adjacent chips. If, by way of example, the edge elements of the two chips are at a distance of 20 μm (micrometers) in the Y-direction, and there is a single additional laser emitting element on adjacent sides of each array, such elements may correct a spacing error of up to about one third of the nominal spacing, in the exemplified case approximately 7 μm. Any positional deviation from the desired position on the chip (e.g., with respect to its edges) or nominal distance between elements not exceeding 10%, is considered within tolerances, however in most cases due to the high precision of the semiconductor manufacturing methods, such errors are unlikely.

As can be seen from FIG. 4, when activated, these elements 1642 trace additional lines 1646 between the two sets of evenly spaces parallel lines 1644a and 1644b traced by the elements 1640 of the two chips 1602a and 1602b, respectively.

One of the additional lines 1646 is spaced by a distance $A_r/3M$ from the last adjacent line 1644a traced, for example, by the main array of chip 1602a in FIG. 4 and the other is spaced by a distance $A_r/3M$ from the first adjacent line 1644b traced, for example, by the main array of the chip 1602b. In the event of a misalignment between the two chips 1602a and 1602b these elements 1642 can be energized in addition to, or instead of some of, the elements 1640 of the main arrays to compensate for any misalignment between the arrays that tends to create a stripe in the printed image, be it a gap or a dark line resulting from an unintentional overlap.

While the two additional elements 1642 in the present embodiment of the disclosure are shown in FIG. 4 as tracing two separate lines 1646, the energies of these two elements can be combined on the imaging surface to form a single line of which the position is controllable by appropriate setting of the energies emitted by each of the additional elements 1646.

For the chips 1602a and 1602b in FIG. 4 to function correctly as described above, their relative position in the Y-direction is very important. In order to simplify the construction of the lens system serving to focus the emitted laser beams on the imaging surface it is advantageous to adopt a configuration shown in FIG. 5 which enables the two rows of lenses corresponding to a pair of chip rows to be self-aligning.

FIG. 5 shows arrays of seven adjacent chips 1602 each shown lined up with a respective lens 1603. Additional laser elements 1642, on each side of the main array, are also schematically illustrated in the figure. Each lens 1603 is constructed as a GRIN (Gradient-Index) rod, this being a known type of lens that is shaped as a cylinder having a radially graduated refractive index. In the case of the geometry shown in FIG. 5, the respective centers of corresponding elements of any three bi-directionally adjacent chips 1602 lie nominally on the apices of an equilateral triangle, three such triangles designated 1650 being shown in the drawing. It will be noted that all the triangles 1650 are congruent. As a result, if the diameter of the GRIN rods is now selected to equal $2 \cdot N \cdot A_r$, which is the length of the sides of the equilateral triangles 1650, or the nominal distance between the centers of corresponding laser emitting elements of adjacent VCSEL chips 1602 in the same row, then when stacked in their most compact configurations, after aligning the lens array to the Y-direction over the chips, the lenses 1603 will automatically align correctly with their respective chip. For such construction, the relationship between the rod lens diameter D, the image resolution Ir and the size of the matrix of laser elements is: $D=2Ir \cdot M \cdot N$ where Ir is the spacing in the Y-direction between adjacent lines traceable in the X-direction and M is the number of rows and N the number of columns in the main M·N array, assuming absolute magnification value of |1|. In other words, certain embodiments utilize GRIN rods with a circular cross-section of diameter D, where $D=2 \cdot Ar \cdot N$, and when packed in two rows without spacing the distance between the centers of any two adjacent GRIN rods also equals $2 \cdot Ar \cdot N$.

Though the lens 1603 has been schematically illustrated in FIG. 1 (side view) and FIG. 5 (cross section view) as being an individual GRIN rod, in alternative embodiments the laser beams of each chip can be transmitted by a series of lenses. In the simplified embodiment shown in FIG. 2, the single GRIN rod 1603 is replaced by two mutually inclined GRIN rods 1603*a* and 1603*b* and the light from one is directed to the other by a reflecting member which in the example of FIG. 2 is embodied by a prism 1603*c* of high refractive index glass, so that the light follows a folded path. It is noted that other reflecting members such as mirrors and the like may be utilized. Such a configuration enables coating stations in a colour printing system to be arranged closer to one another in a more compact configuration and allows the irradiation of the coating on the imaging surface 12 to take place nearer the nip 18 of the impression station. Such a folded light path can adopt different configurations while fulfilling all the requirements of magnification and light transmission. To enable the light path to be split in this manner, the length of the GRIN rods is preferably selected such that light beams are individually collimated on leaving the rods 1603*a* and entering the rods 1603*b* as shown by the light rays drawn in FIG. 2.

The radiation guided by GRIN rod 1603*a*, the proximal end of which is arranged at a distance $WD_o$ from the chip 1602, may be captured by the corresponding GRIN rod 1603*b* which can collect the collimated light emerging from rod 1603*a* on the same light path and focus it at a distance $WD_i$ from the distal end of the second GRIN rod 1603*b*. When the two GRIN rods are made of the same material and the same radial gradient profile and $WD_o=WD_i$ a magnification of Mo=+1 or −1 can be obtained. Notably, with straight or folded path light paths, the magnification should be considered substantially equal to its nominal value if within ±0.5% or even 1% or 2%.

In some embodiments, the intensity of the laser beam emitted by each laser element of a chip may be adjustable either continuously (in an analogue manner) or in discrete steps (digitally). In one embodiment, the chips may include D/A converters so as to receive digital control signals. In this way, the laser beam intensity may be controllably adjusted in a plurality of discrete steps, such as 2, 4, 8, 16, 32, . . . and the like, and in some embodiments individual laser beam sources may be controllably set to emit up to 4096 levels or more.

The lowermost level of energy is defined as 0, where the individual laser element is not activated, the uppermost level of energy can be defined as 1. The distinct intermediate levels therebetween may be considered analogous in the field of printing to "grey levels", each level providing for a gradually distinct intensity (e.g., shade when considering a colored output). Taking for instance, a laser beam emitting element having 16 levels of activation, level 0 would result in lack of impression (e.g., leaving a substrate bare or white if originally so) and level 1 would result in transfer of a tacky film formed by a particle irradiated at maximum energy (e.g., forming a full black dot in the event the particles are so colored). In previous illustrative example, levels $1/16$, $2/16$, $3/16$ and so on would correspond to increasingly stronger shades of grey, comprised between white (0) and black (1). Typically, the energy levels are evenly spaced.

In an alternative embodiment, the individually controllable laser elements of a chip can emit laser beams having variable energy that can be modulated in a continuous analogue manner.

Printing systems and methods incorporating such an imaging station further comprise control devices able to individually control the laser elements and the beams projected therefrom onto a moving imaging surface.

The energy profile of each dot is symmetrical with tapering sides. The exact profile is not important as the distribution may be Gaussian, sinusoidal or even an inverted V. In any such profile, as the peak intensity increases, the base widens and the area of intersection of the profile with a threshold at which the particle coating is rendered tacky also increases in diameter. A consequence of this energy distribution is that points of the imaging surface that are not in alignment with the centerline of any one laser emitting element will receive energy from adjacent elements. It is possible for two nearby elements to be energized to below the level needed to render coating particles on the centerline of the elements tacky, yet for the cumulative energy in the region of overlap between the two centerlines to rise above the level necessary to render the coating particles tacky. In this way, it is possible to create potential raster lines between the centerlines of the laser lines in addition to, or as an alternative to, the raster lines coinciding with the centerlines of the laser elements. This ability to combine the energies from adjacent elements is used to achieve different effects, as described herein. These effects are dependent upon the ability of the imaging surface to combine energies received from different laser elements, even if there is a slight difference between the times of irradiation.

In some embodiments, at least one pair of laser elements, selected either both from the same array or one from each of two adjacent arrays, are controlled in such a manner that their energies are combined on the imaging surface to increase the temperature of the imaging surface above a predetermined threshold at a point intermediate the centers of the images of the two laser elements on the imaging surface, without raising the temperature of the imaging surface at at least one of the centers of the images of the two laser elements above the latter threshold.

Once a region of the imaging surface or particles monolayer thereupon has reached a temperature at which the particles become tacky, any further increase in temperature will not have any effect on the transfer to the substrate. However, it should also be noted that as the intensity of the laser is increased the size of the dot that is rendered tacky also increases.

The imaging station 16 is shown in FIGS. 1 and 2 as being located upstream of the impression station and in an embodiment having such a configuration, it is important to ensure that the film on the imaging surface 12 does not lose its tackiness during transit between the imaging station and the impression station. This may be achieved by positioning the imaging station as closely as possible to the impression station. The imaging system of FIG. 2, that has a folded light path, assists in this respect.

It is alternatively possible to combine the imaging and impressions stations and to selectively heat the imaging surface 12 substantially at the same time as it is pressed against the substrate. This may be achieved, for example, by forming the drum 10 of a transparent material and locating the imaging system 16 within the drum or externally to the drum and across it at a position "facing" the impression station. By "transparent" it is meant that the material of the drum and/or of the imaging surface does not significantly affect the irradiation of the selected particles and/or allow the transfer of sufficient power to render them tacky.

Figure 8A:
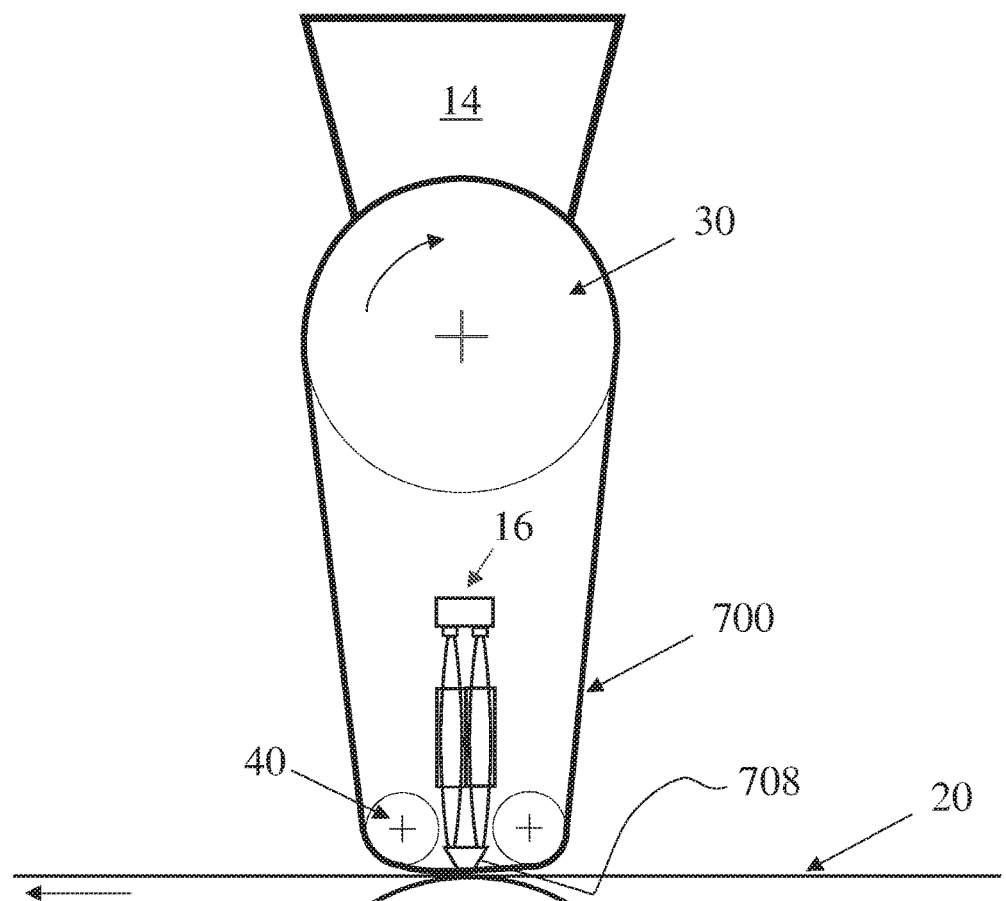
FIG. 8 is a schematic representation of a digital printing system using a transfer member as shown in FIG. 7, panel B showing a magnified detailed view of the impression nip area illustrated as part of the system in panel A.
Figure 8B:
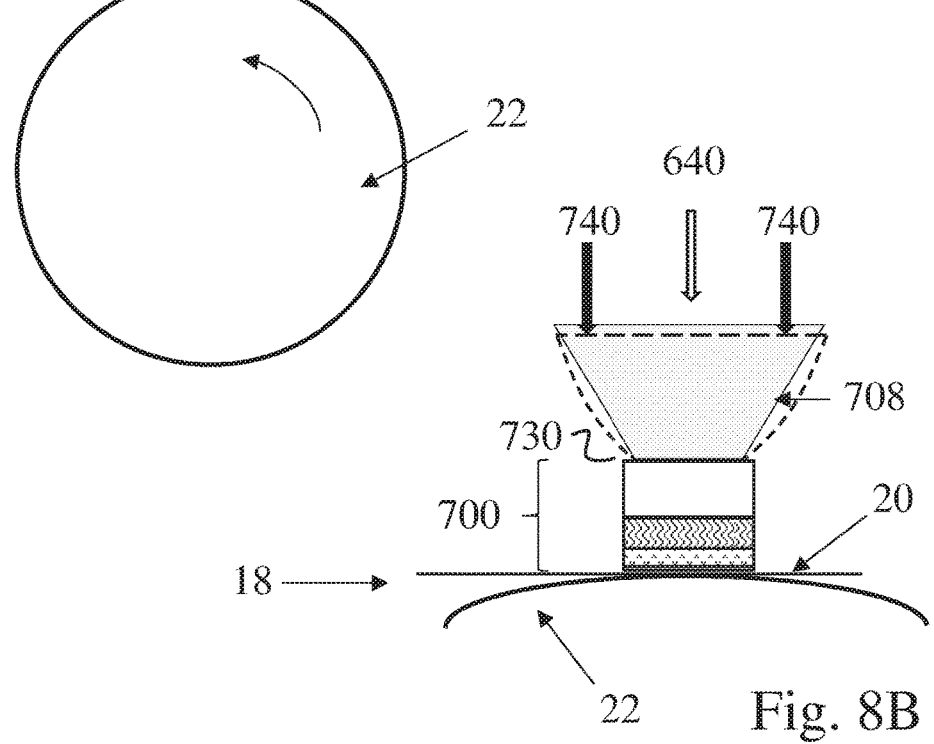
Figure 9:
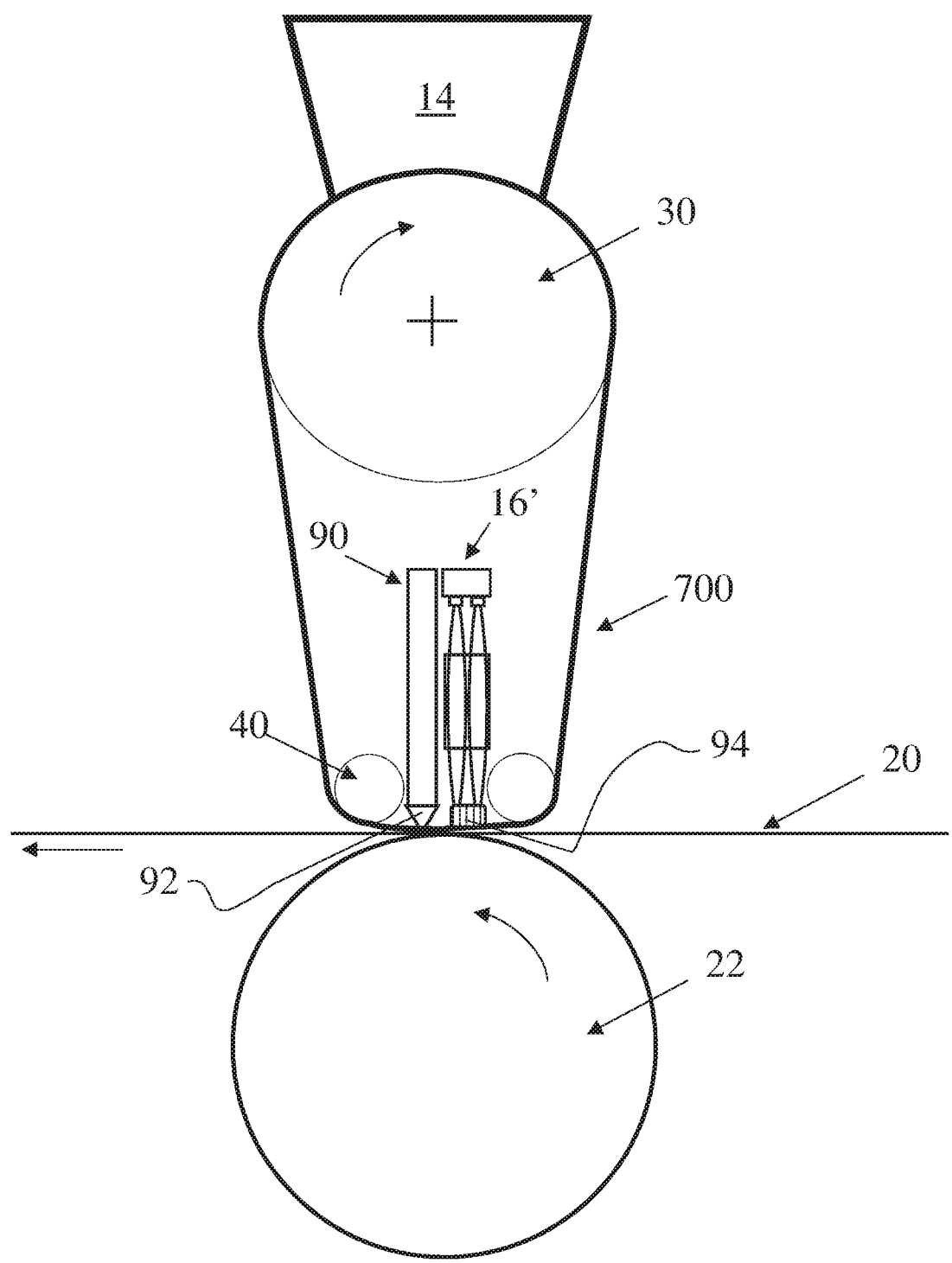
FIG. 9 is a schematic representation of an alternative embodiment of a digital printing system as exemplified in FIG. 8.

Some embodiments of such transparent alternative printing systems are schematically illustrated in FIGS. 8 and 9, to be described in more details in the following.

The digital printing system shown in FIG. 1 or FIG. 2 can only print in one color but multicolor printing can be achieved by passing the same substrate successively through multiple arrangements of coating, imaging and impression stations that are synchronized and/or in registration with one another and each printing a different color. In such case it may be desirable to provide substrate treating stations between the different coating stations. A treating station can be, for instance, a cooler able to reduce the temperature of the substrate on its exit of a previous impression station. As some transferred films may retain some residual tackiness to a degree that may impair a subsequent transfer of different particles, it may be advantageous to eliminate such residual tackiness by cooling of the film transferred to the substrate. Depending on the thermoplastic polymer, the elimination of any residual tackiness, or its reduction to a level not affecting the process, can alternatively be achieved by a treating station being a curing station.

Furthermore, a printing system, even if monochrome, may include a perfecting system allowing double-sided printing. In some cases, perfecting can be addressed at the level of the substrate transport system, which may for example revert a substrate to a side not yet printed on and refeed the unprinted side of the substrate to the same treating and impressions stations having served to print the first side. In other cases, perfecting can be addressed by including two separate impression stations (and their respective upstream or downstream stations), each impression station enabling printing on a different side of the same substrate.

The Substrate

The printing system shown in the drawing is not restricted to any particular type of substrate. The substrate may be individual sheets of paper or card or it may have the form of a continuous web. Because of the manner in which a thin film of softened polymeric particles is applied to the substrate, the film tends to reside on the surface of the substrate. This allows printing of high quality to be achieved on paper of indifferent quality. Furthermore, the material of the substrate need not be fibrous and may instead be any type of surface, for example a plastics film or a rigid board.

The Impression Station

The impression station illustrated in FIGS. 1 and 2 comprises only a smooth impression cylinder 22 that is pressed against the drum 10 and its outer imaging surface 12. In these figures, the transfer member can be opaque (e.g., as described for 600 an example of which being illustrated in FIG. 6), the particles being subjected to radiation from the front side of the imaging surface. The impression cylinder 22 may form part of a substrate transport system, in which case it may be equipped with grippers for engaging the leading edge of individual substrate sheets. In other than digital printing systems, the impression cylinder may have an embossed surface to select the regions of the particle coating to be transferred to the substrate 20.

In FIG. 8, an alternative configuration is schematically illustrated, in which the particles can be subjected to imparted energy, represented in the figure by way of example as laser radiation, from the rear side of the imaging surface. Such a configuration can also be used when using a thermal print heat to apply energy to the imaging surface by direct thermal contact with the rear side of the transfer member. If using radiation, the transfer member needs to be transparent (e.g., as described for 700 an example of which being illustrated in FIG. 7). As shown in FIG. 8A, a coating station 14 can coat the imaging surface of a transparent transfer member 700—being illustrated as an endless belt— with thermoplastic particles. The transfer member can continuously (or intermittently) circulate over a driving drum 30, serving at the coating station a purpose similar to previously described drum 10, and over guide rollers 40. An imaging station 16 positioned within the perimeter formed by the continuous belt is schematically shown. The laser beams emitted by an imaging device at such a station are projecting towards the rear side of a run of the transfer member passing along the gap formed between guide rollers 40. The imaging device comprises a stationary compressible element 708, which can contact the rear side of the transfer member at the impression station. While in the present illustration, two guide rollers 40 bound the run of transfer member subjected to the imaging device 16 and contacting its compressible element 708, this should not be construed as limiting, as one or more guide rollers or smooth sliders may be used for this effect.

FIG. 8B schematically shows a view of this exemplary printing system at the impression nip 18, to an enlarged scale. At the nip 18, the transfer member 700 comes into contact with a printing substrate 20 and an impression cylinder 22. As can be seen, the compressible element 708 of the imaging device may contact a multi-layered transfer member, the thermoplastic particles (not shown) being positioned on the outer imaging 2 surface (facing the printing substrate). As previously mentioned, a transparent lubricant 730 can be used to facilitate the sliding of the transfer member rear side over the compressible element 708. The thickness of a compressible element 708 and of the layers forming a transparent transfer member to be used therewith are selected so as allow the radiation emitted by any laser element of a chip of an imaging device to target the radiation absorbing layer 3 704, or any sufficiently adjacent strata, of the member to permit sufficient radiation absorbance, and subsequent heat delivery to the thermoplastic particles.

In FIG. 9, an alternative configuration of rear side irradiation of particles positioned on an imaging surface through a transparent transfer member, is schematically illustrated. The transparent transfer member 700 can be as described, an example of which being illustrated in FIG. 7. In this embodiment, the compressible element previously shown as 708 in FIG. 8 is no longer associated with the imaging device 16', but with a separate pressure applicator 90, the compressible segment of which, identified as 92, serves a similar purpose as previous 708. While similar concerns may apply, for instance, a lubricant can be used to facilitate the sliding of the transfer member rear side over the compressible segment 92 of the pressure applicator 90, the compressible segment 92 is now relieved from certain constraints of previous 708. By way of example, the compressible material forming such segment needs not necessarily be transparent, permitting the use a wider range of elastomers. Regarding the imaging device 16', the segment 94 contacting the transfer member rear side no longer needs to be as compressible, but mainly transparent to enable sufficient progression of the laser beams towards the imaging surface. Thus, segment 94 can be made of a variety of materials, including, for example, glass and transparent plastics, such as acryl. Such materials are typically preferable, as far as choice and optical imaging quality are concerned, over compressible transparent elastomers from which previous compressible element 708 would be formed. In the embodiment illustrated in FIG. 9, irradiation takes place immediately upstream of the impression nip. While this embodiment is less compact than an alternative one schematically illustrated in FIG. 8A, it offers a substantially constant optical path length between the laser beam emitting element of the imaging device and the absorbing layer being targeted within the transfer member. A printing system operating with such essentially invariable optical path length is expected to benefit from a more uniform spot aspect and a more even optical magnification, resulting on the surface of the substrate in images of higher quality.

A transparent lubricant 730, suitable for some embodiments of the invention, preferably does not affect the optical path of the emitted radiation. Advantageously it is inert with respect to the elements, the respective slide of which it can promote. By way of example, a compatible lubricant does not swell or otherwise modify the dimensions and/or any other desired property of the transfer member or of the compressible element or of the pressure generator in a manner that would render any of them inoperative in the printing system.

In the description and claims of the present disclosure, each of the verbs, "comprise" "include" and "have", and conjugates thereof, are used to indicate that the object or objects of the verb are not necessarily a complete listing of members, components, elements, steps or parts of the subject or subjects of the verb.

As used herein, the singular form "a", "an" and "the" include plural references and mean "at least one" or "one or more" unless the context clearly dictates otherwise.

Positional or motional terms such as "upper", "lower", "right", "left", "bottom", "below", "lowered", "low", "top", "above", "elevated", "high", "vertical", "horizontal", "front", "back", "backward", "forward", "upstream" and "downstream", as well as grammatical variations thereof, may be used herein for exemplary purposes only, to illustrate the relative positioning, placement or displacement of certain components, to indicate a first and a second component in present illustrations or to do both. Such terms do not necessarily indicate that, for example, a "bottom" component is below a "top" component, as such directions, components or both may be flipped, rotated, moved in space, placed in a diagonal orientation or position, placed horizontally or vertically, or similarly modified.

Unless otherwise stated, the use of the expression "and/or" between the last two members of a list of options for selection indicates that a selection of one or more of the listed options is appropriate and may be made.

In the disclosure, unless otherwise stated, adjectives such as "substantially" and "about" that modify a condition or relationship characteristic of a feature or features of an embodiment of the present technology, are to be understood to mean that the condition or characteristic is defined to within tolerances that are acceptable for operation of the embodiment for an application for which it is intended, or within variations expected from the measurement being performed and/or from the measuring instrument being used. When the term "about" precedes a numerical value, it is intended to indicate +/−15%, or +/−10%, or even only +/−5%, and in some instances the precise value.

While this disclosure has been described in terms of certain embodiments and generally associated methods, alterations and permutations of the embodiments and methods will be apparent to those skilled in the art. The present disclosure is to be understood as not limited by the specific embodiments described herein.

The invention claimed is:

1. A method of thermal transfer printing onto a surface of a substrate, which method comprises the steps of:
 a) providing a transfer member having an imaging surface on a first side of the transfer member,
 b) coating the imaging surface of the transfer member with particles formed of, or coated with, a thermoplastic polymer,
 c) removing substantially all particles that are not in direct contact with the imaging surface to leave a uniform monolayer particle coating on the imaging surface,
 d) applying energy to selected regions of the coated imaging surface to heat and render tacky particles of corresponding regions of the monolayer particle coating that are coating the selected regions, and
 e) pressing at least a portion of the coated imaging surface and at least a corresponding portion of the surface of the substrate against one another, either during or after application of energy, to cause transfer to the surface of the substrate of the particles of the corresponding regions of the particle coating that have been rendered tacky.

2. The method of claim 1, wherein following transfer of the particles that have been rendered tacky to the surface of the substrate, steps b) and c) are repeated to apply a fresh monolayer coating of particles at least to the selected regions from which the particles which were rendered tacky were transferred to the substrate surface in step e), to leave the imaging surface uniformly coated with a replenished monolayer of particles for printing onto a subsequent substrate surface.

3. The method of claim 1, wherein step b) comprises:
 (i) directing onto the imaging surface or onto an intermediate applicator a gas jet that includes the particles for coating the imaging surface; or
 (ii) selecting the imaging surface and the particles for coating the imaging surface to be hydrophobic and directing a liquid jet that includes the particles for coating the imaging surface onto the imaging surface or onto an intermediate applicator, the liquid of the jet being selected so as not to wet the imaging surface.

4. The method of claim 1, further comprising cooling at least a portion of the imaging surface prior to or during the coating of the imaging surface, and/or heating at least a portion of the imaging surface subsequent to the coating of the imaging surface.

5. The method of claim 1, wherein the energy is applied to a rear side of the transfer member, the rear side being opposite the first side.

6. The method of claim 1, wherein the applied energy consists of electromagnetic (EM) radiation.

7. The method of claim 5, wherein the applied energy consists of EM radiation and the rear side of the transfer member is transparent to said EM radiation.

8. A printing apparatus for thermal transfer printing onto a surface of a substrate, the apparatus comprising:
   a) a movable transfer member having an imaging surface on a first side of the transfer member,
   b) a coating station at which particles made of, or coated with, a thermoplastic polymer are applied to the imaging surface and at which particles that were applied but are not in direct contact with the imaging surface are removed from, or fail to adhere to, the imaging surface, so that a uniform monolayer particle coating is formed on the imaging surface,
   c) an imaging station at which energy is applied to selected regions of the imaging surface to render tacky particles of corresponding regions of the monolayer particle coating that are coating the selected regions, and
   d) an impression station at which at least a portion of the imaging surface and at least a corresponding portion of the surface of the substrate are pressed against one another, either during or after application of energy, to cause transfer to the surface of the substrate of the particles of the corresponding regions that have been rendered tacky.

9. The printing apparatus of claim 8, wherein, the transfer member is endless and returns to the coating station, during operation, after at least a portion of the transfer member has passed through the imaging and impression stations, in order for the particle coating on the imaging surface to be replenished so as again to provide a uniform monolayer by application of fresh particles to the selected regions of the imaging surface that have been depleted of particles, thereby preparing the transfer member for a following printing cycle.

10. The printing apparatus of claim 8, wherein the coating station comprises an intermediate applicator able to apply the particles that are to be applied to the imaging surface.

11. The printing apparatus of claim 8, wherein the imaging surface is hydrophobic and/or charged and wherein the particles that are to be applied are hydrophobic and/or charged.

12. The printing apparatus of claim 8, wherein the coating station comprises:
   i) at least one spray head for directly or indirectly applying to the imaging surface a fluid stream within which are included particles to be applied to the imaging surface,
   ii) a housing surrounding the spray head(s) and defining an interior plenum for confining the fluid stream, the housing having a rim adjacent to the imaging surface that is configured to prevent egress of particles from a sealing gap defined between the rim of the housing and the surface to be coated, and
   iii) a suction source connected to the housing to extract from the plenum the sprayed fluid and particles included in the sprayed fluid,
   wherein the suction source is operative to extract substantially all particles that are not in direct contact with the imaging surface, so as to leave only a single particle layer adhering to the imaging surface on exiting the apparatus.

13. The printing apparatus of claim 8, wherein the energy is applied to a rear side of the transfer member, the rear side being opposite the first side.

14. The printing apparatus of claim 8, wherein the applied energy consists of electromagnetic (EM) radiation.

15. The printing apparatus of claim 13, wherein the applied energy consists of EM radiation and the rear side of the transfer member is transparent to said EM radiation.

16. The printing apparatus of claim 8, wherein the applied energy consists of EM radiation which includes laser radiation, and wherein the imaging station comprises an imaging device for projecting individually controllable laser beams onto the imaging surface as the imaging surface moves in a reference X-direction relative to the imaging device, the imaging device including a plurality of semiconductor chips each having a plurality of laser beam emitting elements, the chips being mounted on a support such that, were all laser beam emitting elements to be activated continuously while the imaging surface is in motion relative to the imaging station, the emitted laser beams would trace across the imaging surface a set of parallel lines that extend in the X-direction and are substantially uniformly spaced in the Y-direction.

17. The printing apparatus of claim 16, wherein the individually controllable laser beam emitting elements of each semiconductor chips are arranged in a two dimensional main array of M rows and N columns, the elements in each row having a uniform spacing $A_r$ and the elements in each column having a uniform spacing $a_c$, wherein the chips are mounted on a support in such a manner that, when nominally placed, each pair of chips that are adjacent one another in a reference Y-direction, transverse to the X-direction, are offset from one another in the X-direction, and, when all laser beam emitting elements are activated continuously, the emitted laser beams of the two chips of the pair trace on the imaging surface $2 \cdot M \cdot N$ parallel lines the laser beams of each chip tracing a set of $M \cdot N$ lines that do not overlap the set of lines of the other chip, wherein in addition to the M rows and N columns of elements of the main array, each chip comprises at least one additional column on at least one side of the main array, each additional column containing at least one selectively operable laser emitting element capable of compensating for any misalignment in the Y-direction in the relative positioning of the adjacent chips on the support by tracing at least one additional line that lies between the two sets of $M \cdot N$ lines.

18. The printing apparatus of claim 16, wherein a respective lens or series of lenses is provided for each chip to focus the laser beams emitted by all the elements of the associated chip onto the imaging surface, wherein the focused laser beams would trace the set of parallel lines were all laser beam emitting elements to be activated continuously while the imaging surface is in motion relative to the imaging station.

19. The printing apparatus of claim 18, wherein each lens is formed either (i) by a single GRIN rod or (ii) by a series of two or more mutually inclined GRIN rods, wherein light from each GRIN rod in the series is directed to the next GRIN rod in the series by a reflecting element consisting of a mirror or a prism, and wherein each lense or series of lenses has magnification of +1 or −1.

20. The printing apparatus of claim 19, wherein the energy is applied to a rear side of the transfer member, and wherein the chips are arranged in pair of rows on the support, corresponding laser emitting elements of all the chips in each of the two rows lying in line with one another in the Y-direction and wherein the GRIN rods have a diameter equal to $2 \cdot N \cdot A_r$, being the distance between corresponding elements of adjacent chips in each row.

21. The printing apparatus of claim 16, wherein each chip has an equal number of rows and columns of laser beam emitting elements in the main array.

22. The printing apparatus of claim 16, wherein the support is characterized by at least one characteristic selected from a group comprising:
   the support is fluid cooled,
   the support is constructed of a rigid metallic or ceramic structure, and
   the surface of the support is formed of, or coated with, an electrical insulator and thin film conductors are formed on the electrically insulating surface to supply electrical signals and power to the chips.

23. The printing apparatus of claim 16, wherein the chips are vertical cavity surface emitting laser (VCSEL) chip arrays.

24. The printing apparatus of claim 8, further comprising a cooler and/or a heater for modifying the temperature of the imaging surface prior to, during, or subsequent to, the imaging surface having particles applied thereto.

* * * * *